(12) United States Patent
Fidanza et al.

(10) Patent No.: US 11,423,365 B2
(45) Date of Patent: Aug. 23, 2022

(54) TRANSACTION CARD SYSTEM HAVING OVERDRAFT CAPABILITY

(71) Applicant: MO TECNOLOGIAS, LLC, Miami, FL (US)

(72) Inventors: Paolo Fidanza, Miami, FL (US); Levi Velazquez Mulato, Bogota (CO)

(73) Assignee: MO TECNOLOGIAS, LLC, Miami, FL (US)

( * ) Notice: Subject to any disclaimer, the term of this patent is extended or adjusted under 35 U.S.C. 154(b) by 0 days.

(21) Appl. No.: 17/174,380

(22) Filed: Feb. 12, 2021

(65) Prior Publication Data
US 2021/0256485 A1 Aug. 19, 2021

Related U.S. Application Data

(60) Provisional application No. 62/977,518, filed on Feb. 17, 2020.

(51) Int. Cl.
| | |
|---|---|
| *G06Q 20/02* | (2012.01) |
| *G06Q 40/02* | (2012.01) |
| *G06Q 30/02* | (2012.01) |
| *G06Q 20/20* | (2012.01) |
| *G06Q 20/40* | (2012.01) |

(Continued)

(52) U.S. Cl.
CPC ......... *G06Q 20/02* (2013.01); *G06F 16/2379* (2019.01); *G06F 16/24552* (2019.01); *G06N 3/04* (2013.01); *G06N 3/08* (2013.01); *G06Q 20/202* (2013.01); *G06Q 20/204* (2013.01); *G06Q 20/342* (2013.01); *G06Q 20/4037* (2013.01); *G06Q 30/0201* (2013.01);

(Continued)

(58) Field of Classification Search
CPC .... G06Q 20/02; G06Q 20/202; G06Q 20/204; G06Q 20/342; G06Q 20/4037; G06Q 30/0201; G06Q 30/0204; G06Q 40/02; G06Q 50/01; G06Q 20/405; G06Q 40/00; G06Q 40/025; G06Q 20/04; G06Q 20/102; G06Q 20/3674; G06Q 20/36; G06F 16/2379; G06F 16/24552; G06N 3/04; G06N 3/08
See application file for complete search history.

(56) References Cited

U.S. PATENT DOCUMENTS 8,061,592 B1 * 11/2011 Clem ............... G06Q 40/02
235/379
8,190,514 B2 5/2012 Bishop et al.
(Continued)

*Primary Examiner* — Peter Ludwig
(74) *Attorney, Agent, or Firm* — Allen, Dyer, Doppelt + Gilchrist, P.A.

(57) ABSTRACT

A transaction card system pulls past transaction data from a financial institution. A user profile model is applied to the past transaction data and customer data features and transforms the data into a user feature profile that summarizes the identity data, financial health and payment capacity of the customer. An overdraft request has current declined transaction details relating to a customer transaction using the transaction card. The computing network pulls from cache the most recent customer transaction banking data and most recent user feature profile and applies a machine learning approval model to the current declined transaction details, the most recent customer transaction data, and the most recent user feature profile, and determines whether to approve or decline the overdraft amount.

9 Claims, 33 Drawing Sheets

(51) Int. Cl.
*G06Q 50/00* (2012.01)
*G06Q 20/34* (2012.01)
*G06N 3/04* (2006.01)
*G06F 16/23* (2019.01)
*G06F 16/2455* (2019.01)
*G06N 3/08* (2006.01)

(52) U.S. Cl.
CPC ......... *G06Q 30/0204* (2013.01); *G06Q 40/02* (2013.01); *G06Q 50/01* (2013.01)

(56) References Cited

U.S. PATENT DOCUMENTS

| | | | |
|---|---|---|---|
| 8,234,215 B2* | 7/2012 | Keiser | G06Q 20/403 |
| | | | 705/41 |
| 8,401,904 B1 | 3/2013 | Simakov et al. | |
| 8,429,079 B1* | 4/2013 | Cameo | G06Q 20/40 |
| | | | 705/44 |
| 8,600,882 B2 | 12/2013 | Summerrow et al. | |
| 8,636,203 B1 | 1/2014 | Patterson et al. | |
| 10,509,997 B1 | 12/2019 | Gupta | |
| 10,878,494 B2 | 12/2020 | Fidanza et al. | |
| 2004/0147817 A1* | 7/2004 | Dewing | G16H 50/20 |
| | | | 128/923 |
| 2007/0100745 A1* | 5/2007 | Keiser | G06Q 20/105 |
| | | | 705/38 |
| 2009/0271277 A1* | 10/2009 | Bishop | G06Q 20/20 |
| | | | 705/21 |
| 2011/0131122 A1 | 6/2011 | Griffin et al. | |
| 2012/0109802 A1* | 5/2012 | Griffin | G06Q 40/00 |
| | | | 705/35 |
| 2013/0013506 A1* | 1/2013 | Wiggins | G06Q 20/405 |
| | | | 705/44 |
| 2014/0304131 A1* | 10/2014 | Gangopadhyay | G06Q 40/02 |
| | | | 705/35 |
| 2014/0344158 A1 | 11/2014 | Hirka et al. | |
| 2015/0066771 A1* | 3/2015 | Adjaoute | G06Q 20/4016 |
| | | | 705/44 |
| 2015/0100443 A1* | 4/2015 | Van Heerden | G06Q 40/025 |
| | | | 705/16 |
| 2016/0070589 A1* | 3/2016 | Vermeulen | G06F 9/466 |
| | | | 711/153 |
| 2016/0182556 A1* | 6/2016 | Tatourian | H04L 67/02 |
| | | | 726/25 |
| 2018/0150843 A1 | 5/2018 | Adjaoute | |
| 2018/0174133 A1 | 6/2018 | Williams et al. | |
| 2019/0057010 A1* | 2/2019 | Kurian | G06F 11/3457 |
| 2019/0073714 A1 | 3/2019 | Fidanza et al. | |
| 2019/0259095 A1* | 8/2019 | Templeton | G06N 3/08 |
| 2020/0014691 A1* | 1/2020 | Ortiz | H04L 63/10 |
| 2020/0027087 A1* | 1/2020 | Venkatasubramanian | |
| | | | G06Q 20/401 |
| 2020/0090261 A1* | 3/2020 | Tumulty, II | G06Q 20/42 |
| 2020/0202456 A1* | 6/2020 | Maheshwari | G06Q 50/01 |
| 2020/0280635 A1* | 9/2020 | Barinov | H04M 3/4933 |
| 2020/0349641 A1 | 11/2020 | Fidanza et al. | |
| 2020/0380481 A1* | 12/2020 | Kalaboukis | G06Q 20/405 |
| 2021/0334656 A1* | 10/2021 | Sjogren | G06N 3/08 |

* cited by examiner

```
POST                                                              /evaluation
{   "reference_id":41312391,
    "transaction":{
            "datetime":"2020-02-01 20:00:00",
            "code":11231,
            "amount":500,
            "currency_code":840,
            "authorization_code":".",
            "post_date":"2020-02-01",
            "post_time":"20:00:10",
            "network_code":"NYCE"
    },
    "merchant":{
            "number": 1239283,
            "name": "Generic grocery store",
            "category_code": 8329,
            "country_code": 1,
            "charge_back_flag":2
    },
    "acquirer":{
            "requested_amount": 500,
            "requested_currency": 840,
    }
}

Response              —              HTTP              200

{
    "mo_evaluation_id": "MO123",
    "result": "Approved"
}
```

FIG. 4

| | |
|---|---|
| REFERENCE ID* | CARD IDENTIFIER NUMBER (USED TO IDENTIFY THE CUSTOMER) |
| TRANSACTION DATETIME* | DATETIME OF THE TRANSACTION |
| TRANSACTION CODE | CODE REPRESENTING THE TYPE OF MONETARY TRANSACTION |
| TRANSACTION AMOUNT* | TOTAL AMOUNT OF THE TRANSACTION THAT WAS DECLINED |
| TRANSACTION CURRENCY CODE* | CODE REPRESENTING THE CURRENCY OF THE TRANSACTION |
| AUTHORIZATION CODE* | IDENTIFICATION NUMBER ASSIGNED TO THE TRANSACTION, BLANK IF DECLINED |
| POSTDATE AND POSTTIME | DATE AND TIME WHEN THE TRANSACTION WAS POSTED |
| NETWORK CODE | CODE IDENTIFYING NETWORK (i.e. PULSE, NYCE, STAR) RAILS USED TO PROCESS THE TRANSACTION |
| MERCHANT NUMBER* | NUMBER IDENTIFYING THE MERCHANT SUBMITTING THE TRANSACTION |
| MERCHANT NAME* | NAME OF MERCHANT SUBMITTING THE TRANSACTION |
| MERCHANT CATEGORY CODE* | CODE REPRESENTING THE MERCHANT LINE OF BUSINESS |
| MERCHANT COUNTRY CODE | CODE REPRESENTING THE COUNTRY WHERE MERCHANT IS LOCATED |
| CHARGE BACK FLAG | CHARGE BACK CODE TO IDENTIFY THE TYPE |
| REQUESTED TRANSACTION AMOUNT | TRANSACTION AMOUNT REQUESTED BY ACQUIRER |
| REQUESTED TRANSACTION CURRENCY | TRANSACTION CURRENCY REPORTED BY ACQUIRER |

*MANDATORY

FIG. 5

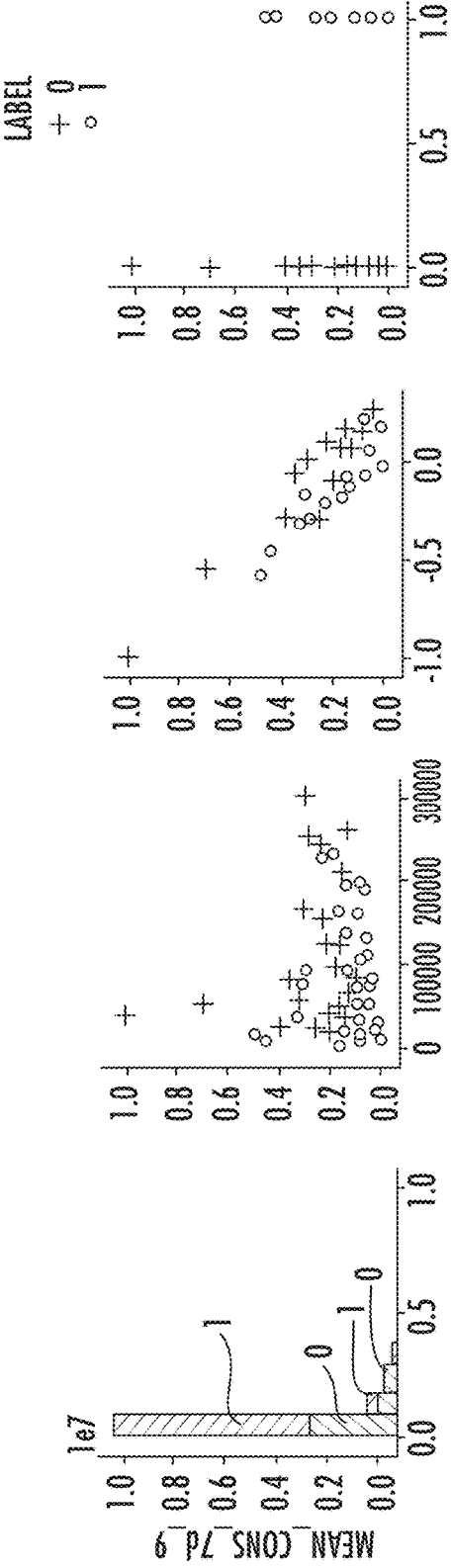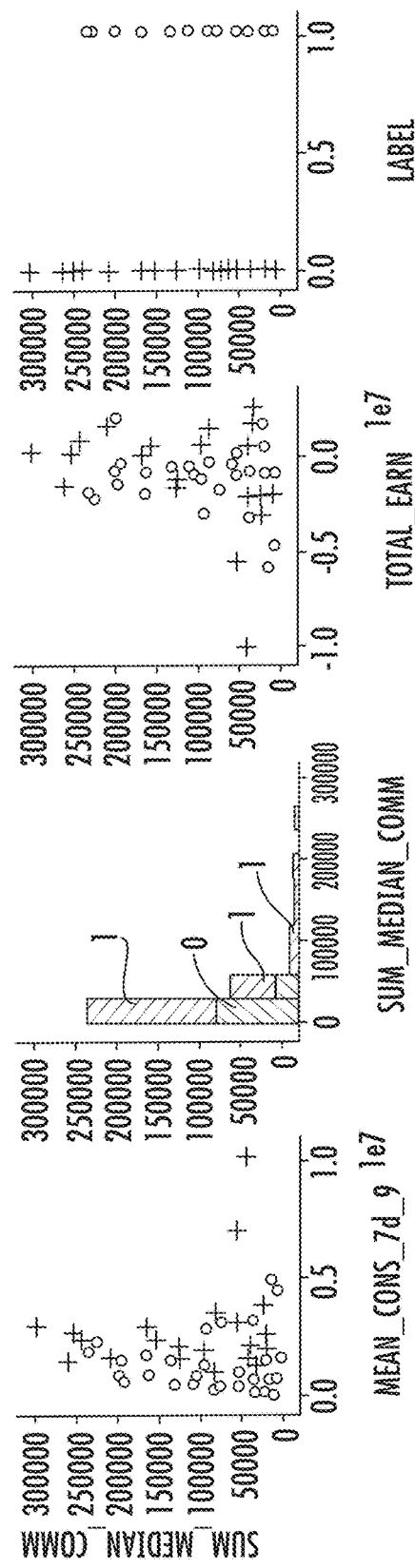
FIG. 17A  FIG. 17B  FIG. 17C  FIG. 17D
FIG. 17E  FIG. 17F  FIG. 17G  FIG. 17H

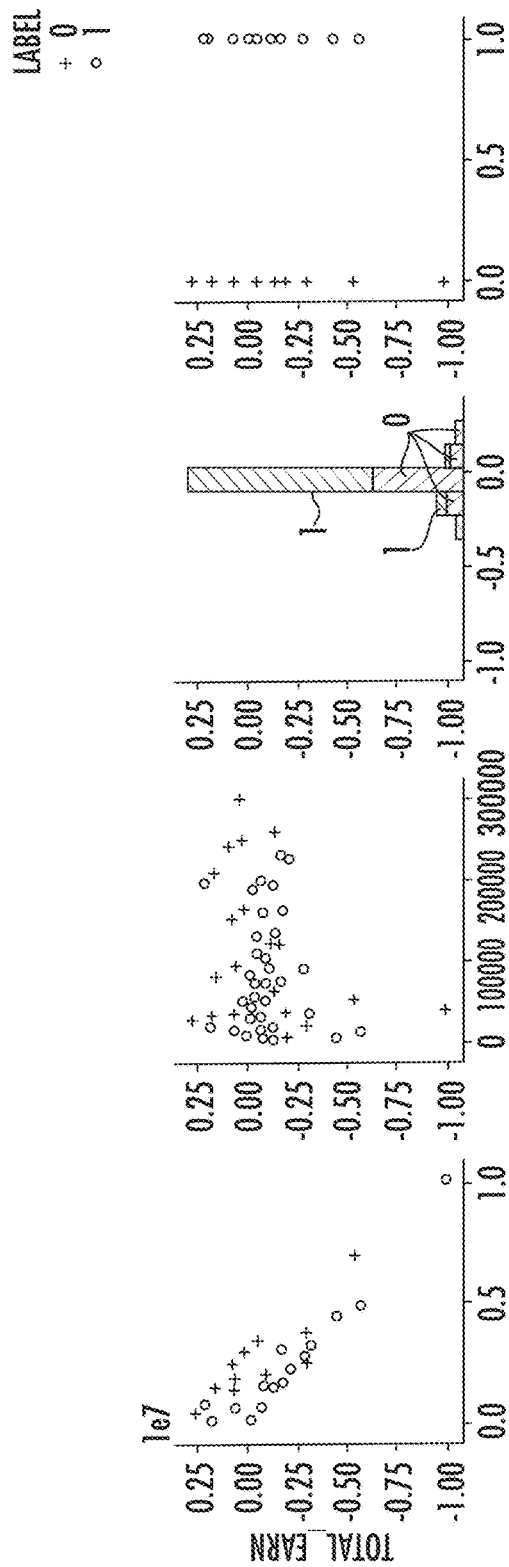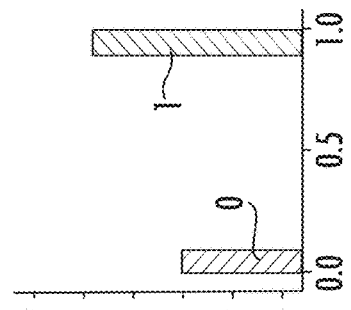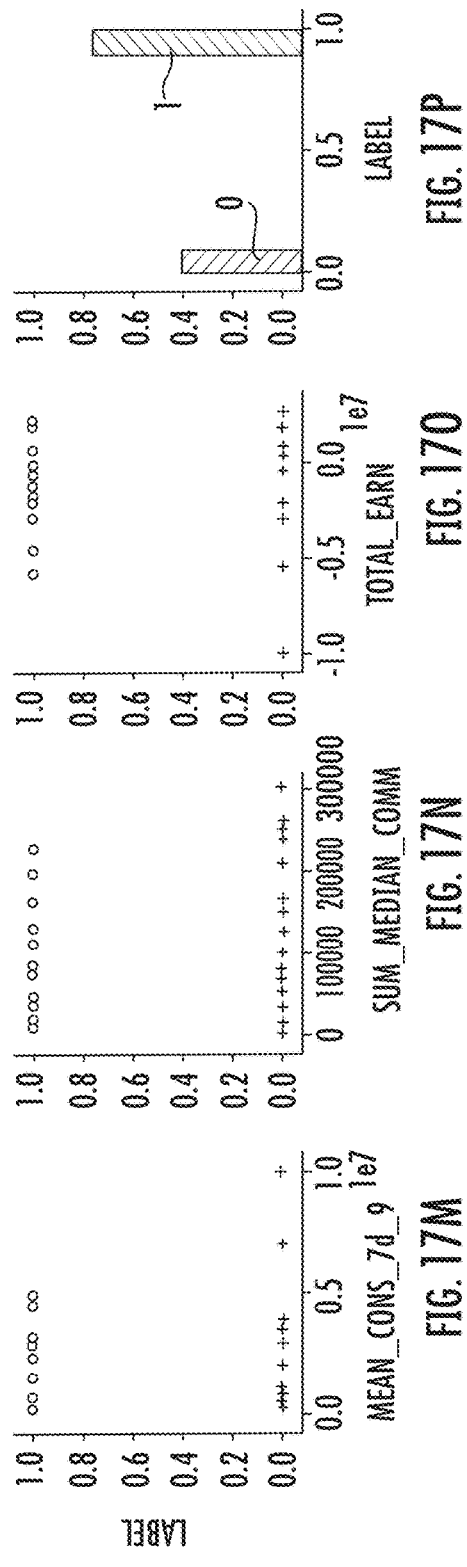

| METRIC | % |
|---|---|
| F1 SCORE | 96.55 |
| PRECISION | 97 |
| TRUE POSITIVE RATE | 95.14 |
| TRUE NEGATIVE RATE | 97 |

TRANSACTION CARD SYSTEM HAVING OVERDRAFT CAPABILITY

PRIORITY APPLICATION

This application is based upon U.S. provisional patent application Ser. No. 62/977,518, filed Feb. 17, 2020, the disclosure which is hereby incorporated by reference in its entirety.

FIELD OF THE INVENTION

The present invention relates to the field of transaction cards, such as a debit card or prepaid card, and more particularly, to a transaction card system having overdraft capability to approve an overdraft for the transaction cards that were rejected for insufficient funds.

BACKGROUND OF THE INVENTION

Transaction cards, such as a debit card, which term may include a conventional credit card or a prepaid card having a fixed amount of funds that may be replenished, are commonly issued by banks and other institutions, and may be "branded" with a major credit card name or other company name. Many different merchants accept such transaction cards. Debit cards are well known and linked to a bank institution and may include the ability to debit a checking account or a credit card, while a prepaid debit card, also termed prepaid card, may be established by depositing money in an associated, stored value account maintained by a card issuer, such as a bank or other financial service. The stored value account may not be a traditional banking account, such as a savings or checking account and little, if any, cardholder identification may be kept by the issuer. The cardholder identification may be nothing more than a pin as a personal identification number, which may be required from the cardholder for authentication when the card is used to conduct transactions. In other cases, the issuer may have minimal cardholder information since there is no banking account. The prepaid card may not have deposited money insured by a government through the Federal Deposit Insurance Corporation (FDIC) or other public agency. The traditional bank debit card, on the other hand, is issued by a financial institution to access an actual banking account, such as a checking or savings account, which may have limited funds.

An advantage about prepaid cards is they may be used by those not having the financial means to have a bank debit card or by those without good credit. In some cases, the prepaid cards may be used to make cash withdrawals and are sometimes loaded or reloaded by a cardholder at a point-of-sale (POS) terminal and participating merchants. Some prepaid cards may be loaded over the internet, by accessing the issuer's website, and transferring funds from a credit card or banking account. Often these transaction cards, whether prepaid cards or a conventional debit card, are used often, sometimes even several times a day, and must be reloaded frequently.

These transaction cards are widely accepted payment options for electronic transactions at point-of-sale devices of merchants and automated teller machines (ATMs), and perform electronic and on-line transactions. If the transaction card is issued by an issuer bank, when the user uses the transaction card for an electronic or on-line transaction, details of the transaction card are routed to the issuer bank through a payment network and the issuer bank approves the transaction when an account balance or available credit line of the user covers a transaction amount of the transaction. However, when the account balance or the available credit line does not cover the transaction amount, the issuer bank may decline a transaction due to insufficient funds. The transaction may also be declined if a server system of the issuer bank is not operating or facing down time, or may consider the use of the transaction card at that time to be fraudulent. If the prepaid card has insufficient funds on the card, it is declined.

These declined transactions inconvenience the user and increase processing overhead of different servers in the issuer bank and payment network. Some overdraft services mitigate this problem, but these overdrafts usually require the customer having the transaction card to be part of an overdraft service. Unless there is an overdraft service, the customer may not be permitted to borrow funds from the issuer bank.

Some systems may alleviate this problem with the security held by a bank and allowing some overdraft, while others may transmit a notification to the cardholder that they have reached their limit and no longer have available funds and should deposit more funds. Some systems allow a customer to supplement the transaction by using another source of income, such as another credit card and make up for the overdraft with other funds. Some banks may allow use of a proxy card payment system, but that still does not solve the problem if even the proxy card may be overdrawn in a merchant transaction. Other systems, such as artificial neural networks, perform machine learning based on information associated with a user and calculate false positive scores. This type of system may help detect transactions that are not considered a fraud and would be declined. However, those artificial neural network systems do not solve the problem of an overdraft when there are insufficient funds and determine risk and whether the transaction should be completed.

SUMMARY OF THE INVENTION

A transaction card system may include a transaction card belonging to a customer. The transaction card has a set dollar limit on spending. A first computing network may be configured to pull past transaction data based on a plurality of days of transactions from a financial institution to which the customer has an account, and extract customer data features from public data sources of the customer. The customer data features may comprise one or more of a) behavior variables, b) identity characteristics, and c) social relationships. The first computing network may be configured to apply a user profile model to the past transaction data and customer data features and transform the past transaction data and customer data features into user feature profile that summarizes the identity data, financial health and payment capacity of the customer, and update the most recent transaction banking data and customer data features and apply the user profile model and update the user feature profile into a most recent user feature profile. The first computing network may further comprise a non-relational transactional database system into which the user feature profiles, past transactional data and customer data features are stored, and a cache system into which the most recent customer transaction data and the most recent user feature profile is held.

A second computing network may be connected to the first computing network and configured to receive an overdraft request from a point-of-sale (POS) terminal having current declined transaction details relating to a customer transaction at the POS terminal that resulted in the POS terminal declining the transaction because of an overdraft amount on the transaction card based on the customer transaction. The second computing network may be configured to pull from the cache system of the first computing system the most recent customer transaction banking data and most recent user feature profile and apply a machine learning approval model to the current declined transaction details, the most recent customer transaction data, and the most recent user feature profile, and determine whether to approve or decline the overdraft amount.

In an example the machine learning approval model may be operative to generate a bad debt prediction for the customer as a numerical indicia, and if the numerical indicia is below a threshold value, the overdraft on the transaction card is approved for the customer. The user feature profile may include a predictive payment capacity forecast of the customer. The transaction card may comprise a debit card or prepaid card.

The behavior variables may comprise information related to websites visited by the customer, product categories purchased by the customer, stores visited by the customer, ratings on e-commerce websites, and the consumer segment the customer belongs to. The identity characteristics may comprise information related to home addresses, neighborhood profiles, length or present residence, education level, employment history, and educational level of the customer. The social relationships may comprise information relating to social media and photo attributes that include features inferred from image processing of public photographs found of the customer in social networks and search engines.

The second computing network may comprise a plurality of servers in a cloud network forming a machine learning network as an artificial neural network or an ensemble meta model like XGBoost. The first computing network may comprise a first cloud-based network having a first non-relational database network that stores user feature profiles, and a second non-relational database network that stores transactional banking data and customer data features, and said second computing network comprises a second cloud-based network having at least one edge device. The first computing network may comprise an off-line segment and said second computing network comprises an on-line segment. The transaction card may be issued by a financial institution and belonging to a customer, and the transaction card may have a set dollar limit on spending. The customer may be enrolled in an instant overdraft program operated by a third party that approves an overdraft made on the transaction card.

DESCRIPTION OF THE DRAWINGS

Other objects, features and advantages of the present invention will become apparent from the detailed description of the invention which follows, when considered in light of the accompanying drawings in which:

FIG. 4 is a screen print of an example API function for declined transactions.

FIG. 5 is a table showing different attributes used in current declined transaction details.

FIGS. 17A to 17P are graphs showing examples of different tendencies in two classes.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1A:
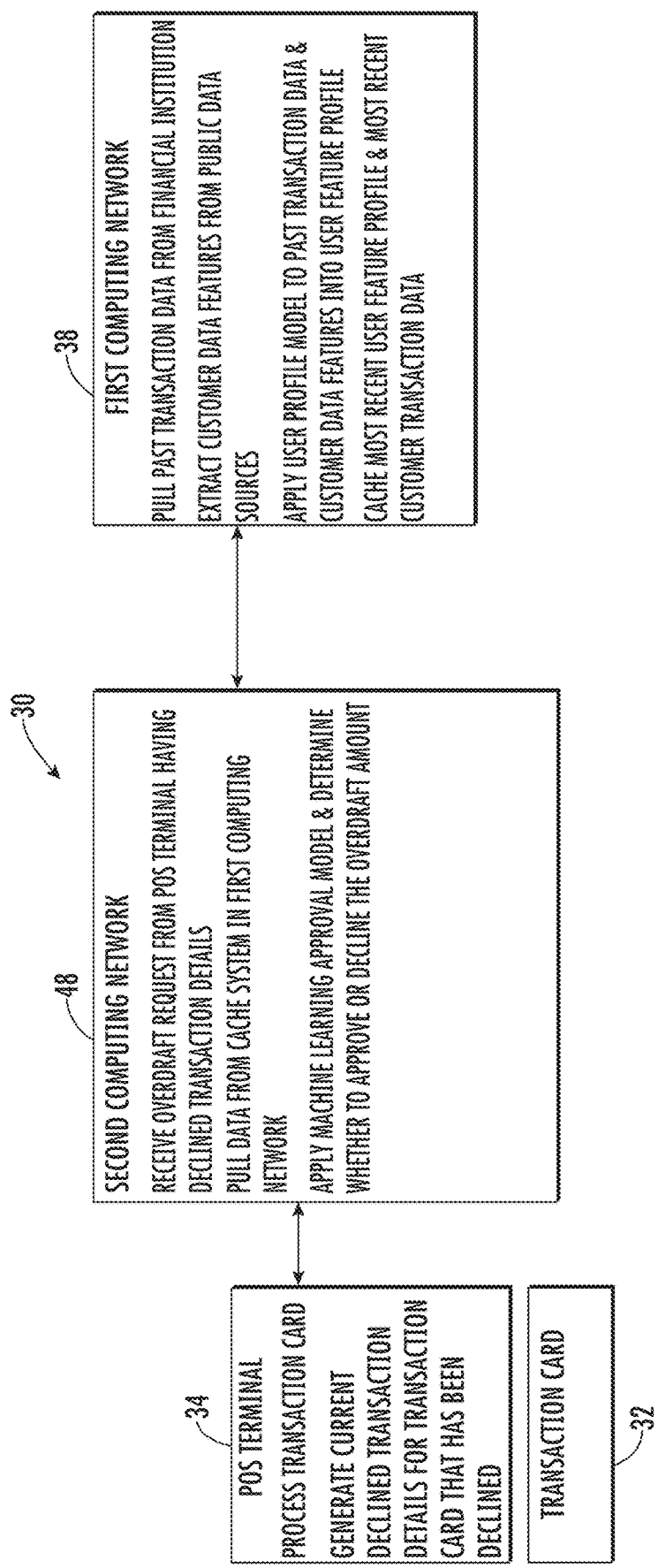
FIG. 1A is a block diagram of the transaction card system having overdraft capability in accordance with a non-limiting example.
Figure 1B:
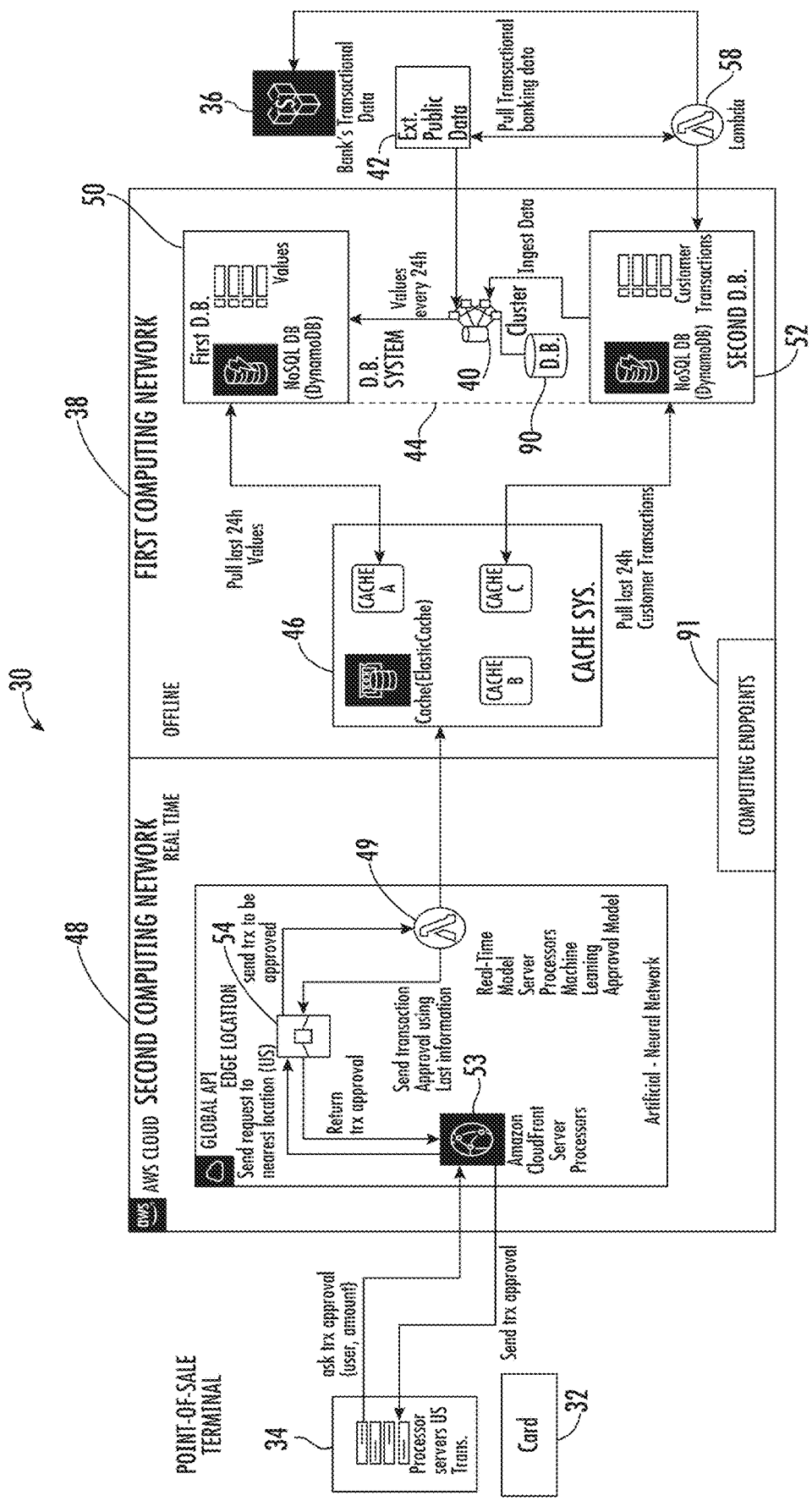
FIG. 1B is a more detailed block diagram of the system shown in FIG. 1A.

Referring now to FIG. 1A and the more detailed FIG. 1B, there is illustrated a transaction card system illustrated generally at 30 that includes overdraft capability, which may approve an overdraft transaction when the transaction card 32, such as a debit card or prepaid card, may have been rejected for insufficient funds at a merchant or other point-of-sale terminal device 34.

The transaction card system 30 may incorporate the loan and machine learning system with debt prediction and associated system as described as the MO system with a subsection as the MO API in commonly assigned U.S. Pat. No. 10,878,494, and U.S. patent application Ser. No. 16/183,782, filed Nov. 8, 2018, and U.S. patent application Ser. No. 16/402,282, filed May 3, 2019, the disclosures of which are hereby incorporated by reference in their entirety.

Figure 6:
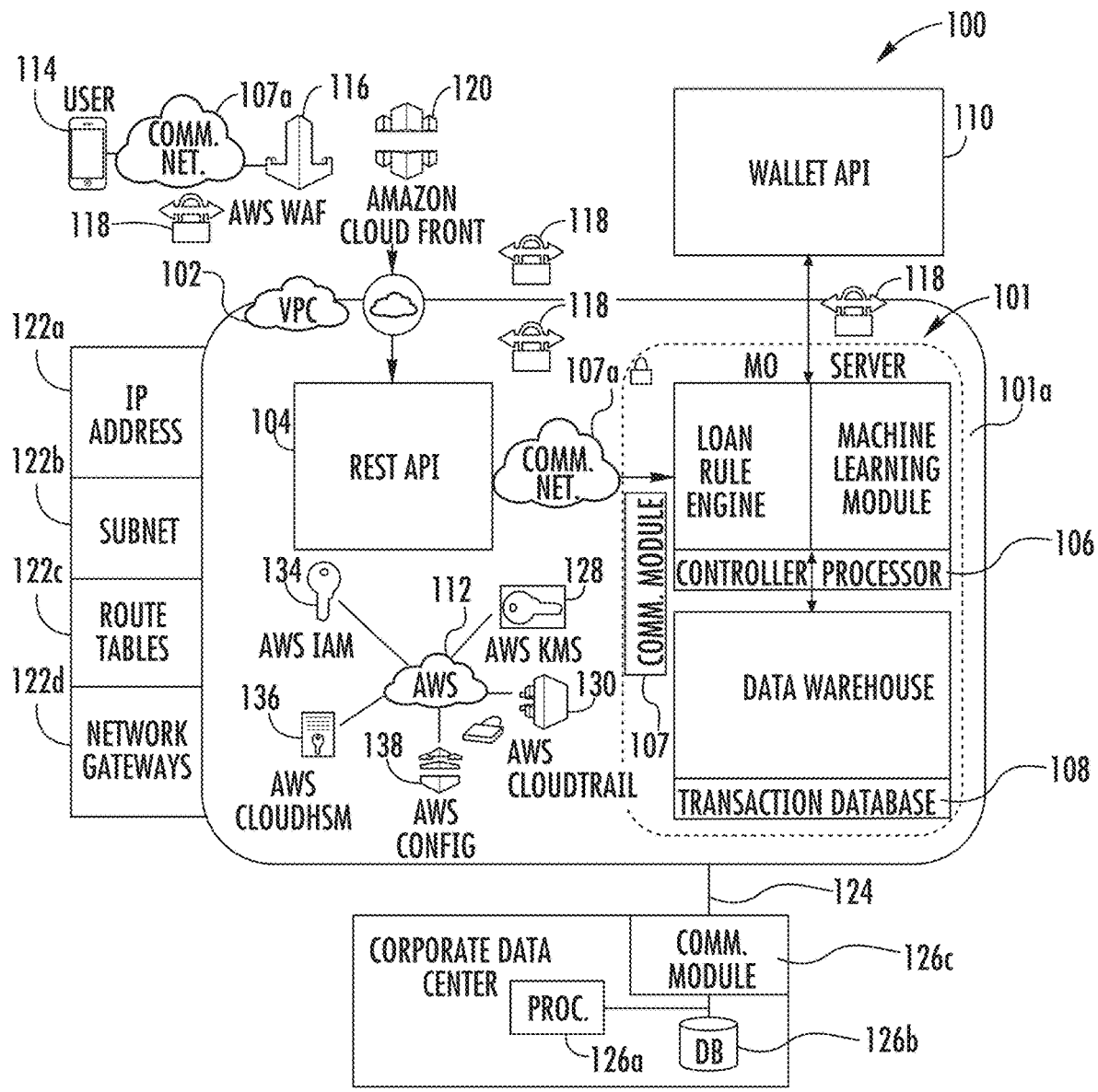
FIG. 6 is a fragmentary, block diagram showing components that may be used within the system of FIGS. 1A and 1B in accordance with a non-limiting example.

The system in the '494 patent describes machine learning used to establish loans and may be used for issuing a transaction card 32, such as a prepaid card or debit or other transaction card using publicly available information and other related information, and the artificial intelligence logic and machine learning may be applied with the systems described in FIGS. 1A, 1B, and 6.

The transaction card system 30 is operative with the transaction card 32 belonging to a customer and associated with a financial services provider or bank 36 (FIG. 1B). This transaction card 32 has a predetermined dollar limit on spending or preloaded amount. As illustrated, a first computing network 38 is configured to pull past transaction data based on a plurality of days of transactions from the financial institution or the financial services provider, such as a bank 36 to which the customer owning the transaction card 32 has an account. The financial institution 36 may be the institution that issued the transaction card 32. This first computing network 38 via a cluster computing network 40 extracts customer data features from public data sources 42 of the customer. These customer data features may include one or more of behavior variables, identity characteristics, and social relationships, which are explained in greater detail below.

This first computing network 38 in an example is configured to apply a user profile model to the past transaction data and customer data features and transform the past transaction data and customer data features into a user feature profile that summarizes the identity data, financial health, and payment capacity of the customer. The first computing network 38 updates at least every 24 hours, in an example, the most recent transaction banking data and customer data features and applies the user profile model and updates the user feature profile into a most recent user feature profile. As illustrated, the first computing network 38 includes a non-relational transactional database system 44 into which the user feature profiles, past transactional data, and customer data features are stored. This first computing network 38 also includes a cache system 46 into which the last 24 hours of customer transaction data and most recent user feature profile is held.

Interoperating with the first computing network 38 is a second computing network 48 that receives an overdraft request from the point-of-sale (POS) terminal 34 having the current declined transaction details relating to a customer transaction at the POS terminal that resulted in the POS terminal declining the transaction because of an overdraft amount on the transaction card 32 based on the customer transaction. The second computing network 48 is configured to pull from the cache system 46 of the first computing system 38 the last 24 hours, for example, of customer transaction banking data and the most recent user feature profile, and apply a machine learning approval model to the current declined transaction details, the last 24 hours of customer transaction data, and the most recent user feature profile and determine whether to approve or decline the overdraft amount on the transaction card.

This machine learning approval model is operative to generate, for example, a bad debt prediction for the customer, which may be a numerical indicia, and if the numerical indicia is below a threshold value, the overdraft on the transaction card is approved for the customer. In one example, the user feature profile includes a predictive payment capacity forecast of the customer, such as using the different machine learning algorithms described below. These forecasts may be stored within the cache system 46.

The customer data features may include behavior variables having information related to websites visited by the customer, product categories purchased by the customer, stores visited by the customer, ratings on e-commerce websites, and the consumer segment to which the customer belongs. The identity characteristics of the customer data features may include information related to home addresses, neighborhood profiles, length of present residence, education level, employment history, and educational level of the customer. The social relationships of the customer data features may include information relating to social media and photo attributes that include features inferred from image processing of public photographs found of the customer and social networks and search engines. The behavior variables, identity characteristics, and social relationships may include other data as indicated relative to the systems described herein.

The second computing network 48 may be formed as a plurality of servers in a cloud network forming a machine learning network as an artificial neural network and real-time model 49. The first computing network 38 may be formed from a first cloud-based network having a first non-relational database network 50 that stores user feature profiles and similar data and a second non-relational database network 52 that stores transaction banking data as customer transactions and the customer data features. The second computing network 48 may be formed as a second cloud-based network 53 having at least one edge device 54. The first computing network 38 may be an off-line segment and the second computing network 48 may be an on-line segment. In an example, the customer may be enrolled in an instant overdraft program operated by a third party such as part of the MOS system that approves an overdraft made on the transaction card 32.

In the transaction card system 30 described with reference to FIGS. 1A and 1B, a determination is made if an insufficient funds transaction may be approved to permit an overdraft on the transaction card 32 in real-time. The system 30 applies machine learning models 49 that can extract financial health patterns, including transaction details, pre-calculated values, and current declined transaction details to assess the risk and approve an overdraft to the transaction card, often in a few seconds. For example, an issuing bank or other financial institution 36 may have issued the transaction card 32 and the transaction card system 30 may operate similar to a second opinion once the bank has declined the transaction for which the transaction card was used. An immediate overdraft line of credit may be attached to the transaction card 32 when there are not enough funds to cover the requested transaction, and the line of credit may cover the first rejected expense. Approval may be in milliseconds without the merchant or the customer knowing that there was not enough money to cover the initial expense.

The transaction card system 30 may also be referred to as the MO system as explained relative to other drawing figures and evaluates in an example the overdraft protection based on the external data sources 42 and financial behavior, and recent transaction history from the bank 36. These factors may be pulled from the cache system 46 and may include the last 24 hours of customer transactions, and the user feature profile that may be formed from the customer data features and from publicly available information and customer transactions. This data may include the last 24 hours of predictive payment capacity forecasts. Data used in the system as described in the incorporated by reference '494 patent and the '782 and '282 applications and having many different variables may be used. The use of various resources as described in the '494 patent and '782 and '282 applications and current transaction card system 30 may offer a low latency for real-time responses and have the capability to scale and process millions of requests without any intervention that can be achieved using end-to-end computer network and cloud-based serverless infrastructure. The information sources such as the external variable sources and related data from external public data 42, financial behavior, and recent transaction history may be used to compose a characteristic feature matrix as a user feature profile that allows a quick validation of a user profile against the incoming rejected transaction, and in addition to the user feature profile, the last transaction history and information extracted from related transactions may be used to determine the overdraft and whether it should be issued and for how much.

In an example, a merchant, such as operating a merchant processor at the POS terminal 34 as shown in FIG. 1B, may receive a transaction card 32 as a debit card or prepaid card for a transaction and initially decline the transaction due to insufficient funds. The merchant will send the declined transaction details to the second computing network 48, which may operate on a real-time serverless infrastructures such as a CloudFront 53, which may include a global API operated by a third party such as the MO system, which operates the instant overdraft program to which the customer belongs. The request is sent to the nearest node as an edge location 54 to process it. The real-time machine learning overdraft model 49 may be deployed using the serverless technology and pulls the last 24 hour customer transaction banking data from the second database network 52 and the most recent user feature profile from the first database network 50, which may include the last 24 hour features and last predictions from the cache system 46, such as part of the first computing network 38 as an off-line system, and finally uses the current declined transaction details in conjunction with the previous pulled data to determine a transaction approval. The machine learning approval model sends back the response to the edge location 54 where the request came from in milliseconds and sends back the transaction response to the processor servers of the merchant or other entity or POS terminal 34.

As shown in FIG. 1B, the system 30 includes a real-time segment as the second computing network 48 and having global distributed content delivery as a CloudFront 53 such as an AWS cloud that executes the global API and machine learning approval model 49 in the nearest edge location 54 from the incoming request. The request is sent to this nearest edge location 54 where the machine learning approval model 49 is executed, and belongs to the second computing network 48 having global distributed content delivery, for example, as a CloudFront. The real-time machine learning approval model 49 may operate as part of a serverless computing cloud network in charge of approving the transaction by deploying the machine learning approval model using all required data, which due to its nature, scales automatically so it may handle millions of requests per minute. The serverless cache system 46 as illustrated as part of the first computing network 38 may operate as an in-memory data storage and is able to retrieve data with low latency. The serverless NoSQL databases 50,52 are non-relational databases where the transactions are saved and have a powerful indexation system that retrieves large amounts of data using fewer queries. These databases 50,52 have the capability to ingest large amounts of data in a fast manner even when the transactional data from banks 36 or other financial institutions may have a very different composition. The database system 44 scales on-demand if it is required.

The transactional card system 30 may include the global API or interface as a communications protocol and cooperative operating system. A global distributed content delivery network as part of the second computing network 48 may include a geographically distributed network of data centers and proxy servers and provide high availability and high performance. An example is a cloud-based network or CloudFront 53, for example, as an Amazon Web Services (AWS) cloud. Different content delivery networks may be used, including the Amazon CloudFront. Cloud computing provides an on-demand availability of computer system resources for data storage and computing power. Resources may be shared to achieve economies of scale.

Edge computing locations, such as the illustrated edge location 54, may located where end users access services located at the Cloud 53 and data at the first computing network 38 may be cached to reduce latency to end users. Edge computing locations 54 may be located in major cities across the world.

The off-line segment as the first computing network 38 includes the first database 50 that may operate as a user feature profile database, and the second database 52 may operate as a customer transactions database to store customer transactions, both as non-relational databases that interoperate with the computing cluster 40, which includes multiple processing and database capability. The financial institution 36 has transactional data that may be transmitted via a serverless system such as the Amazon web servers, as event-driven serverless computing platform 58 and may operate code in response to events and automatically manage computing resources. The transactional data of the financial institution 36 may be pulled into the customer transactions database 52, and the computing cluster 40 may process the transactions data and apply the user profile model to transform the data.

The transaction card system 30 in effect provides a second opinion when the transaction using a customer's transaction card 32 is denied. The system 30 may use the last 24-hour transactions, any publicly available information and customer transactions and determine 24 hour predictions with the machine learning to determine if the additional overdraft should be approved. If it is approved, the API may send the transaction approval using the information to the edge location that returns the transaction approval to the POS terminal 34 for the customer and the amount that has been approved. The transaction card system 30 may accomplish this in milliseconds. In an example, every 24 hours the cache system 46 may be updated. Thousands to millions of transaction cards 32 may be updated into the cache system 46 with the latest 24-hour customer transactions and any other predictions and decision values, including extracted customer data features.

The off-line segment as the first computing network 38 may include the cache system 46 and have different caches, which may cache the last 24 hours of customer transaction banking data and most recent user profile. In the example, the cache system 46 includes three separate caches labeled A, B, and C.

Figure 2:
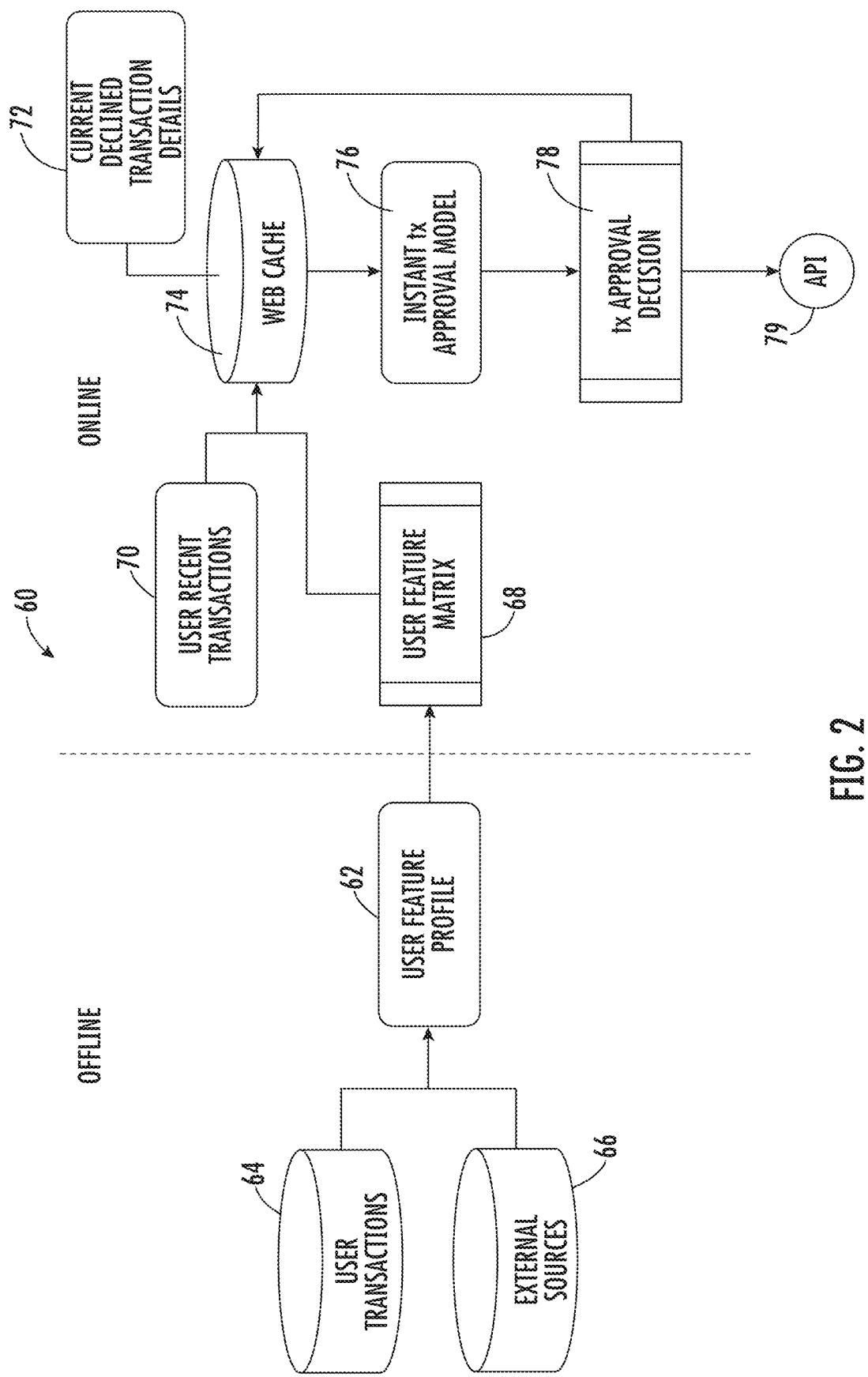
FIG. 2 is a block diagram showing a machine learning model used in the transaction card system of FIGS. 1A and 1B.

Referring now to FIG. 2, there is illustrated at 60 an example of two main components of the machine learning approval model and showing a user feature profile 62 that is executed off-line via the application of the user profile model to the user transactions as the past transaction data 64 and extracted customer data features as external sources 66 that input to form the user feature profile. Further details of the user transactions 64 and external data sources 66 have been described above and are described in further detail below. The transaction card system 30 analyzes different information sources and forms the user feature profile 62 that summarizes the most important aspects of the financial health of the customer and identifies whether the customer is financially healthy and what payment capacity the customer has. Different information sources, including the user transactions 64 and external sources of data 66, may be based upon open domain variables and the financial historical information shared by various entities. The user feature matrix 68 is a matrix of the pulled last 24 hours of customer transaction data and most recent user feature profile. Once the user has been profiled and the more important aspects captured, the machine learning approval model 60 may input other user recent transactions 70 and the current declined transaction details 72, together with the most recent feature profile, and the last 24 hour transaction details to produce a final decision on the overdraft amount. Data may input it into a web cache 74 and the machine learning approval model processed 76 and the instant approval 78 for the transaction made and then forward it to the API 79 for further transmission.

Figure 3:
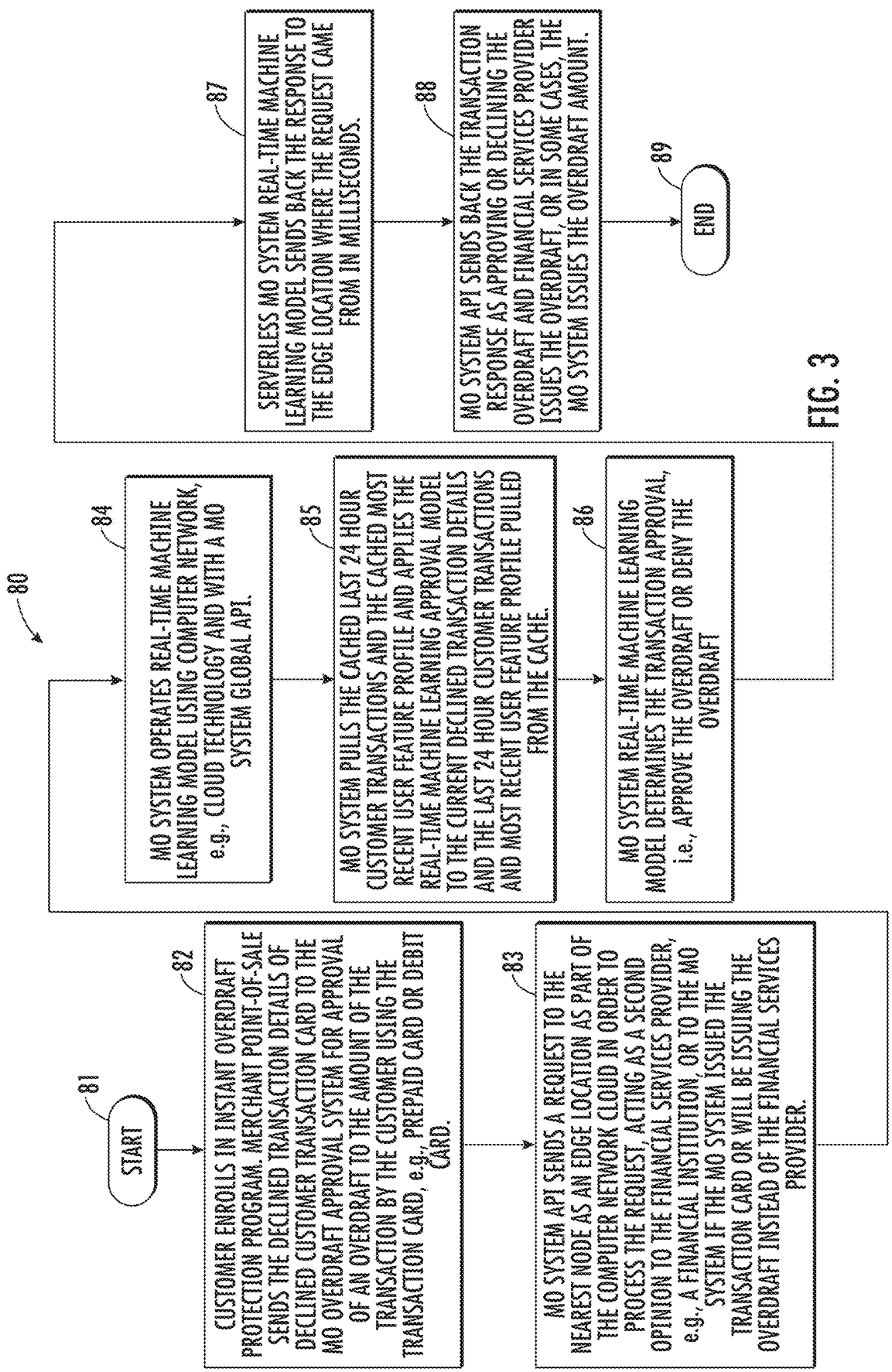
FIG. 3 is a high level flowchart showing an example sequence of operation for the transaction card system of FIGS. 1A and 1B.

FIG. 3 shows an example flow sequence for the machine learning and overdraft approval process. In this sequence illustrated generally at 80, the process may start (Block 81) and the customer enrolls in the instant overdraft protection program, where a processor or a company that issues the transaction card may enroll the end-user or customer, i.e., a client, in the instant overdraft protection program (Block 82). The merchant point-of-sale terminal sends declined transaction details of the declined customer transaction card to the MO overdraft approval system for approval of an overdraft to the amount of the transaction by the customer using the transaction card, e.g., a prepaid card or debit card.

The MO system as the overdraft approval system includes an API that may send the request to the nearest node as an edge location as part of the computer network cloud in order to process the request, acting as a second opinion to a financial services provider, such as a financial institution or bank, or the MO system as the third party, if the third party issued the card or will be issuing the overdraft instead of the financial services provider (Block 83). The MO system operates the real-time machine learning model using the computer network as cloud technology and with the MO system global API (Block 84).

The MO system real-time machine learning model pulls the cached last 24 hour customer transactions and cached most recent feature profile and applies the real-time machine learning approval model to the current declined transaction details and the last 24 hour customer transactions and most recent user feature profile pulled from the cache (Block 85).

The MO system real-time machine learning model determines the transaction approval, i.e., approve the overdraft or deny the overdraft (Block 86). In this particular example, the MO system real-time machine learning model may send back the response to the edge location where the request came from in what could be only milliseconds (Block 87). The MO system API may send back the transaction responses as approving or declining the overdraft and the financial services provider issues the overdraft, or in some cases, the MO system as the third party may issue the overdraft amount (Block 88). The process ends (Block 89).

FIG. 4 shows a screen print of an example API function for declined transactions. This corresponds to the chart shown in FIG. 5 with the various categories corresponding to the reference ID, transaction, merchant, and acquirer in the screen shot of FIG. 4. As shown in the chart of FIG. 5, the reference ID may correspond to the card identifier number such as used to identify the customer. The transaction date time may be the date of the transaction and the transaction code may represent the type of monetary transaction. The transaction amount may be the total amount of the transaction that was declined. The transaction currency code may be a code representing the currency of the transaction. The authorization code may correspond to the identification number assigned to the transaction, and it may be blank if declined. The post-date and post-time may be the date and time when the transaction was posted. The network code may correspond to the code identifying the network such as pulse, NYCE, Star, or other rails used to process the transaction. The merchant number may be the number identifying the merchant submitting the transaction. The merchant name may correspond to the name of the merchant submitting the transaction. The merchant category code may correspond to the code representing the merchant line of business. The merchant country code may be the code representing the country where the merchant is located. The chargeback flag may correspond to the chargeback code to identify the type of transaction. The requested transaction amount may correspond to the transaction amount requested by the acquirer corresponding to the cardholder. The requested transaction currency corresponds to the transaction currency reported by the acquirer. In the chart of FIG. 5, any mandatory items are given in asterisks.

Different attributes may be collected from public data sources corresponding to client features. They may be transformed into data as a user attribute string and stored with other user attribute strings and pre-approved loan amounts in the database system 44, such as in Parquet format. The system 30 may use SQL statements with the database system 44 to query attributes and acquire the relation between them with intuitive, fast processing. The different processors and servers and cloud-based processing functions may interoperate with relational attribute databases and NoSQL (non-relational) transactional database system 44 and generate user ID's associated with user attribute strings. Additional attributes may be linked to transactions made by the customer over time and especially the last 24 hours may be made and linked to a customer's user attribute string that is stored long-term in a transactional database such as the database system 44. The added transactional data may have many different attributes associated with new transactions from the customer that occurred over the last 24 hours, days, or weeks, including the user, date, type of transaction, location, and numerous other details. Trying to load this data into a relational attribute database may create an immense burden when the system 30 later is required to obtain information using a relational database engine for applying any machine learning models.

The transactional database system 44 may incorporate a WS Dynamo database that interoperates with different processors as part of its system and delivers millisecond performance at any scale to allow the transaction card system 30 to write/read huge amounts of non-structured transaction data obtained over days and weeks in an efficient manner and apply it later with the machine learning models 49. The transaction card system 30 may extract data from many different external public data sources and transform the data and load it into a relational transaction database 90, for example, as an ETL process.

As an operational example, the data may enter the system from flat text files and internal or external databases. Different AWS tools may be used to create automatic processes for extracting, transforming, and loading the information. When the source of data is an external database, the data may be consulted through an API. Data may be stored in the database system 44 in different formats, for example, in XML format. Automatic identification of data may be processed through crawlers as tools from AWS to identify the data scheme and types without expanding a large amount of time and may be accomplished automatically. After gathering and identifying a data scheme, the transaction card system 30 may clean/transform data, e.g., using a glue program and create a task for data cleaning and transformation, such as changing data format and converting numerical data via a job process. Provisioning and data management may be reduced with scaling of resources required to run an ETL job, which may be managed on a scaled-out apache spark environment. Data may be stored in Parquet format in relational attribute databases, including S3 buckets.

It is possible for the transaction card system 30 to communicate an authentication request and verify client identity and bank account data from the financial institution 36, and select and extract client data features from public data sources 42, including: 1) behavior variables, 2) identity characteristics, and 3) social relationships as explained above. It is possible to generate private access tokens and use computing endpoints 91 to obtain client transaction data. Different computing endpoints 91 may track transactions of a client over time, such as over 24 hour periods, and extract and update client data features and client transaction data, which can be processed and transformed into new and updated client data features and client transaction data.

It is possible to use Open Location Code (OLC) as part of a geocode system and generate a Plus code, which is a technique of encoding a location into a ten-digit data string, which is a form that is easier to use than coordinates in the usual form of latitude and longitude. Some of the public data obtained with the transaction card system 30 may be geographically relevant, and for every point on Earth, there may exist a Plus code associated with it that may have a prediction up to area of about 14×14 meters. There may be some pre-calculation of public variables, and they may be assigned to corresponding Plus codes. The transaction card system 30 may be able to relate this to a customer's personal information. For example, when the transaction card system 30 obtains the customer's personal data, including an address, the transaction card system may transform the address into coordinates and the system obtains the Plus code for that coordinate.

Because it may be difficult to make a single and normal query to obtain all the public variables assigned to a given Plus code, the query may be a string comparison. Some data may be obtained in JSON format. Computing endpoints 91 may impart computational efficiency because specific data is extracted to be a specific computing endpoint. For example, for transactions over time, only new transactions may be required and the computing endpoints 91 may be separated to avoid overload of any machine learning process by ingesting only required data and improving calculation time. For example, an authorization computing endpoint may obtain a customer's bank information and ACH data such as in account number, routing number, and other data for the customer banking account that may be used. A transaction computing endpoint may obtain the past transactions such as 30 days or last 24 hours from a customer. A balance computing endpoint may obtain available balances from the customer's bank account or multiple bank accounts. An identity computing endpoint may retrieve personal information stored at a banking institution hosting a customer banking account. It is possible to use POST and JSON programming functions. Web hooks may be applied.

The database network 44 may include a powerful indexation system in association with the cluster 40 shown in FIG. 1B, which retrieves large amounts of data using fewer queries. It may input massive amounts of data quickly even when the transactional data from the bank or other financial institution 36 could have a very different composition. As the machine learning model functions, the transaction card system 30 may scale on-demand if it is required. The database network 44 may operate in a cloud or serverless environment and interoperate with the cache system 46 as an in-memory data storage and may be operable to retrieve all required data with a low latency.

The transaction card system 30 operates also as an API with the cluster 40 and other processing systems associated with the first and second computing networks 38,40. As illustrated and described before, the transactional data from the financial institution 36 may be pulled as banking data through an event driven, computing platform, which may be part of the cloud and processor functions 58 and into the customer transaction and NoSQL databases. Customer transactions may be saved together with publicly available data that may have been used to make a loan and issue the transaction card. Data may be obtained and imported via the cluster 40. Decision values may be updated every 24 hours and stored again in the database network 44 and the last 24 hour transactions, decision values, and any predictors cached in the cache system 46.

The database network 44 may allow storage and retrieval of data that is modeled in a manner other than the tabular relations used in relational databases and provides simplicity of design without the "impedance mismatch" between the object-oriented approach to write applications and the schema-based tables and rows of a relational database. It is possible that customer data such as used for the transactions, any latest predictions, and any decision values may be stored in one document as opposed to having to join many tables together. There may be better horizontal scaling to clusters of machines and final control over the data availability.

Key-value pairs may be used to store several related items in one "row" of data in the same table. For example, a non-relational table for the same bank or financial institution 36 may have each row, including customer details and account, loan and other information obtained and used by the transaction card system 30. All data relating to that one customer having the transaction card 32 issued to them may be conveniently stored together as one record. Data may be distributed across many different servers. Serialized arrays may be stored in JSON objects and records may be stored in the same collection having different fields or attributes.

It is possible that the database network 44 may include an object database and store the data and objects to replicate or modify existing objects to make new objects, such as data relating to the decision values and customer predictions. Different serverless databases may be used, and in an example, a Dynamo database (DynamoDB) may operate as a managed NoSQL database service as part of the database network 44. It may be straightforward to store and retrieve different amounts of data and serve many levels of requested traffic. The transaction card system 30 and associated API and database network 44 may support key-value and document data structures, and a database network 44 service may rely on the throughput rather than storage. A table may feature items that have attributes that form a primary key in an example as related to the customer transactions in a customer transactions database 52 and decision values such as publicly available information as stored in a decision values database 50. The transaction card system 30 may issue queries directly to indices, such as a global secondary index feature as a partition key and the local secondary index feature. Hashing may be used to manage data and the data distributed into different partitions by hashing on the partition key. The database network 44 structure may have no service to provision, patch or manage. The transaction card system 30 may scale tables up and down to adjust for capacity and maintain performance.

The transaction card system 30 may use an accelerator and in-memory cache system 46, such as an in-memory data store and cache system where the cache is placed between the application and its database tier. On-demand cache nodes or reserved cache notes may be used for on-demand nodes and provide cash capacity by the hour or reserve nodes with a more extended commitment. An example is an elastic cache.

The cache system 46 may store any last 24-hour predictions and client features for a specific transaction card 32 owned by a customer, the last 24-hour transactions of that specific transaction card for the customer and pulled from the customer transactions database 52, and the last current declined transaction details from the POS terminal 34, and include publicly available information. The last 24-hour transactions may be obtained and pulled from the customer transactions database 52. The processing cluster 40 may pull data from the customer transactions database and publicly available information and calculate decision values every 24 hours, and store the decision values in the database. Initial data sources may include the bank's transactional data that is pulled as transactional banking data by the transaction card system 30 and by the Lambda service 58, that runs in response to events and automatically manages the computing resources. The transaction card system 30 may permit image and object uploads and updates to the customer transactions database by responding to inputs and provision back-end services and custom http requests.

Figure 5A:
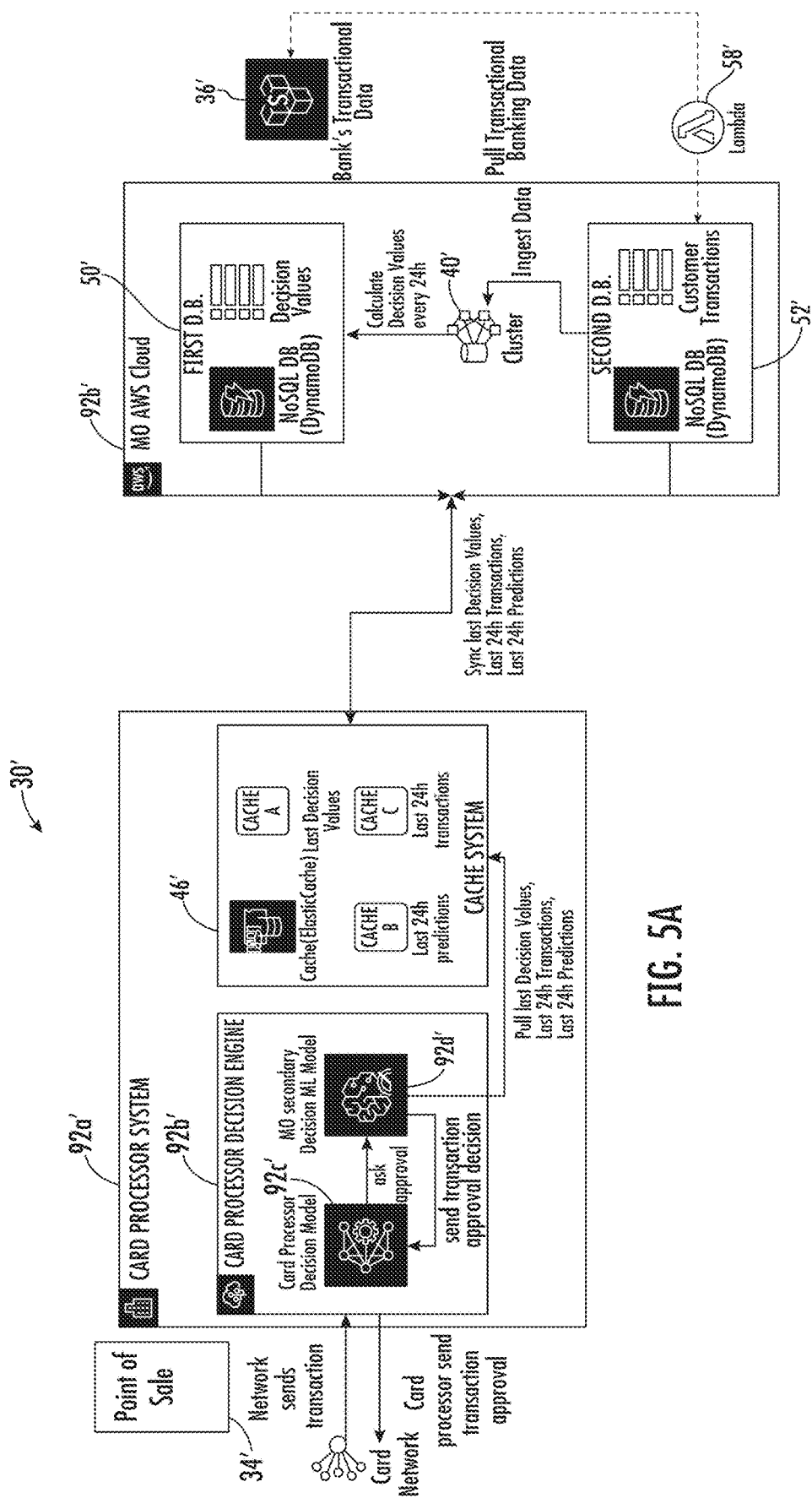
FIG. 5A is a block diagram of a second embodiment of the transaction card system showing the machine learning model deployed directly onto a card processor.

Referring now to FIG. 5A, there is illustrated another embodiment of the transaction card system 30' showing a card processor system 92a' and the MO system AWS cloud 92b' similar to the first computing network of the system of FIG. 1A. Prime notation is given to those elements that are common to the elements shown in FIG. 1B, while some of the elements are not shown but would be included within the system 30'.

This transaction card system 30' includes the card processor system 92a' the cache system 46' that includes the cache A that has the last decision values and the cache B for the last 24 hour predictions and cache C as a last 24 hour transactions. The card processor decision engine 92b' includes a card processor decision model 92c' and a MO secondary decision machine learning model 92d', which will pull the last decision values and last 24 hour transactions and predictions from the cache system 46'. The MO secondary decision machine learning model 92d' sends transaction approval decisions to the card processor decision model 92c'. The card network 34' corresponds for example, to a point-of-sale terminal of FIG. 1B.

As noted before, the process of approving a transaction may include three basic steps as defined generally by the system of FIGS. 1A and 1B, where the system obtains the customer data from a bank using an off-line process and processes those transactions in order to calculate decision values to be used in the prediction. The final step may be gathering the declined transaction data and in conjunction with the pre-calculated values, running the machine learning model and approving or declining the request. Sometimes very large card processors, such as MasterCard, cannot afford to introduce another call to an external service due to several factors: time, policies, security, and similar factors. To tackle this major issue, the last step may be sent to the processor decision engine. For example, the processor may be given a predictive model transformed into linear formulas, and implemented using the same programming language as the loan credit engine. There may still be a pre-calculation of decision values, but these values may be previously transferred to the engine using SFTP or an API. It does not have to be in real time. As a result, there are similarities, but the machine learning model may be deployed at the card processor end and include a scheme where there is no need for deploying global real-time API. Instead, pre-calculated values may be provided and the same data from the declined transaction may be used. The processor may make a decision by using the model. The pros about this solution are that the decision processing would be faster because the processor does not need to make an external API call, and thus, would have fewer calls, and mean fewer issues. This shipping may require major level customization.

Figure 5B:
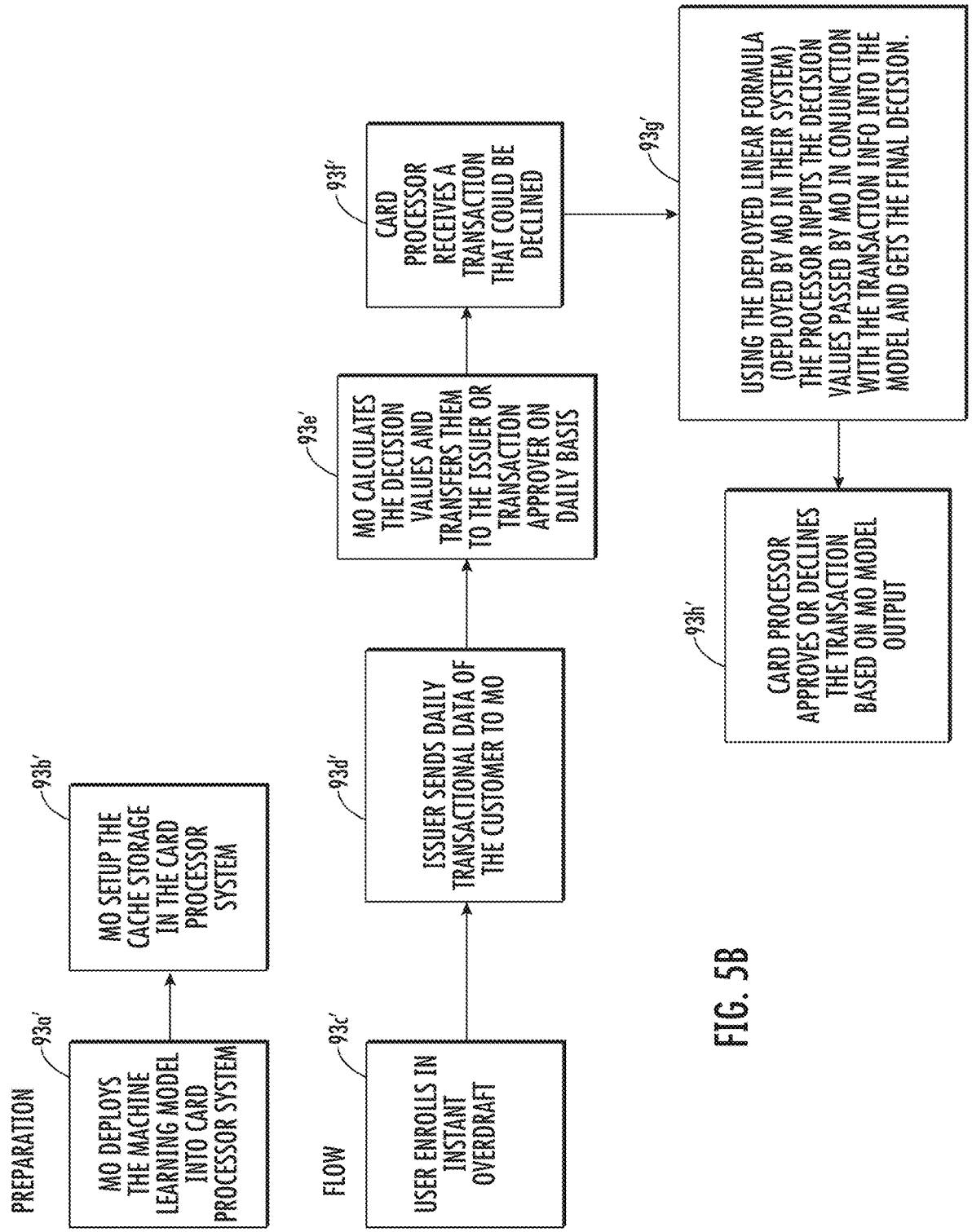
FIG. 5B is a block diagram showing preparation and flow sequences for the transaction card system of FIG. 5A.

As shown in FIG. 5B, the system 30' of FIG. 5A may prepare such that the MO system deploys the machine learning model into a card processor system as shown (Block 93a'). The MO system sets up the cache storage in the card processor system (Block 93b'). The user enrolls in the instant overdraft system for the card (Block 93e). The card issuer sends the daily transactional data of the customer to the MO system (Block 93d'). The MO system calculates the decision values and transfers them to the issuer or transaction approval on a daily basis (Block 93e'). The card processor receives a transaction that could be declined (Block 93f'). Using the linear formula such as deployed by the MO system, the processor inputs a decision value passed by the MO system in conjunction with the transaction information into the model and obtains the final decision (Block 93g'). The card processor approves or declines the transaction based on the MO model output (Block 93h').

The transaction card system 30 as described above and having overdraft capability may use the operative components of the system as described in the commonly assigned and copending '782 and '282 applications, and commonly assigned '494 patent. There now follows a description of such systems, which may be used to initially issue the transaction card.

That system may include a credit approval and loan issuance platform that allows nano and micro credit and pre-scoring for use at a customer's mobile wireless communications device or web portal or related software platform. It may be used to issue the transaction card 32 or serve as an adjunct to a banking institution that issues transaction cards. When the MO system issues a loan or transaction card or operates as an adjunct to an institution issuing the transaction card, it may operate as a credit evaluation system that overcomes those disadvantages of existing systems that require personal and often confidential information such as names, surnames, social security numbers, credit and/or debit card information, and even a complete credit history of the user although that information may be used. A customer can be rated whose credit worthiness is difficult to understand, such as young people, renters and persons with smaller incomes. In an example, pre-scoring, such as done when initially making a loan, may be accomplished based on user transaction data at a platform such as an e-wallet or other transactional platform, e.g., Uber, Facebook, eBay, or similar platforms. The data may be based on the user location, gender, age range, cellular operator and cellular phone model as non-limiting examples.

A credit decision engine or machine learning model may be operative as a loan rule engine and may use machine learning data behavior analysis and predictive mathematical models. A credit scoring algorithm as part of the loan rule engine may adjust scoring continuously based on data correlation in order to optimize the value of the maximum loan issuance and the maximum number of loans that are issued to a customer, for example, as a factor of a minimum bad debt value. These decisions can be applied to transaction card issuance. When initial loans are made, data may be managed to allow pre-scoring in order to optimize a customer's experience and return loan and credit decisions in a few seconds, e.g., a maximum of 20 seconds. This anonymous analysis approach removes any requirement for the customer to input information and results in a more simple and efficient framework using, for example, UNIX based systems having different design patterns, such as a Model-View-Controller (MVC). It is platform independent and supports different client agents for an enhanced customer experience.

The MO system is a complete system architecture and platform that may include a MO server and processors or API operative as a loan rule engine and operative with databases that are integrated with the MO server or separate databases and operative as a data warehouse. The system may be hosted by a cloud service. Other system components may include an e-wallet associated with the customer, an application API and application database. The loan rule engine may operate as a credit decision engine. Much of the logic as will be described may be used with the transaction card system described above.

The MO system may analyze transactional data from an e-wallet or other hosting application and combines this information with data from external data sources to assign a maximum credit, including to determine an overdraft amount. This may include a smaller amount such as useful with nano and micro-loans. The MO system may be integrated with an e-wallet such as incorporated with mobile device applications or a hosting application in a web portal. The MO system when initially making a loan is user friendly and intuitive, using in one example a maximum of three clicks or entries on a mobile device or other device to obtain a loan and disbursement, including onto a transaction card such as a prepaid card or debit card. The customer may not need to provide any additional detailed information. The credit decision, such as an overdraft decision, may be based on transactional data and the data from external sources that the MO system automatically collects. An advantage of the system is that in many cases, the user is already pre-approved. Once requested, the loan is credited to the e-wallet or hosting application in less than one minute or transaction card issued or the overdraft allowed.

When initially making a loan or issuing a transaction card, the MO system may support three credit types as proactive, reactive and corporate, and supports three disbursement types as unrestricted, restricted and direct bill payment. The MO system may include a Customer Communication Manager (CCM) as part of the MO server to manage the messaging to different customers. It is available 24/7 so that a user can request a loan anytime and anywhere.

In an example, an initial set of data may be obtained from at least one of an electronic wallet (e-wallet) of the consumer and public data sources containing data about the consumer. The initial set of data may include non-identification attributes of the consumer and identification attributes, which may or may not include a full name, a credit card number, a passport number, or a government issued ID number that allows identification of the consumer. The MO system may randomly generate at the loan issuance server a user ID number that matches the initial set of data that had been acquired about the consumer and store the initial set of data and user ID number corresponding to the consumer in the transaction database as a user profile.

A credit score may be based on the average credit among a plurality of customer or user profiles stored within a transaction database, and by matching a data attribute string based on the user ID number and the initial set of data to determine a maximum allowed credit for the consumer. An initial loan may be approved based on the maximum allowed credit of the consumer. In an example of the card transaction system 30, approval is performed automatically. A behavioral profile for the consumer may be generated based on the consumer location and check-ins to at least one of the e-wallet and the loan issuance server and further correlate periodic location patterns to loan and transactional activities.

A behavioral profile may be generated using a customer conversation modeling or a multi-threaded analysis or any combination thereof. The behavioral profile may be based on consumer segmentation with consumer information provided via the contents of each transaction and using affinity and purchase path analysis to identify products that sell in conjunction with each other depending on promotional and seasonal basis and linking between purchases over time. If a transaction card is issued by a bank, this data is stored by the bank as transactional data, which the MO system may use.

The consumer check-ins and location for a consumer may be matched against a known-locations database that includes data regarding stores, private locations, public places and transaction data and correlating periodic location patterns to loan and transactional activities, especially with the transaction card. It is possible to predict by consumer profile and periodicity, loan disbursement patterns, use of loans, loan repayments, and transaction activities.

Non-identification attributes the MO system may use include the location, including zip code, phone type, and cellular operator. It is possible to transmit the maximum credit via the API to the e-wallet that is tagged with the randomly generated user ID number, matching the user ID number to the actual customer, and adding new attributes to the customer and crediting a loan to the e-wallet for the customer or issue a transaction card. In response to receiving a loan approval code, the customer may access at least one API screen on a mobile wireless communications device and enters data indicative of the value of the loan to be made or transaction card to be issued and transmit that data to the MO system to obtain the loan or a transaction card in the example of the transaction card system to obtain a loan.

As noted before, the MO system may determine when the customer requires an increase in the maximum allowed credit and the risk involved with increasing the maximum allowed credit, including for an overdraft on the transaction card. A due date for repayment of the loan, such as the overdraft, may be established and the MO system may store loan data about repeated loan transactions with the consumer that includes loan repayment data for each loan. Based on that stored consumer loan data, the MO system may apply a machine learning model to the customer loan data and other data as explained relative to the transaction card system 30 of FIGS. 1A and 1B, and determine when the consumer requires an increase in the maximum allowed credit and the risk involved with increasing the maximum allowed credit such as an overdraft. This logic may be applied to increasing overdraft capability of the transaction card system 30 of FIGS. 1A and 1B.

In an example, a regression model may have a moving window that takes into account mean, standard deviation, median, kurtosis and skewness, past input/output data may be input to the machine learning model. This past input/output data may include a vector for the input relating the past consumer loan data and an output relating to a probability between 0 and 1 that indicates whether a consumer will fall into bad debt. In yet another example, a probability greater than 0.6 may be indicative of a high risk that a consumer will fall into bad debt. The target variable outcome from the machine learning model may comprise a binary outcome that indicates whether it a consumer will be a risk of bad debt within seven days.

The MO system may include collecting the consumer loan data over a period of six months and classifying consumers in two classes as: (1) a bad client having a high risk probability of falling into bad debt, and (2) a good client having a low risk probability of falling into bad debt. That information may be saved into the database network 44 of FIG. 1B. The system 30 may further generate a behavioral profile for the consumer based on the consumer location and check-ins to at least one of the e-wallet and the loan issuance server and further correlate periodic location patterns to loan and transactional activities and predict by consumer profile and periodicity the loan disbursement patterns, use of loans, loan repayments, and transaction activities.

The method may further include generating the behavioral profile based on consumer segmentation with consumer information provided via the contents of each transaction and using affinity and purchase path analysis to identify products that sell in conjunction with each other depending on promotional and seasonal basis and linking between purchases over time.

For reference, the MO system as described in the incorporated by reference '782 and '282 applications, and commonly assigned '494 patent, is described with reference to FIG. 6, which illustrates a high-level block diagram showing basic components of the networked system indicated generally at 100 and includes the MO System 101 or API that includes a MO server 101a also corresponding to the loan or card issuance server and may have components associated with a Virtual Private Cloud (VPC) 102, including a REST API 104 and provides interoperability between computer systems on the internet allowing systems to access and manipulate textual information. The MO server 101 may include a processor as a controller 106 with other circuit components, including software and/or firmware operative as a Local Rule Engine and an integrated or separate transactional database that may be a sub-component or include a Data Warehouse 108 that could be incorporated with or separate from the MO server 101a. It should be understood that the processing of the MO server in an example, such as in FIG. 6, is part of a cloud based service as described with reference to FIGS. 6-10.

The MO server 101 may also be referred to as the MO system as part of a serverless network and includes the processor as a controller 106 that may also include a machine learning module that is operative to have the processor apply a machine learning model to any stored consumer loan data and determine when the consumer requires an increase in the maximum allowed credit and the risk involved with increasing the maximum allowed credit such as for an overdraft on the transaction card. Different transactions of the consumer as a client or customer can be stored in the data warehouse and different transactions reflecting the different transactions performed by the consumer as a client and their past history. This information can be stored and later the MO system machine learning model as part of the MO system API applied to that stored consumer loan data and determine when the consumer requires an increase in the maximum allowed credit and the risk involved with increasing the maximum allowed credit, for example, the overdraft on a transaction card. Further aspects of the machine learning module that applies the machine learning model are explained below such as use of a regression model having the moving window that may take into account mean, standard deviation, median, kurtosis, and skewness.

A communications module 107 is operative with the controller 106 and communications with a communications network 107a, such as a wireless network. However, the module 107 could operate as a landline based, WiFi, or other communications protocol. The controller and Local Rule Engine 106 interfaces with a wallet API corresponding to an e-wallet application 110. The Amazon Web Services (AWS) 112 is described in a non-limiting example may be integrated with the MO system 101 with the API operating with a CloudFront, but other types of network systems could be implemented and used besides the AWS. The user as a consumer for the loan may operate their mobile device 114 and its application with an interface to the Amazon Web Services Web Application Firewall (AWS WAF) 116 to protect web applications from common web exploits and provide security as shown by the secure lock logo 118, which includes appropriate code and/or hardware components to protect against compromising security breaches and other occurrences or data breaches that consume excessive resources. The MO system 101 may control which data traffic to allow, may block web applications, and may define customizable web security rules. Custom rules for different time frames and applications may be created. The system operator of the MO system 101 may use an API such as associated with the transaction card system in FIGS. 1A and 1B or that of FIG. 6 to automate any creation and deployment of improvements, system operation, and maintenance web security rules.

The AWS WAF 116 in an example is integrated with an Amazon CloudFront 120, which typically includes an application load balancer (ALB). The CloudFront 120 operates as a web service to permit effective distribution of data with low latency and high data transfer speeds. Other types of web service systems may be used. The Amazon CloudFront 120 interoperates with the Virtual Private Cloud (VPC) 102 and provisions logically isolated sections of the CloudFront 120 in order to launch various resources in a virtual network that the MO system 101 defines. This allows control over the virtual networking environment, including IP address ranges 122a, subnets 122b and configurations for route tables 122c and network gateways 122d. A hardware VPN connection 124 could exist between a corporate data center 126 and the MO system's Virtual Private Cloud 102 and leverage the AWS CloudFront as an extension of a corporate data center. The corporate data center 126 may include appropriate servers or processors 126a, databases 126b, and communications modules 126c that communicate with the MO server corresponding to the MO system 101, which in a non-limiting example, could incorporate the corporate data center.

As part of the Virtual Private Cloud 102 is the Representational State Transfer (REST) Application Programming Interface (API) 104 that provides interoperability among computer systems on the Internet and permits different data requesting systems to access and manipulate representations of web resources using a uniform and predefined set of stateless operations. The Amazon Web Services 112 may interoperate with the AWS Key Management Service (KMS) 128 and manage encryption and provide key storage, management and auditing to encrypt data across the AWS services. The AWS CloudTrail 130 records API calls made on the account and delivers log files, for example, to an "S3" bucket or database as a cloud storage in one example with one or more databases such as could be part of the data warehouse 108 operative as the transaction database and provides visibility of the user activity since it records the API calls made on the account of the MO system 101. The CloudTrail 130 may record information about each API call, including the name of the API, the identity of the caller, the time and different parameters that may be requested or response elements returned by the service in order to track changes made to AWS resources and determine greater security and identity of users.

The AWS Identity and Access Management (IAM) 134 will permit the MO system 101 to control individual and group access in a secure manner and create and manage user identities and grant permissions for those users to access the different resources. The AWS Cloud HSM service 136 permits compliance with different requirements, including data security using a hardware security module appliance within the cloud. It may help manage cryptographic keys. The AWS CONFIG module 138 permits compliance auditing, security analysis, change management, and operational troubleshooting. The different resources may be inventoried with changes in configurations and reviewed relationships. The REST API 104 interoperates with the Loan Rule Engine as part of the controller 106 and Data Warehouse 108 of the MO system 101.

Figure 7:
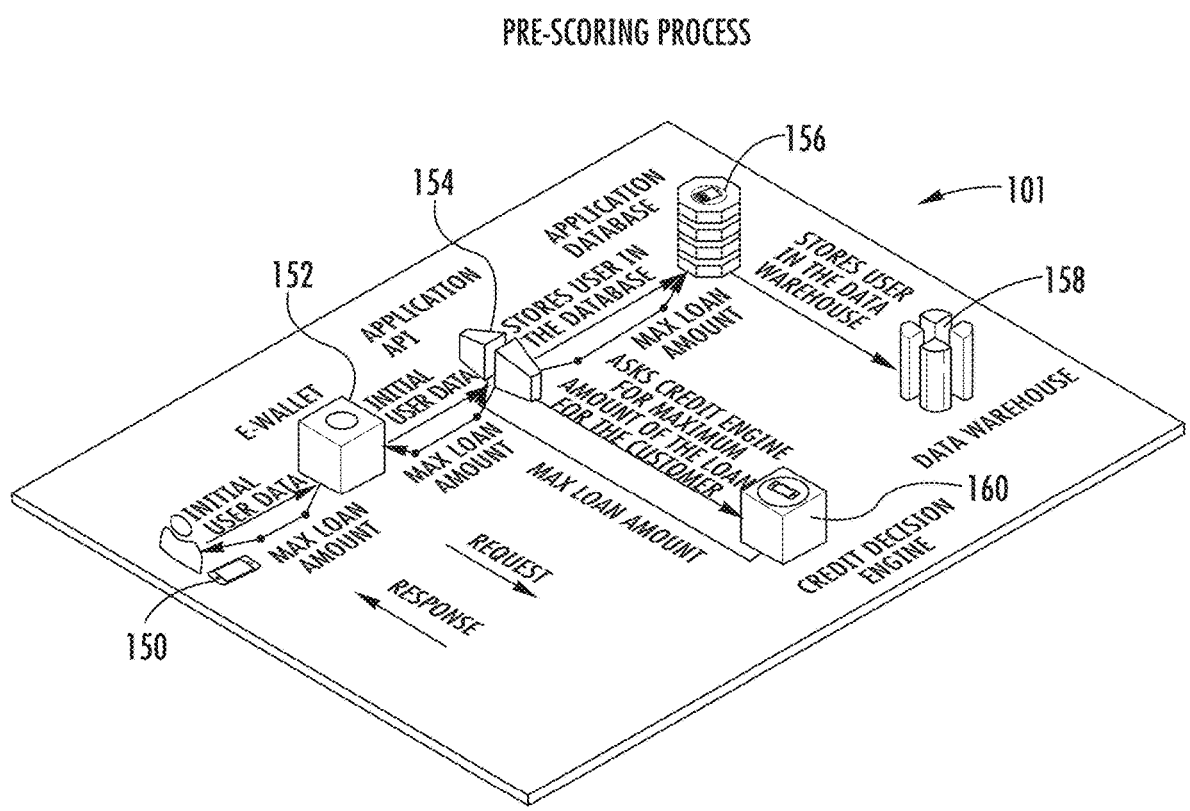
FIG. 7 is a fragmentary block flow diagram showing data flow for a pre-scoring process that may be used in conjunction with the systems of FIGS. 1A, 1B, and 6.
Figure 8:
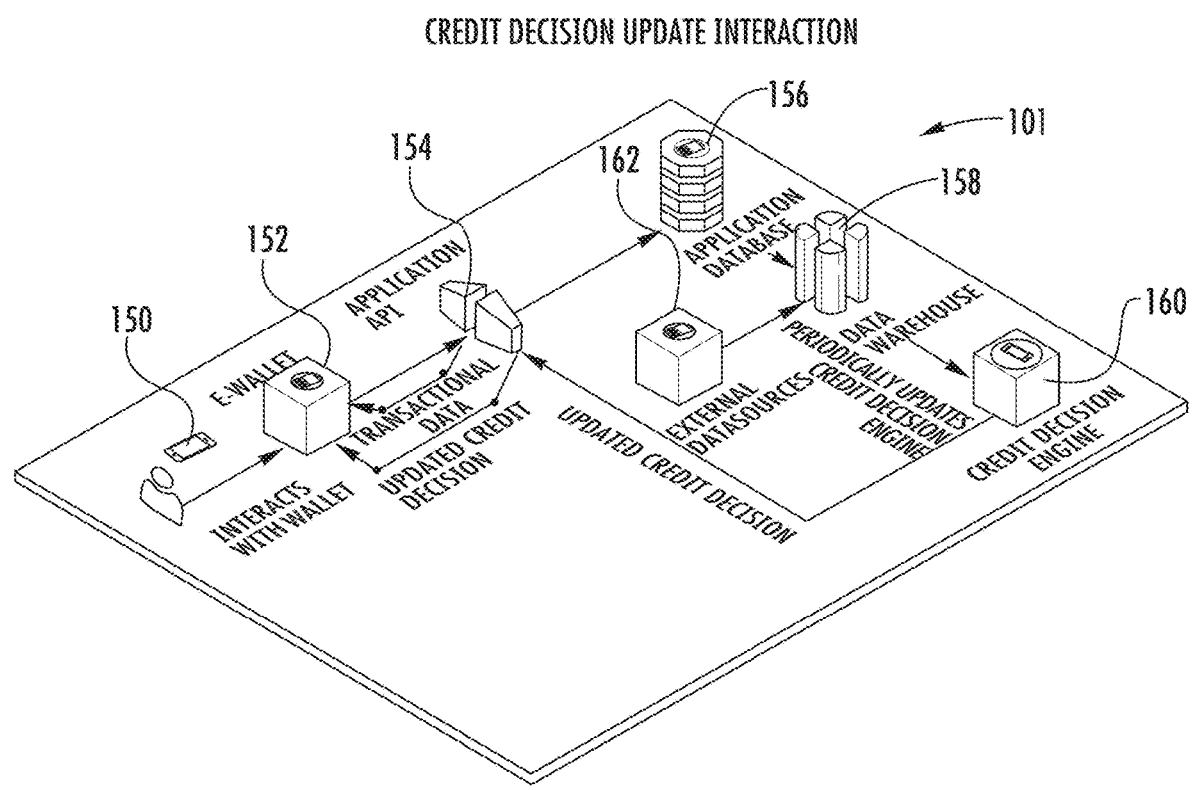
FIG. 8 is a fragmentary block flow diagram showing data flow among system components for a credit decision update that may be used in conjunction with the systems of FIGS. 1A, 1B, and 6.

The MO system 101 may operate in one non-limiting example in a two-phase approach. FIGS. 7 and 8 show components used with a respective pre-scoring process (FIG. 7) and credit decision update interaction (FIG. 8). Basic components are described with new reference numerals and shown in FIG. 7 as the user device 150 interoperating with the e-wallet 152 and application API 154 as part of the application to interface with the MO system 101 and obtain a loan such as the transaction card, and an application database 156, which interoperates with the data warehouse 158. The application API 154 interoperates with a credit decision engine 160 that may correspond to the loan rule engine 106 as shown in FIG. 6. Many of the modules/components could be incorporated within the same MO server or be separate and incorporated with serverless technology as described relative to FIG. 6 and the transaction card system 30 shown in FIGS. 1A and 1B. The data warehouse 158 may correspond to the data warehouse 108 in FIG. 6. The application database 156 could be separate or integrated with the date warehouse and could include non-relational components as described relative to the transaction card system of FIGS. 1A and 1B. Some relational databases may be used. Initial data from a consumer could be stored initially in the application database 156, and could even be a more dynamic and shorter term memory than the data warehouse. Other units in FIG. 6 may correspond respectively to various components such as the e-wallet 110 of FIG. 6 to the e-wallet 152 in FIG. 7 and the application database 156 may correspond to a portion of the data warehouse 158 or be a separate database as part of the Virtual Private Cloud 102, but in some cases, still component parts of the MO system 101 and MO server.

Figure 9:
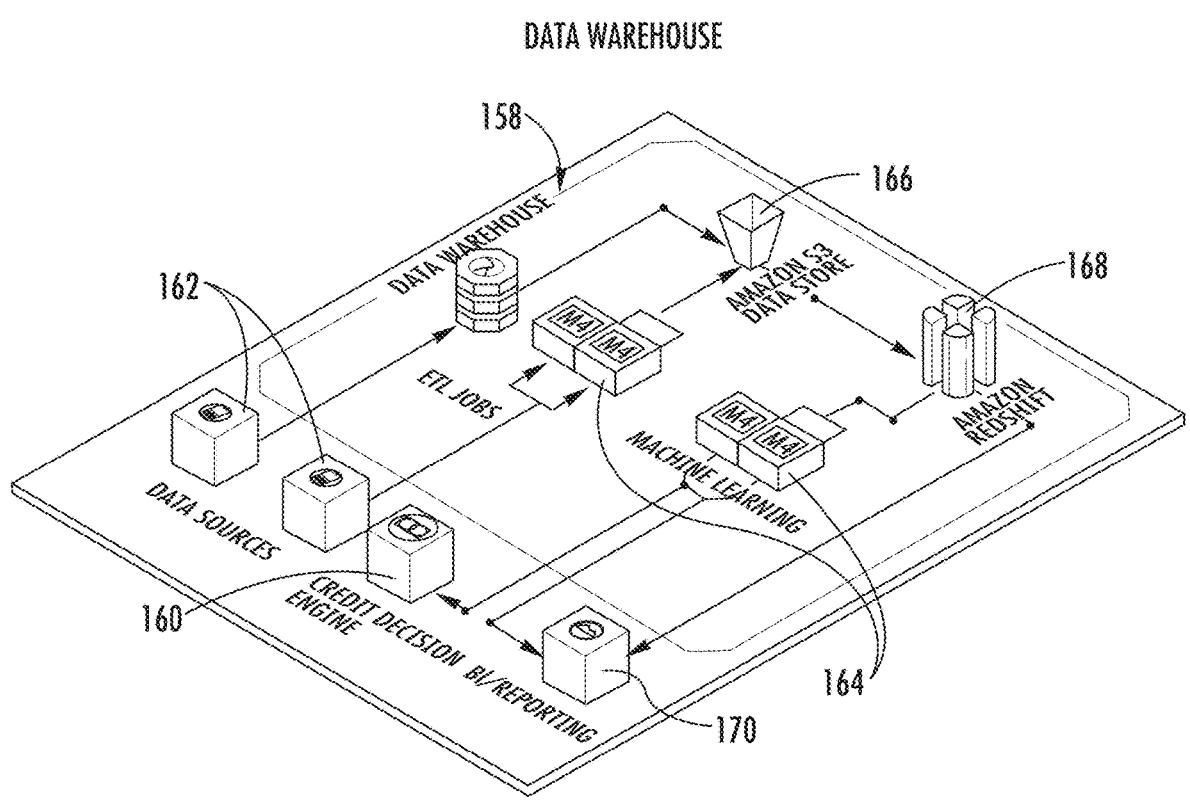
FIG. 9 is a fragmentary block flow diagram showing data flow among components in the data warehouse that may be used in conjunction with the systems of FIGS. 1A, 1B, and 6.

Referring now to FIG. 8, there is shown a similar view of the credit decision update interaction, but also showing the external data sources 162. Referring now to FIG. 9, the data warehouse 158 receives data from data sources 162 that interoperate with ETL (extract, transform, load) jobs and machine learning components 164 that in turn interoperate with a data store such as the Amazon simple cloud storage service (S3) 166, and in a non-limiting example, Amazon Redshift as an internet data warehouse service 168. These components via machine learning interoperate with the business intelligence reporting module 170. In this process, it is possible to analyze data using a SQL (Structural Query Language) and existing business intelligent tools to create tables and columns with the most accurate data types and detect schema changes and keep the tables up-to-date. Many dozens of data inputs can be connected and mash ups may be created to analyze transactional and user data. It is possible to use both relational and non-relational databases depending on the types of data, but as explained relative to FIGS. 1A and 1B for the transaction card system, and the system of FIG. 6, the non-relational database is preferred for the data as described.

In the first phase generally shown by the flow sequence in FIG. 7, when a user 150 initially signs-in to the e-wallet 152 or other transactional application platform connected to the MO system 101, the system via the processing of the engine 160 generates a first pre-approved maximum credit typically based on the initial set of data. This first credit decision may typically be made within 20 seconds from the user data being passed to the system and may be used to issue the transaction card.

In the second phase generally shown by the flow sequence in FIG. 8, after the user data is initially stored in the data warehouse 158 and is assigned an initial maximum credit, the MO system 101 starts acquiring transactional and external data to update the maximum credit periodically, and thus, may be used to update the cache shown in FIG. 6. The end user cannot never request a loan, but can only request a release of loan funds up to the maximum credit pre-approved and set by the MO system 101, such as released onto a transaction card.

Phase 1: Initial User Profile Generation and Maximum Credit

The system credit scoring engine 160, which may be part of the controller 106 (FIG. 6) and data warehouse 158 acquire an initial set of user data via the application API 154 with the source e-wallet 152 or transactional application.

As illustrated in the flow sequence of FIG. 7, the user 150 communicates with the e-wallet 152 and communicates initial user data with the application API 154, such as implemented by the MO system 101, which could be part of the API in the serverless system, and could be the application brought up on the mobile device or accessed via a web portal. This data is stored in the application database 156 and in the data warehouse 158. Based on the initial user data, the user makes a request for credit and the application API 154 queries the credit (or loan) engine 160 for the maximum amount of the loan that may be made to the customer (user) and returns that data on the maximum loan amount. Based on this initial request, the response for the maximum loan amount is returned to the user mobile device 150, or as an example, web portal depending on how the user contacts the MO system. This maximum loan amount information is also transferred from the application API 154 to the application database 156 and stored in the data warehouse 158. Of course, a transaction card may be used.

This initial set of data may be retrieved from the initial communications with the user data from external databases based on the external data sources and may include the location, including zip code, phone type, cellular operator, and a randomly generated user ID that uniquely matches this data set to a physical user in the e-wallet 152 and in the transactional application database 156.

An example of the initial data structure generated for each user is: user ID; Attribute 1; Attribute 2; Attribute 3; Attribute 4; . . . ; Attribute N. The system uses this initial attribute string to generate an immediate credit score for this user, by matching this user attribute string to the user's database and applying the maximum credit score for the user profile, calculated as the average credit among all user profiles matching the initial set of attributes.

Initial user ID: N attributes
a) Users Database Match:
Filter by users that match the same N attributes values: X user profile with N+Y to Z attributes;
b) Maximum Credit Calculation:
Average value of Maximum Credit for user profiles with N+Y to Z attributes;
Correlation and probability of repay loan prediction for user profiles with N+Y to Z attributes; and
Apply business rules.

The maximum credit calculated for that user is then sent via the MO system API 154 to the e-wallet 152 and then the transactional or application API 154 is tagged with the randomly generated User ID number. The e-wallet 152 and "transactional" API application 154 then matches the user ID to the actual physical user operating with the MO system 101 and to this user the maximum credit value is a Pre-Approved Credit.

The above process, from initial acquisition of user data, to communication of the maximum credit for the user, may take approximately 20 seconds in typical cases.

Phase 2: User Profile Data Expansion

Once the new user is recorded in the Data Warehouse 158, and the initial Maximum Credit score generated, the MO system 101 initiates the process of adding and computing new attributes to the user profile using the loan activities and acquiring all transactional data from the e-wallet 152 and transactional application API 154. In this example, the user transactional data may be imported from the e-wallet 152 and transactional application API 154 once every X hours.

The MO system 101 will also match relevant external attributes to the user profile. The MO system 101 may generate a database of external data that are imported from a variety of public domain sources as the external data sources 162 in an example. This external data is continuously updated and correlated to the users linking to their initial generic attributes, e.g., location linked attributes; gender linked attributes; age linked attributes; cellular operator linked attributes; and cell phone type linked attributes.

The new data attributes are stored in the data warehouse 158 and associated to the unique user ID as a user ID and attributes as N (initial)+X (transactional)+Y (external)+Z (loan/repayments).

Loan Activities

These activities include loan transactions (loan taken, use of loan, amount, date and time) and repayment activities (repayments, amount, date and time).

Transactional Data

The transactional data may include all data from the transactional activities on the e-wallet 152 and application platform such as occurs at the MO system 101 on its MO server or in the serverless technology (FIGS. 1A and 1B and system of FIG. 6), for example, which profile the digital behavior of the users, such as:

Cash-in transactions (amounts, type of cash-in, location of cash-in, date and time);
Cash-out transactions (amounts, type of cash-out, location of cash-out, date and time);
Bill payment transactions (type of bill, status of bill [expired, early payment, on-time], amounts, date and time);
Purchase transactions (amounts, type of purchase, location of purchase, date and time);
Cellular phone top ups (amounts, location of top-ups, date and time);
Log-in activities (log-in date and time, duration of session, session flow, time spent on each screen);
Sales transactions (sales value, type of product sold, location of sale, date and time);
Commission transactions (commission value, type of commission, date and time);
The money transfer transactions (sent/received, sent by/received by, value, location, date and time); and
Any other transactional or activity recorded in the e-wallet/platform.

External and Public Data

The external and public data may be received from the external data sources 162 such as shown in FIGS. 8 and 9 and include data collected from public domain sources, paid for data sources, and historical data archives of the mobile operators, such as:

Criminal records by geo-location;
The value of any homes by geo-location;
The value of any rental homes by geo-location;
Average income by geo-location, gender and age groups;

Education data by geo-location and gender;

Public transport options by geo-location;

Social media activities by geo-location, gender and age groups;

Infrastructure and services available by geo-location (hospitals, dentists, clinics, supermarkets, hardware stores, furniture stores, shopping malls, etc.); and Mobile usage data (age of account, number of outgoing calls, number of incoming calls, number of mobile numbers called, average monthly spending, number of monthly top ups, etc.).

Figure 10:
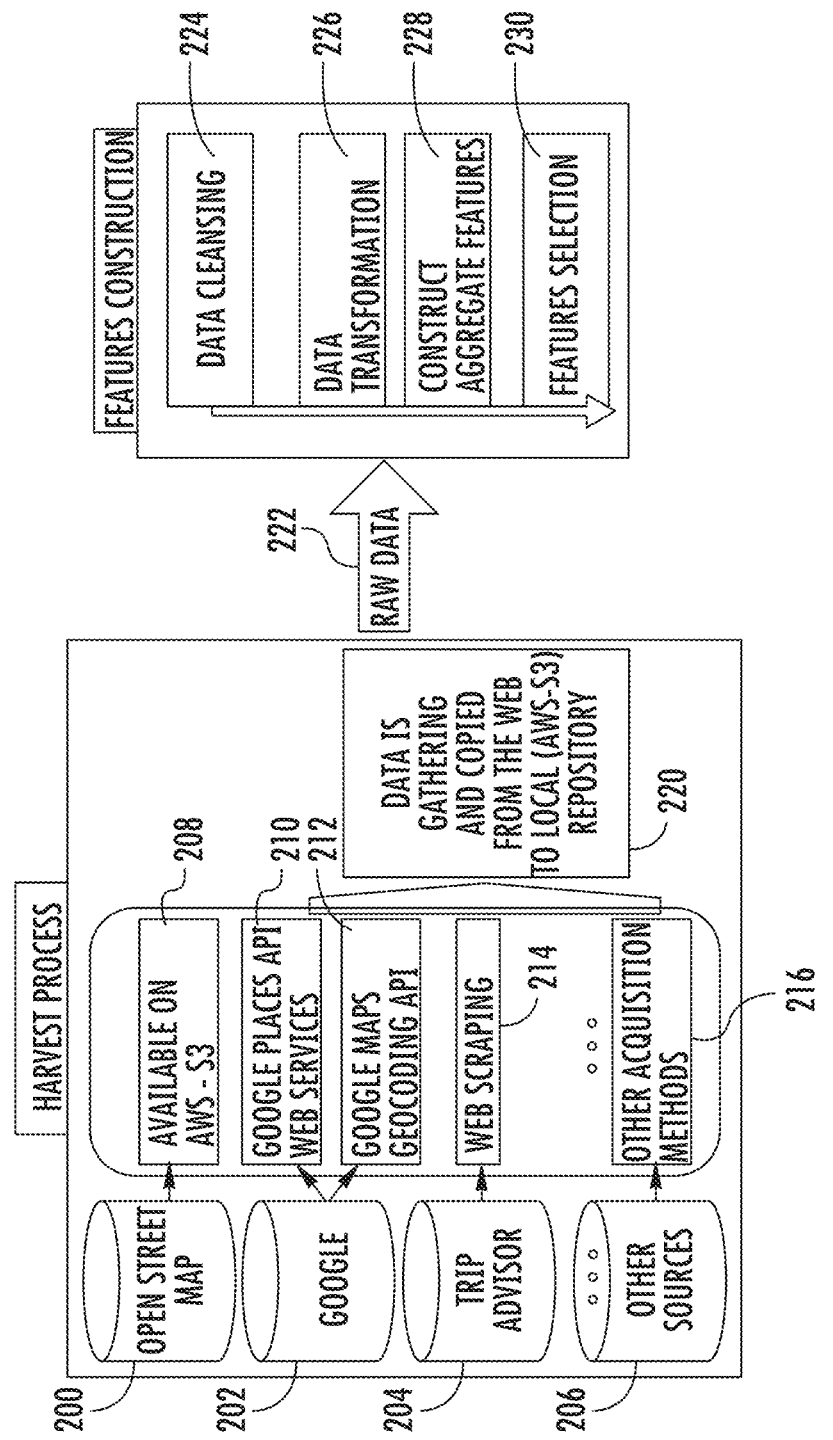
FIG. 10 is a block diagram showing an example of acquiring external data that may be used in conjunction with the systems of FIGS. 1A, 1B, and 3.

Referring now to FIG. 10, there are shown further details of the process to collect external variables used to determine the creditworthiness and risk of a user as a potential customer and the decision variables, and the same data may be used to assist in the overdraft determination with the transaction card system 30 of FIGS. 1A and 1B. The external variables are considered as all public information and may be collected through geo-location information such as public and private infrastructure, weather, ratings, and public evaluations of surrounding establishments. Common data sources include web mapping services such as Google Maps and Open Street Maps, web services, web pages, and public data repositories. The various data sources as non-limiting examples are illustrated such as an Open Street Map 200, Google 202, Trip Advisor 204, and other sources 206.

For example, the Open Street Map application may be available via the Amazon web services cloud storage 208 (S3) and the Google Places API and Web Services 210 may interoperate with Google, including Google Maps and a Geocoding API 212. Web scraping 214 may be used together with other acquisition methods 216. There are many other possible data acquisition methods to be taken advantage of. Data is gathered and copied from the web to a local repository 220 and raw data 222 is then cleansed 224, transformed 226, aggregate features constructed 228, and final features selected 230. It should be understood that the harvest process is determined by the data source types and some sources could be available for direct download as tables. Other sources may require additional methods to access data. For example, Google Maps data and information may be obtained by querying and request data available on various Google application programming interfaces. The web scraping techniques are a useful tool for accessing information contained in documents such as web pages. A data parser program could be used to parse and capture relevant information. Once raw data is gathered and copied from a source to the local repository, the system performs a pre-processing stage where data is cleaned and transformed in order to construct and select new features that may be used for predictive models.

Using the features selection 230, the MO processor as part of a MO server, i.e., MO system 101, which could be operative with serverless technology, and rule engine 106 may infer which variables contribute more to explain some customer characteristics such as socio-economic status, purchasing power, economic dynamics, and land-use. Different methods may establish the relation between external variables and the target characteristics.

Different processing methods and algorithms as non-limiting learning methods may be used. For example, the correlation coefficient may be used to infer the association between each external variable and the target. Variables at the highest correlation are considered as better target descriptors. For example, a rank correlation could study the relationships between rankings of different variables or different rankings of the same variable while the measure of the strength and direction of a linear relationship between two variables may be defined as a (sample) covariance of the variables divided by the product of their (sample) standard deviations.

An information gain method may be used where the method calculates the relevance of the attributes based on information gain and assigns weights to them accordingly. The higher the weight of an attribute, the more relevant it is considered. Although information gain is usually a good measure for deciding the relevance of an attribute, it may have some drawbacks and a notable problem occurs when information gain is applied to attributes that can take on a large number of distinct values. This issue may be tackled with a gain ratio. In any decision tree learning, the information gain ratio is a ratio of information gain to intrinsic information and may reduce a bias towards multi-valued attributes by taking the number and size of branches into account when choosing an attribute. A random forest with gain ratio methodology trains random forest with gain ratio as an attribute selector. Information may be considered as a gain ratio for generating attribute weights. This decision methodology is also known as random decision forest and operates in one example by constructing a multitude of decision trees at training time and outputting the class that is the mode of the classes as classification or mean prediction as a regression of the individual trees.

It is also possible to use a weight by Gini index that calculates the relevance of the attributes of the given external variables set based on the Gini impurity index. The weight by Gini index operator calculates the weight of attributes with respect to the target attribute by computing the Gini index of the class distribution. The higher the weight of an attribute, the more relevant it is considered. This operates as a measure of statistical dispersion in the Gini coefficient making equality among values of a frequency distribution.

It is possible to use a weight by Support Vector Machine (SVM) that computes the relevance of the external variables by computing for each variable of the input set the weight with respect to the target. This weight represents the coefficients of a hyper plain calculated by the SVM. They operate as a supervised learning model that analyzes data used for classification and regression analysis.

Figure 11:
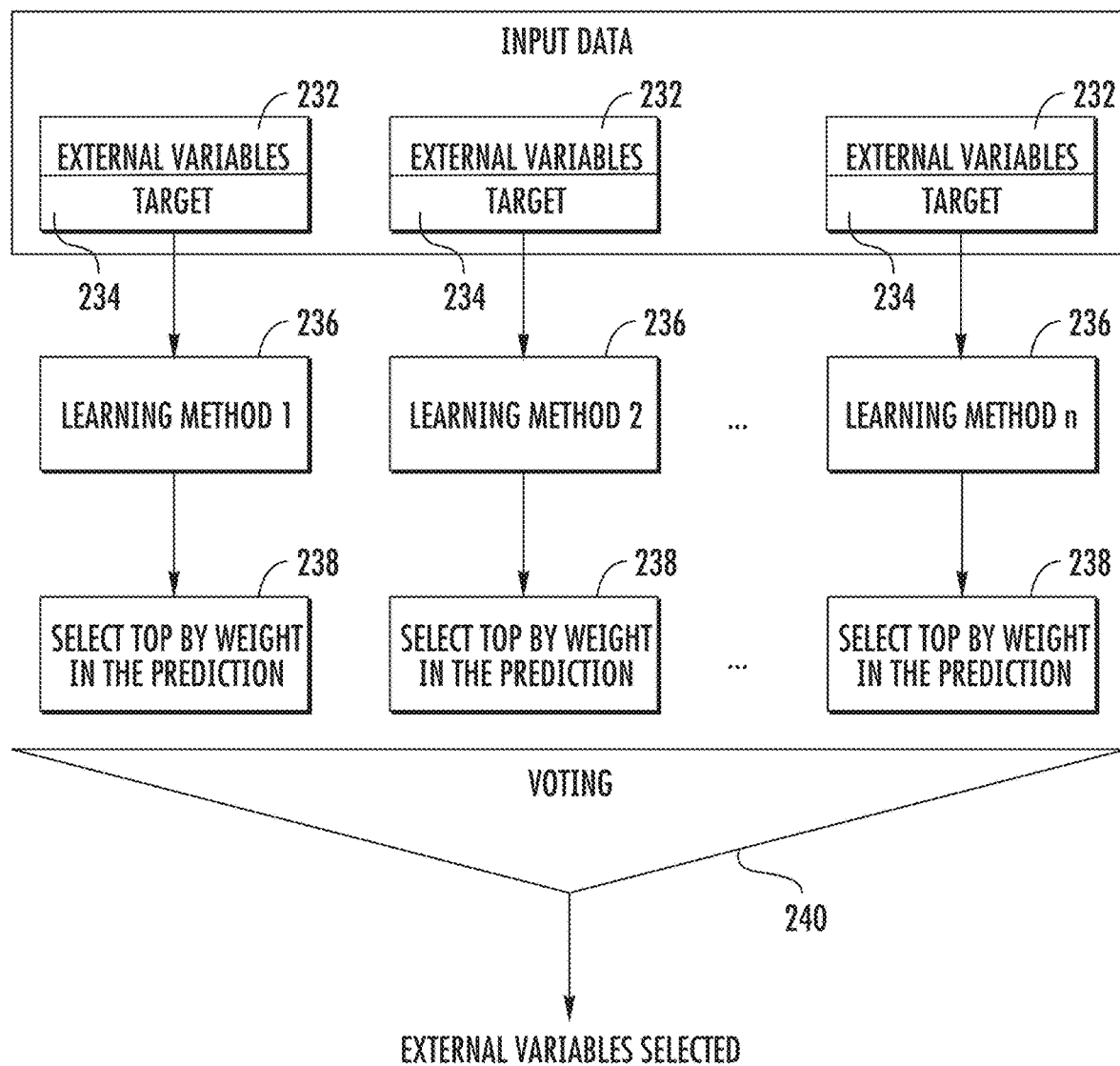
FIG. 11 is a flowchart showing an example of attribute selection that may be used in conjunction with the systems shown in FIGS. 1A, 1B, and 3.

Referring now to FIG. 11, there is illustrated a non-limiting assembly strategy to select the features with voting used to select between the top attributes employed by each technique to compute the prediction that previously was carried out separately. The input data has external variables 232 and a target 234 with the learning methods 236 that select the top by weight in the prediction 238 with the voting 240 to establish the selected external variables.

Figure 12:
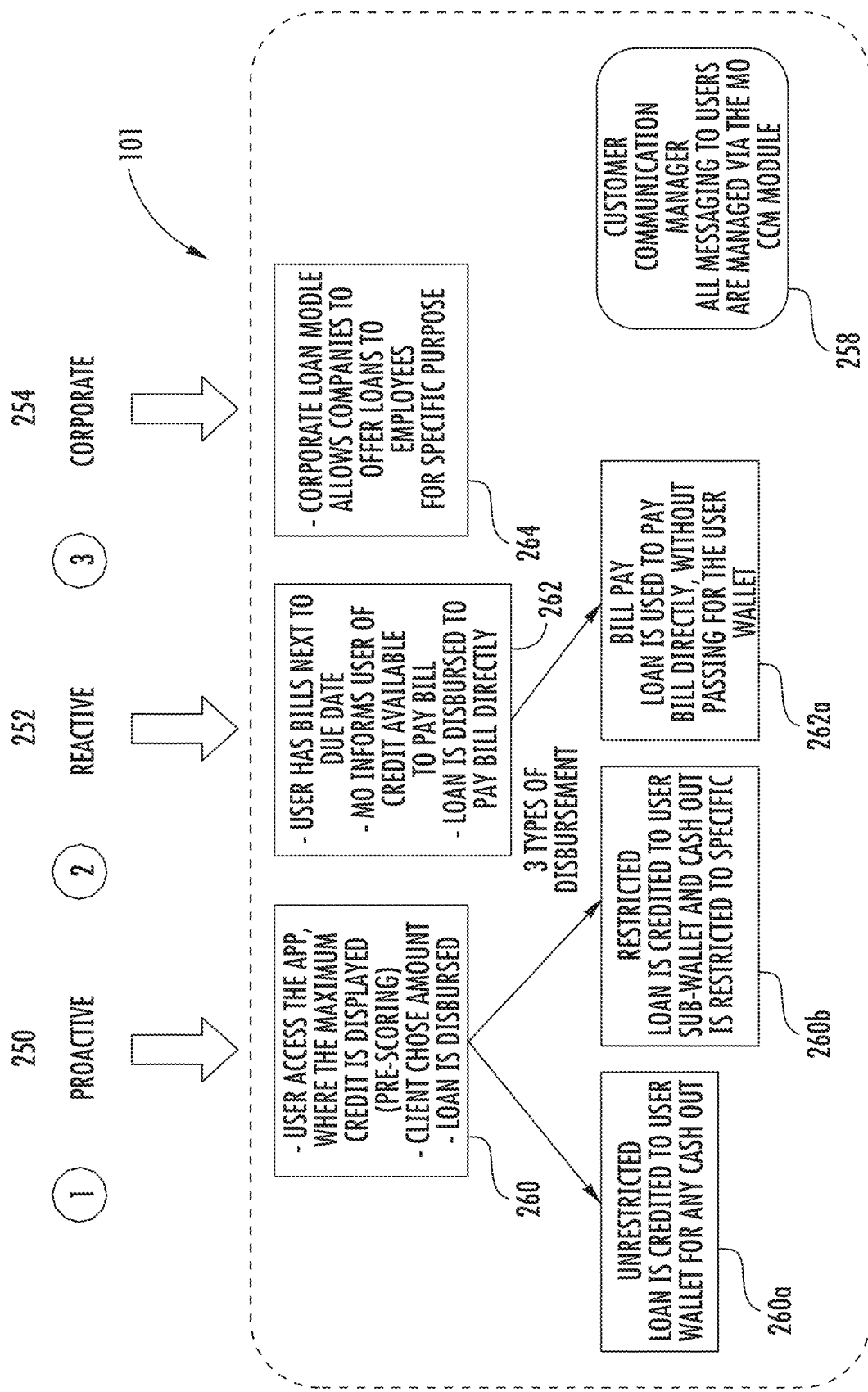
FIG. 12 is a block diagram showing an example of types of loans and disbursements that may be used with the system of FIG. 3.

Referring now to FIG. 12, there are shown examples of the loan and disbursement types to maximize product offerings supported by the MO system. Proactive 250, reactive 252 and corporate 254 loans are supported and unrestricted 260a, restricted 260b, and bill pay disbursements 262a are supported. These groupings may be applied to the loan transaction system for issuing a transaction card. As illustrated, a customer communication manager 258 functions with the user through their mobile application typically and all messaging to users are managed via the MO system 101 via customer communications manager module 258. This module 258 manages all messaging. The customer communication manager module 258 will manage the recipient's user accounts, including passwords and access modifications. As shown with the proactive system 250, the user accesses the application with the maximum credit displayed with pre-scoring and the client chooses the amount and the loan is disbursed (Block 260) and is either unrestricted where the loan is credited to the user for any cash out (Block 260a) or restricted with the loan is credited to the user sub-wallet and cash out is restricted to specific uses (Block 260b). In a reactive type system 252, the user has bills next to a due date and the MO system 101 informs the user of the credit available to pay the bill. The loan may be disbursed to pay the bill directly (Block 262) without passing for the e-wallet (Block 262a). The third type of disbursement as a bill pay occurs and the loan is used to pay the bill directly without passing through (or for) the user wallet (Block 262). In a corporate loan 254, the corporate loan module may allow companies to offer loans to employees for specific purposes.

Figure 13:
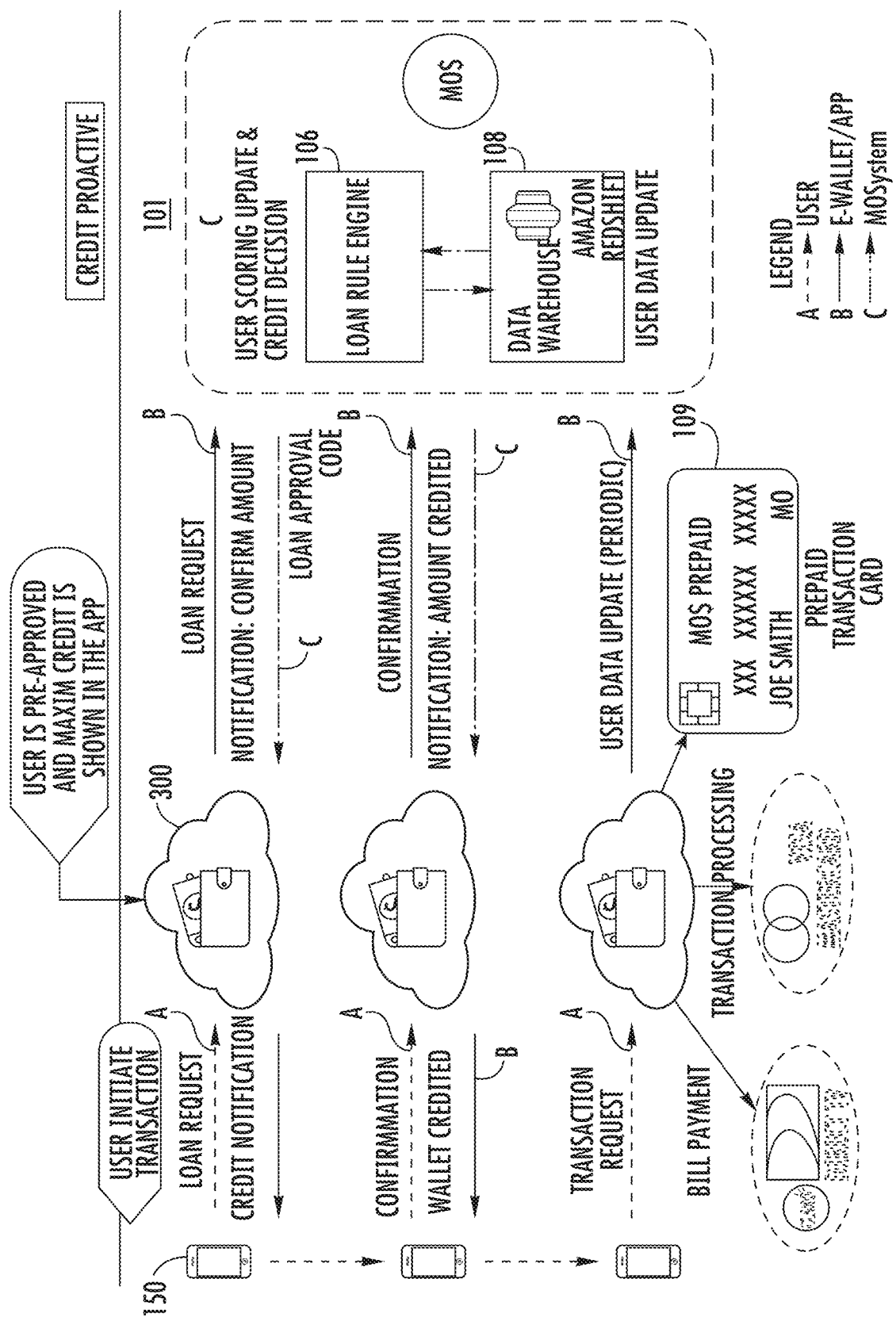
FIG. 13 is a flow sequence confirming a loan request.

Referring now to FIG. 13, there is illustrated flow sequences for the various processes shown in FIG. 12 such as the proactive, reactive, and corporate credit that is guaranteed and showing how a prepaid transaction card 109 may be issued in an example. The user device 150 operates with the application shown by the cloud 300 and interoperating with the system that includes the loan rule engine 106 and data warehouse 108 with the errors corresponding to A as the user and the e-wallet application as B and the system rule engine as C.

Proactive credit is possible with the various steps of a loan request that confirms the account in the credit notification followed by confirmation where the account is credited and notified and the e-wallet credited. The transaction request is made with the user data update that is periodic and the bill payment with the transaction processing. This accomplished with the user interaction with the loan rule engine 106 and data warehouse 108 of the MO system 100. In this process, the server 101 may generate and transmit to the mobile wireless communications device a loan approval code as part of the approval, which initiates the API on the consumer device to allow the consumer to confirm or enter a total amount to be loaned and even how it can be dispersed. Other variations may occur. A prepaid transaction card 109 or other transaction card, such as a credit card, may be issued.

A user or customer at their device 150 may initiate a transaction for a loan request and the user is pre-approved and a maximum credit is shown in the application API such as on the mobile device the user is using. The MO system 101 confirms the amount with a notification and the user confirms and the amount is credited and the wallet credited or transaction card issued. Also with the transaction request, the user data is updated periodically and data stored in the data warehouse with the user data updated. Transaction processing may occur via a credit card processor such as the example MasterCard or VISA or a bill payment made such as to a cable company or Direct TV as in the illustrated non-limiting example. The loan approval code could be as simple as the notification to confirm the loan request so that the user API may confirm to allow the e-wallet to be credited.

Figure 14:
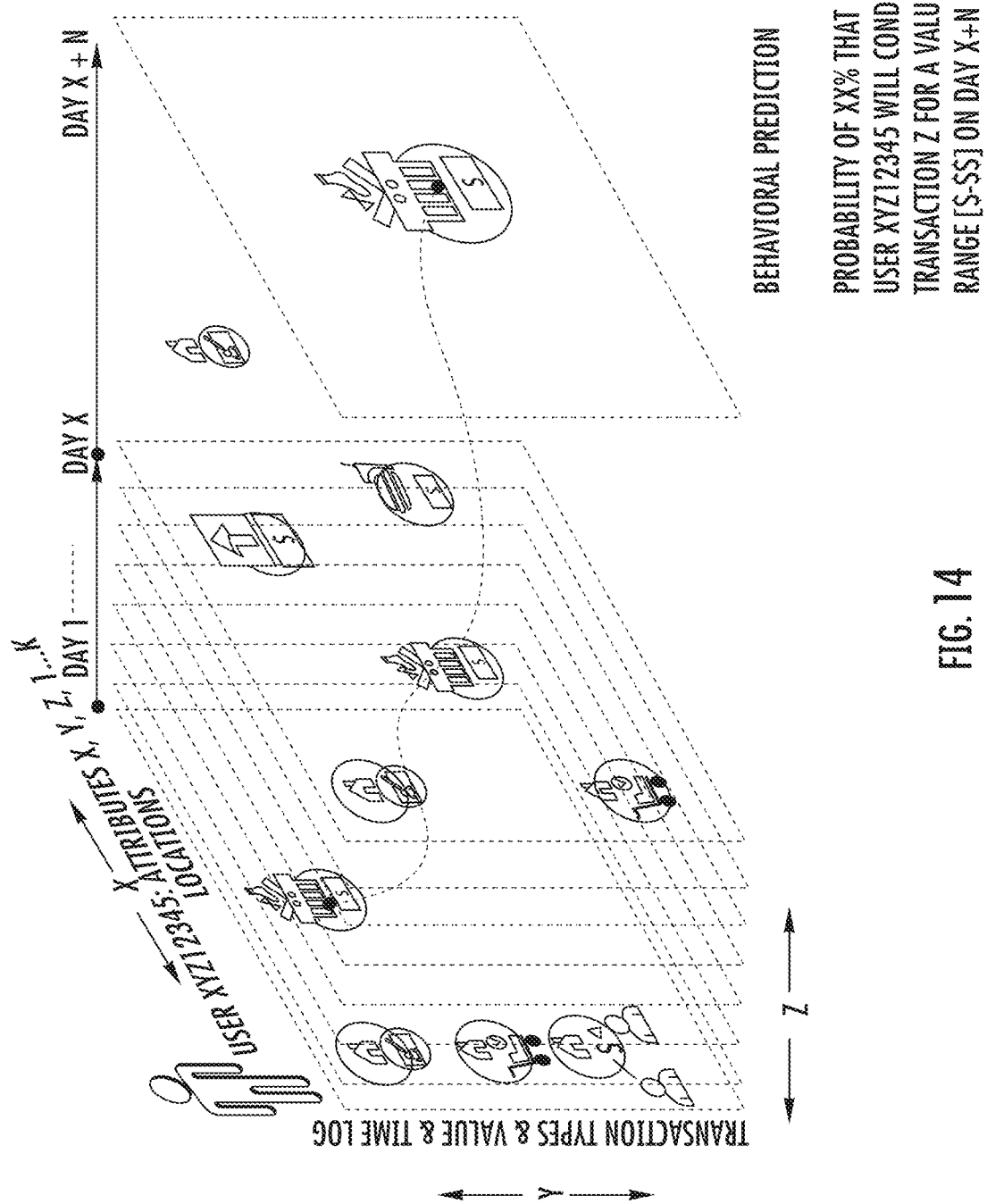
FIG. 14 is a fragmentary time graph for a behavioral prediction of a consumer that may be used in conjunction with the system of FIGS. 1A, 1B, and 3.

Referring now to FIG. 14, there is illustrated a time graph of behavioral prediction in accordance with a non-limiting example in which the system may generate a behavioral profile for the user based on the user check-ins to the e-wallet or based upon transactions of the transaction card 109 if used, or the transaction program that communicates with the MO system 101, server or processor or cloud or edge node having the rule engine. Based on the user location, the MO system 101 may correlate the periodic location patterns to loan and transactional activities. The MO system 101 may match user location check-ins against, as an example, a known-locations database that includes data regarding stores, private locations, public places and other data, including transaction data, and correlate periodic location patterns to loan and transactional activities. Thus, the user profile and periodicity may be predicted for loan disbursement patterns, use of loans, loan repayments, and transaction activities.

In this three-dimensional time graph, the different attributes, including locations for a specific user, are shown along the X axis and the log of the transaction types and value and time are shown along the Y axis. Each day indicates the activities of the user along the Z axis so that known attributes, locations, transaction types, value and time are shown for each day up to day X. Thus each day would have certain types of transactions and the value of that particular transaction based on a store location with the user having basic attributes. These are correlated together.

Thus, it is possible to know the probability of a certain percentage that user XYZ12345 will conduct transaction Z for a monetary value range [$ to $$] on day X+N as shown in FIG. 14. Each day may include the user XYZ12345 visiting one or more specific stores, each at a specific location and conducting a specific transaction that is kept track of by the MO system. Based upon this information, it is possible to establish a behavioral prediction for the consumer as to a certain day and what type of transaction may occur at a possible store in a specific dollar range. Deep learning models may be applied to this type of data to execute this type of data to execute this type of predictive task, convolutional neural networks, recurrent neural networks, or a combination of both, can be applied to forecast these types of events. Although this is only a probability of a certain percentage, the system allows this type of data and behavioral prediction to be used for each consumer, and thus, prediction patterns may be made for an individual consumer, sub-unit, or a large number of the consumers. This data could be provided to merchants and/or other large data vendors. Naturally, the consumer identity would be kept confidential as well as identifiers of mobile communication devices.

For example, the initial user profile generation and maximum credit determination as Phase I explained above permits the system to match the user attribute string to the user's database and apply the maximum credit for the user. The new user is recorded in the MO system data warehouse 108 and different attributes are profiled for a user such as the different loan activities. A record is kept of the transactional data from the e-wallet or transactional application via the API, which is imported once every few hours. The external data that is imported by a variety of public domain sources may be updated also and correlated to the different users.

Different transactional data may be recorded each day, such as each time the user uses the e-wallet or transactional application, such as the cash-in transactions with the type of cash-in, the location of the cash-in relative to a particular store, and the date and time. Cash-out transactions may also be kept as well as bill payment transactions, and more particularly, the purchase transactions with the amounts, type of purchase, location of purchase and the date and time. This is correlated with the log-in activities and sales transactions, including any money transfer transactions.

It is possible to use different types of behavioral prediction models and algorithms as learning methods that help generate the behavioral profiles to predict user profile and periodicity of the loan disbursement patterns, use of loans, loan repayments, and transaction activities and use with the transaction card system 30 of FIGS. 1A and 1B. For example, it is possible to use Customer Conversation Modeling (CCM) that takes advantage of the consumer behavior data such as the buying trends, purchasing history, and including even social media activity that may be available publicly. It is possible to use a multi-threaded analysis of the consumer behavioral patterns such as customer churn, risk or acquisition prediction, and traditional tools that may include batch calculation of linear regression or classification models. A customer conversation modeling may enable the system to predict customer behavior before it happens and can focus on multi-threaded behavior such as trend detection for setting changes in behavior are more important than sustained behavior patterns, recognition of cyclical patterns that take into account the time and location, and the depth/breath of the historical interaction with the consumer in a multi-threaded pattern with alignment algorithms that track events across channels and align them in time and find correlation between multi-channel behavior.

It is possible to use fuzzy clustering, principal component analysis and discriminative analysis. Some techniques may include sequential pattern mining and association rule mining. It is also possible to use a weight factor and utility for effectual mining of significant association rules and even make use of a traditional Apriori algorithm to generate a set of association rules from a database and exploit the anti-monotone property of the Apriori algorithm. For a K-item set to be frequent, all (K−1) subsets of the item set may have to be frequent and a set of association rules may be mined and subjected to weight age (W-gain) and utility (U-gain) constraints. For every association rule that is mined, a combined utility weight score may be computed.

It is possible to use decision trees and other data mining techniques. Decision trees may split a large set of data into smaller classes and analyze where each level of the tree corresponds to a decision. The nodes and leaves may consist of a class of data that are similar to some target variables. There could be nominal (categorical and non-ordered), ordinal (categorical and ordered), and interval values (ordered values that can be averaged). The decision tree may have every leaf as a pure set and a tree may be split further until only pure sets are left as long as subsets do not become too small and give inaccurate results because of idiosyncrasies. One possible algorithm may be the ID3 or Iterative Dichotomiser 3 as a decision tree constructing algorithm that uses Entropy as a measure of how certain one can be that an element of a set is a certain type.

It is also possible to use different analytical techniques such as A/B/multivariate testing, visitor engagement and behavior targeting. Different advanced analytics may be applied such as customer segmentation that groups customers statistically together based on similar characteristics to help identify smaller and yet similar groups for targeted marketing opportunities. Basket segmentation would allow customer information to be provided through the contents of each transaction, while affinity and purchase path analysis would identify products that sell in conjunction with each other depending on promotional or seasonal basis and links between purchases over time. A marketing mix modeling would provide some response models from customer promotion campaigns and product propensity models and attrition models that predict customer behavior.

Other models such as logistic regression, neural networks or include random forest may use vector-based models that operate on feature vectors of fixed length as an input in which each there are no assumptions of intrinsic temporal nor spatial relationships between the values on different positions inside the vector. The consumer histories are converted into a fixed set of features that may be crafted by domain experts and reflect indicators with a reliable set of features for prediction accuracy. Different iterations of empirical experiments may be used.

One possible technique would use recurrent neural networks (RNNs) to overcome vector-based methods that can be applied to a series of captured consumer actions and data that maintain a latent state that is updated with each action. One drawback of the vector-based machine learning similar to logistic regression is the requirement for domain knowledge and data science intuition and may include a necessary pre-processing that creates binary input vectors from original input data.

Signals that are encoded in the feature vector are picked up by the prediction model where the purpose is to detect patterns that would relate the input feature vector to the value to be predicted.

In contrast to vector-based methods, recurrent neural networks (RNNs) take sequences $X=(x_1, \ldots, x_T)$ of varying length T directly as inputs. RNNs may be built as connected sequences of computational cells. The cell at step t takes input $x_T$ and maintains a hidden state $h_t \in R^d$. This hidden state is computed from the input $x_T$ and the cell state at the previous time-step $h_{t-1}$ as:

$$h_t = \sigma(W_x x_t W_h h_{t-1} + b),$$

where $W_x$ and $W_h$ are learned weight matrices, b is a learned bias vector and σ is the sigmoid function. It is possible to use a hidden state $h_t$ that captures data from the input sequence $(x_1, \ldots, x_T)$ up to a current time-step t. It is possible to prepare over time the data from early inputs. The dimensionality d of the hidden state may be a hyperparameter that is chosen according to the complexity of the temporal dynamics of the scenario. These types of deep neural networks have the capacity to consider temporal relationships between the inputs, which could be very important if there is a pattern relating to historical sequence of transactions of each client with the variable they want to predict (whether the client is going to pay or not).

It is possible to use long short-term memory cells (LSTMs) or gated recurrent units (GRUs) that help preserve long-term dependencies and help maintain an additional cell state C for long-term memory. Those types of networks preserve relationships that would be lost after some steps in the data sequences if it used regular RNNs by using not only a hidden state relating each step with the previous step, but a cell state, relating all previous steps with the next one. It would be possible to calculate any hidden and cell states ht and Ct using a cascade of gating operations:

$$ft = \sigma(Wf[ht-1, xt] + bf)$$

$$it = \sigma(Wi[ht-1, xt] + bi)$$

$$C't = \tan h(Wc[ht-1, xt] + bC)$$

$$Ct = ft\ Ct-1 + it\ C't$$

$$ot = \sigma(Wo[ht-1, xt] + bo)$$

$$ht = ot \tan h(Ct)$$

In this cascade, W and b may be learned weight matrices and bias vectors. The final hidden state hT may classify a sequence because hT may be input into a prediction network, which can be a simple linear layer or a sequence of non-linear layers.

There is a training period and the parameters W and b of the computational cells may be used to detect signals in the input sequences in order to help increase the prediction accuracy. Input sequences X are compressed by this process into suitable feature vectors hT. Often the compression process is viewed as feature learning from raw inputs and is the reason why work-intensive human feature engineering may not be required before applying the network. These models are complex and require a long processing time and large data set for the learning and predicting stages as compared to vector-based systems. Because there are more architectural choices and hyper-parameters to tune, it may be more complex.

These are only non-limiting examples of a type of behavioral prediction analysis that may be accomplished using the system in accordance with a non-limiting example.

The system and method as described may also perform a bad debt analysis using the machine learning module as part of the MO server 101 and MO system shown in FIG. 6, and which may be applied to the transaction card system 30 of FIGS. 1A and 1B. Bad debt can increase significantly the revenue loss every year. By using predictive analytic methods, the system utilities can be improved by anticipating and avoiding bad debt losses. There may be key considerations the system 100 takes advantage of and the system includes methodology to predict and prevent bad debt. The system 100 uses a combination of analytical modeling in conjunction with machine learning techniques. The predictive model exploits patterns found in historical and transactional data of the clients as consumers to identify the risk of a client, i.e., consumer falling into bad debt. The model captures relationships among factors to allow assessment of bad debt risk or the potential of that consumer and associated with a particular set of conditions. This helps guide automatic decision-making in the system 100 so that the system determines when the consumer requires an increase in the maximum allowed credit and the risk involved with increasing the maximum allowed credit. Thresholds can be set of the model outcome. This can be applied to the transaction card system 30 of FIGS. 1A and 1B for predictions, with the last 24 hour predictions stored in cache.

The machine learning model can construct and implement a bad debt forecast. The problem may be formulated as a supervised learning problem in which the system 100 has input variables as client transaction behavior and a label for each client is the fall into bad debt. The system 100 will process input data and find relationships and have the output data as the labels. Input data may be represented as a numerical vector such as relating to post consumer loan data and the output may be a probability between 0 and 1. This probability represents the probability that a client will fall into bad debt, for example, a value as a threshold greater than 0.6, which may be adjusted. There are various modeling steps including: (1) problem definition; (2) exploratory data analysis; (3) feature ranking; (4) model selection; and (5) model evaluation.

As to the problem definition, it is not always easy to derive a forecast of bad debts because it is difficult to anticipate the number of variables that impact the ability of a customer as a client or consumer to pay a debt. Typically, the approach is to train a model for each client and then identify an anomaly in credit variables related with default. This approach is very client centric, which makes this methodology difficult to apply to unknown clients or clients that do not have a history of many transactions. The system may use a generalized approach to determining the chance of a consumer falling into bad debt independent of the client and the system may explore transactional variables and generalize the patterns that anticipate a bad debt behavior.

The MO system 100 may return a bad debt probability that is expected to be continued in order to be sensible to risk severity. This allows a follow-up of the client's risk and can lead to the use of client defined thresholds such as varying from 0.6 as an output threshold to make the system and method more flexible in time.

There are feature vectors that are analyzed. The system has an object to identify the statistically reliable relationships between input data features and a target variable using the machine-learning modeling. Different features may be used and these features may include transactional data from clients in time windows of six months as a non-limiting example and a target variable as a binary outcome that indicates whether a client is moving towards a bad debt region in the next seven days. The features may be extracted from a time series (client behavior measuring variables over time) and these values can help evaluate trends, seasonality or changes that can alert when a client is about to be in bad debt. The transactional variables may be measured over a time window of six months to smooth the input signal since a moving window technique that can be used has seven days of sampling. Based on the obtained smoothed time series, the system may extract the following statistics: mean, standard deviation, median, kurtosis, and skewness. Other variables may be added, including the ratios between time series and combination of different transactional variables.

Figure 15:
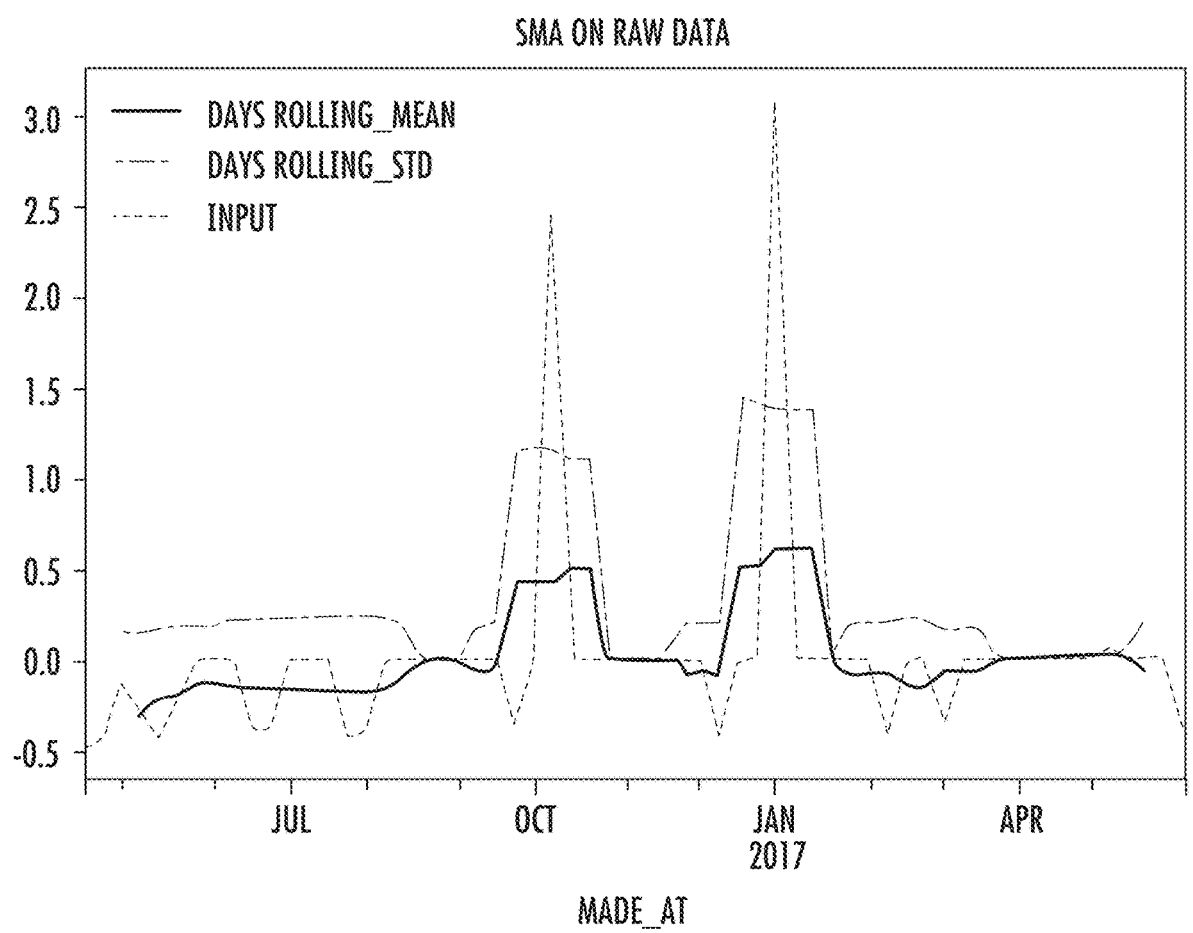
FIG. 15 is a graph showing a moving average for a time series for recharges made by a user.

FIG. 15 is an example of a time series and showing its moving average and moving standard deviation. Based on a hypothesis that the last points of the smoothed time series contains a historical component that resumes the whole time series, it is possible to use the 10 (ten) last points to create the input vector. There are two classes that a client can have based on bad debt risk: bad debt high probability clients (BAD) as a logical one (1) and good clients with low risk probability (GOOD) as a zero (0).

There are also modeling objectives. One objective is accuracy so that the bad debt prediction method has a good performance in both possible outputs and identifies bad debt clients and identifies good clients. There is also a continuous output objective that has a continuous output and this feature is important in order to follow-up the risk severity path of the client.

Figure 16:
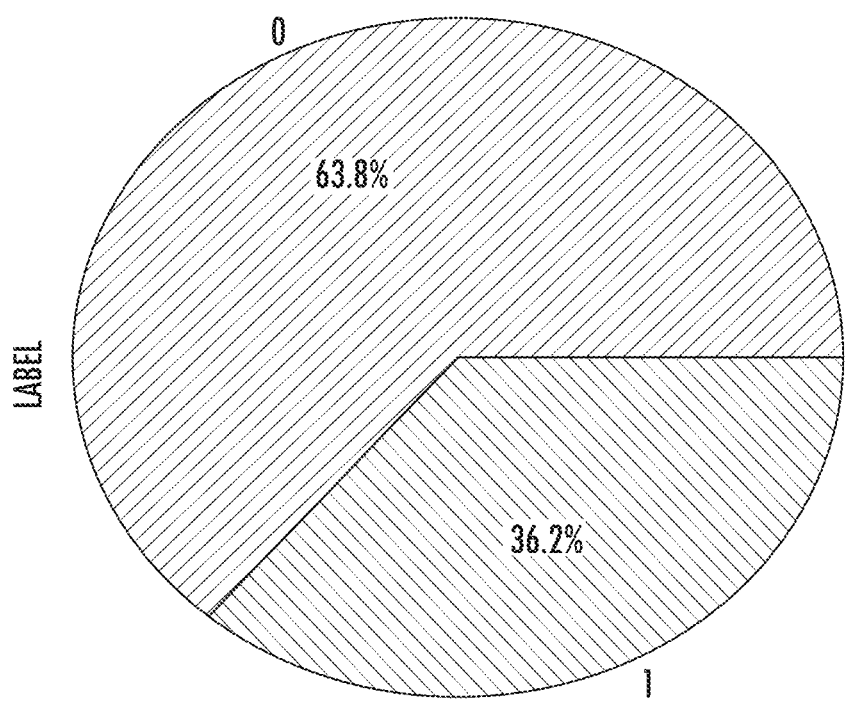
FIG. 16 is a pie chart showing a classed distribution on a data set.

The exploratory data analysis may be a next stage. This stage may drive the analysis of the transactional data set to summarize their main characteristics using visual methods and interpretation. Thus, the MO system 100 may make evident what the data can tell the system beyond the formal modeling. Based on this analysis, it is possible to formulate hypotheses that could lead to a precise and accurate experimental approach. The data set used as an example may include 318 clients with 203 "good" clients and 115 clients that had been in bad debt. A classed distribution on the data set is shown in FIG. 16 with those numbers corresponding to 63.8% and 36.2% and the label showing the bad debt and good debt. The MO system 100 may analyze the variables paired one by one and discriminates by the assigned label. With this initial approach, it is possible to determine that some variables are more correlated with default risk behavior. In this stage, the system makes assumptions and produces a hypothesis and selects the candidate variables to be used in the next stage as to future ranking.

In the feature ranking stage, the MO system may select the final subset of relevant features (variables, predictors) that the system uses. It is relevant for those four reasons: (1) model simplification; (2) low training time; (3) height generalization power; and (4) avoiding the curse of dimensionality.

The system automates the feature ranking to make use of a standard methodology to feed the model with the best predictor variables for the model to forecast the bad debt. According to a recursive feature elimination, the best features for bad debt discrimination from the most correlated to the least correlated are: (1) maximum moving window in kind series; (2) median moving window in time series; (3) skewness moving window in time series; (4) minimum moving window in time series; and (5) incomes/spending ratio.

Figures 18A, 18B, 18C:
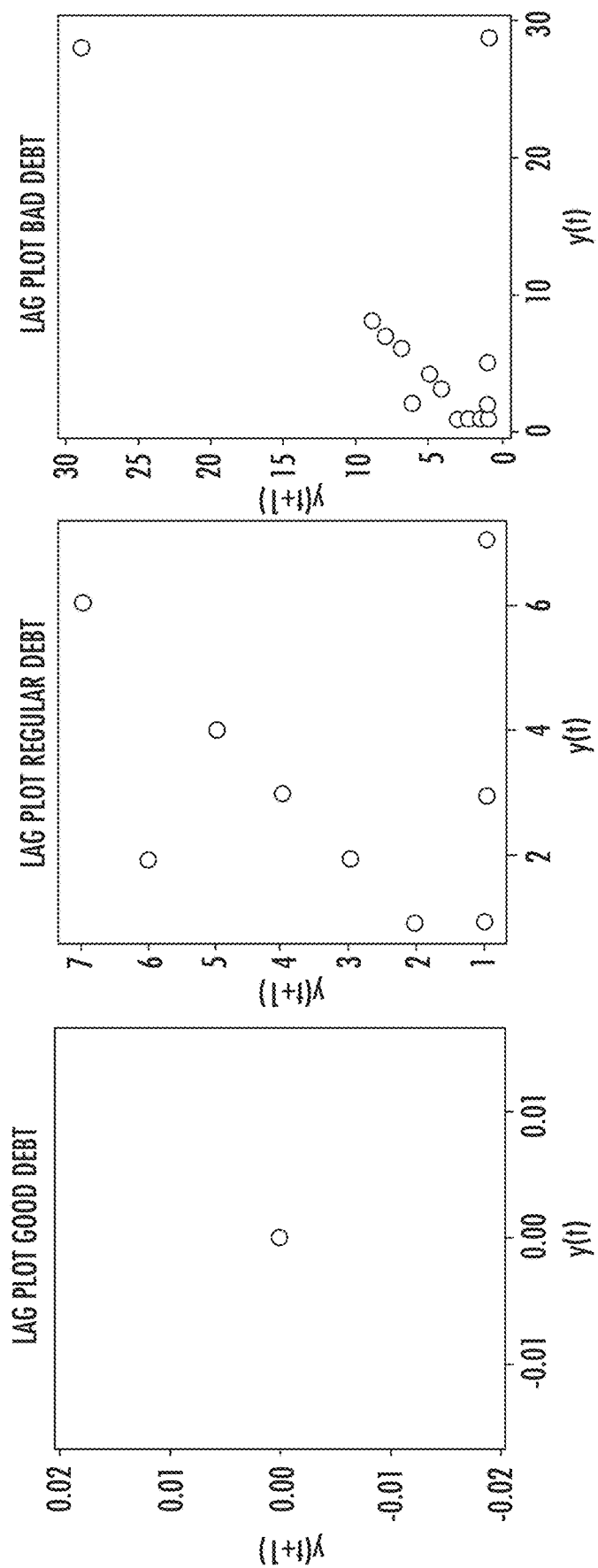
FIG. 18A is a graph showing the lag plot of good debt.
FIG. 18B is a graph showing the lag plot of regular debt.
FIG. 18C is a graph showing the lag plot of bad debt.

FIGS. 17A through 17P show different graphs as representative examples bar graphs and scatter plots for good debt and bad debt while FIGS. 18A through 18C show a lag plot for three client classes. The lag plot shows the tendency on good and bad clients. This type of behavior could be the relationship objective of the feature ranking method. The output of the method may be a score of information gained or prediction power of the feature.

The final scores may be based on an average of the following method scores:

ANOVA: analysis of variance;

Mutual information: information score between two random variables as a non-negative value, which measures the dependency between the variables;

Random Forest: random decision forest are an ensemble learning method for classification and regression, which produce a ranking of variable importance based on their predictive power;

Chi-square: it is a statistical test applied to the groups of categorical features to evaluate the likelihood of correlation or association between them using their frequency distribution.

Figure 19:
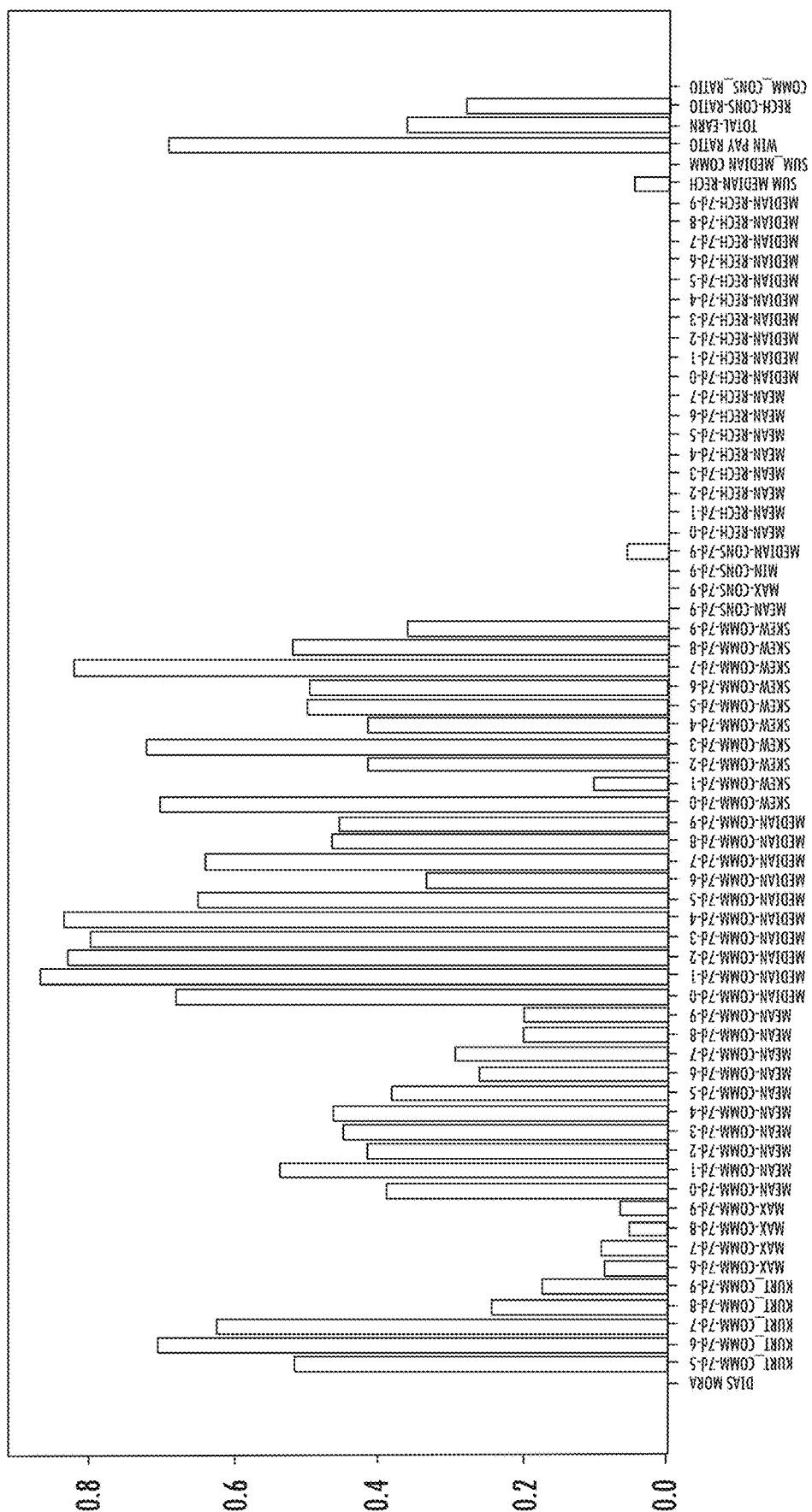
FIG. 19 is a bar chart showing the ranking of features.

The ranking for the input features may be presented as a plot as shown in FIG. 19 as a non-limiting example. There are shown the kurtosis (kurt), maximum (max), mean, median, skew commission, and other identifiers along the horizontal axis.

There now follows an example of the model selection. The system may select the model based on the statistical features extracted from the time series and ranked with the previous algorithms. It is possible to test the classification model to predict bad debt in the next seven days. The input variables have a different range based on the nature of the variable to reduce the inter space range variability that is scaled with the variables after an outlier removal. The system has an objective at this stage to test a range of methods and select the method with the best performance based on the defined metric (F1 score).

The following methods have been tested as: random force, logistic regression, extra trees, XGBoost, support vector machines, KNN, dense neural networks, convolutional neural networks, and recurrent neural networks.

An example experimental set up takes into consideration the performance metric in which the system used the F1 score, which is a measure that considers both the precision "p" and the recall "r" of the test to compute the score. The precision "p" is the number of correct positive results divided by the number of all positive results returned by the classifier, and "r" is the number of correct positive results divided by the number of all relevant samples. In an example, the test partitioning may be trained and 70% of the clients have been used to fit the algorithm with cross validation. About 30% of the clients were reserved to test the algorithm with unseen data. As an output threshold, if the bad debt probability for a client is higher than 0.6, it was considered a high risk in this example for the threshold.

Figures 20, 21:
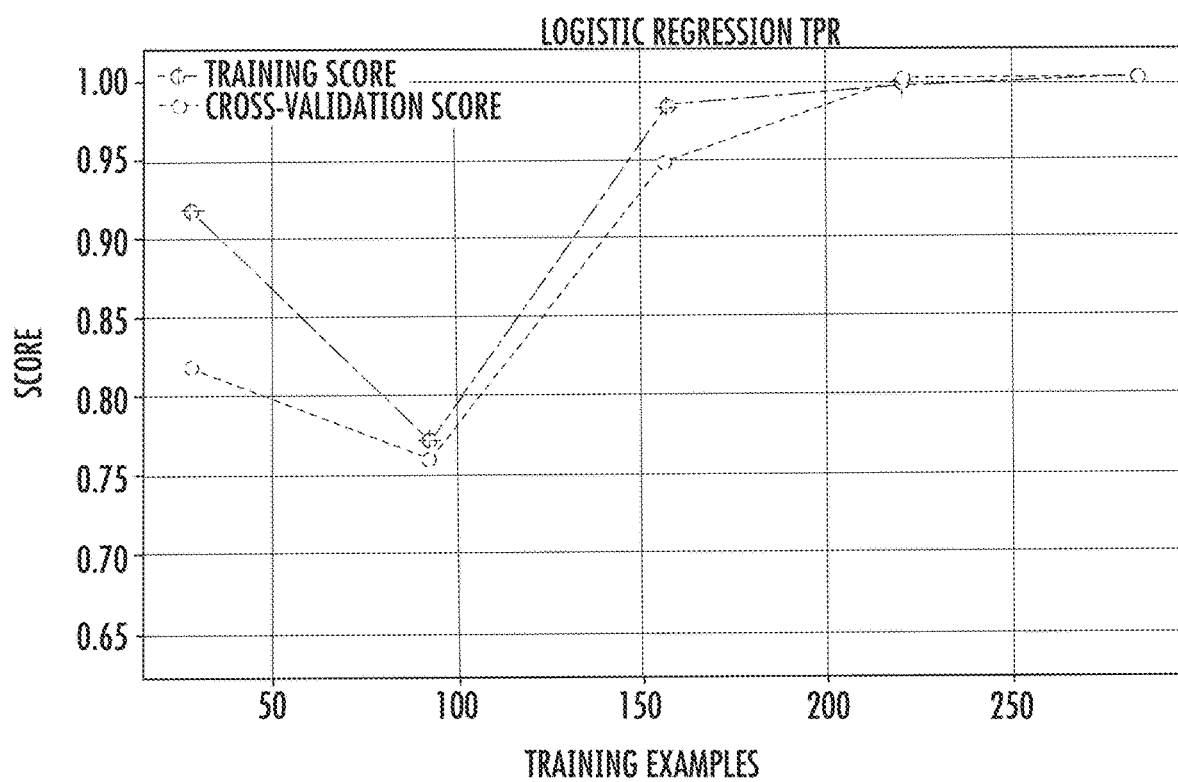
FIG. 20 is a graph showing the learning curve for a true positive rate (TPR) that increases when adding more training examples.
FIG. 21 is a chart showing performance metrics.

The rate of true positives (bad debt) that the model detects will improve with more data as shown in the graph of FIG. 20, which displays the learning curve and shows that the true positive rate (TPR) increases and adds more training examples as a logistic regression for the TPR and also shows the training score and cross-validation score. On test (unseen) examples, the performance metrics are shown in the example of FIG. 21.

There is also a model evaluation that the system accomplishes. In order to achieve the two modeling objectives, the system looks at a high F1 score and continuous output and with the proposed methods fits the objectives as a logistic regression model. There now follows greater description regarding the continuous output of the model using a continuous probability prediction.

Figure 22A:
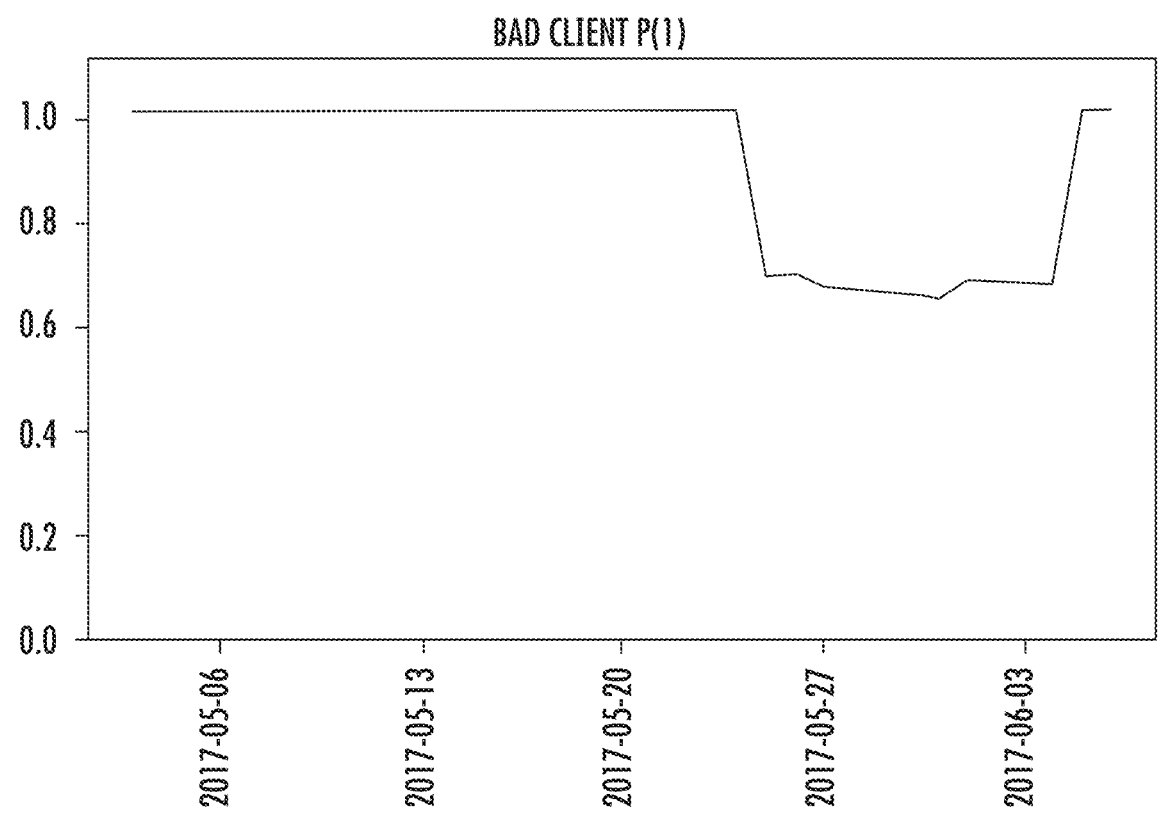
FIGS. 22A and 22B are graphs showing the probability P(1) for two clients that entered into a bad debt state.
Figure 22B:
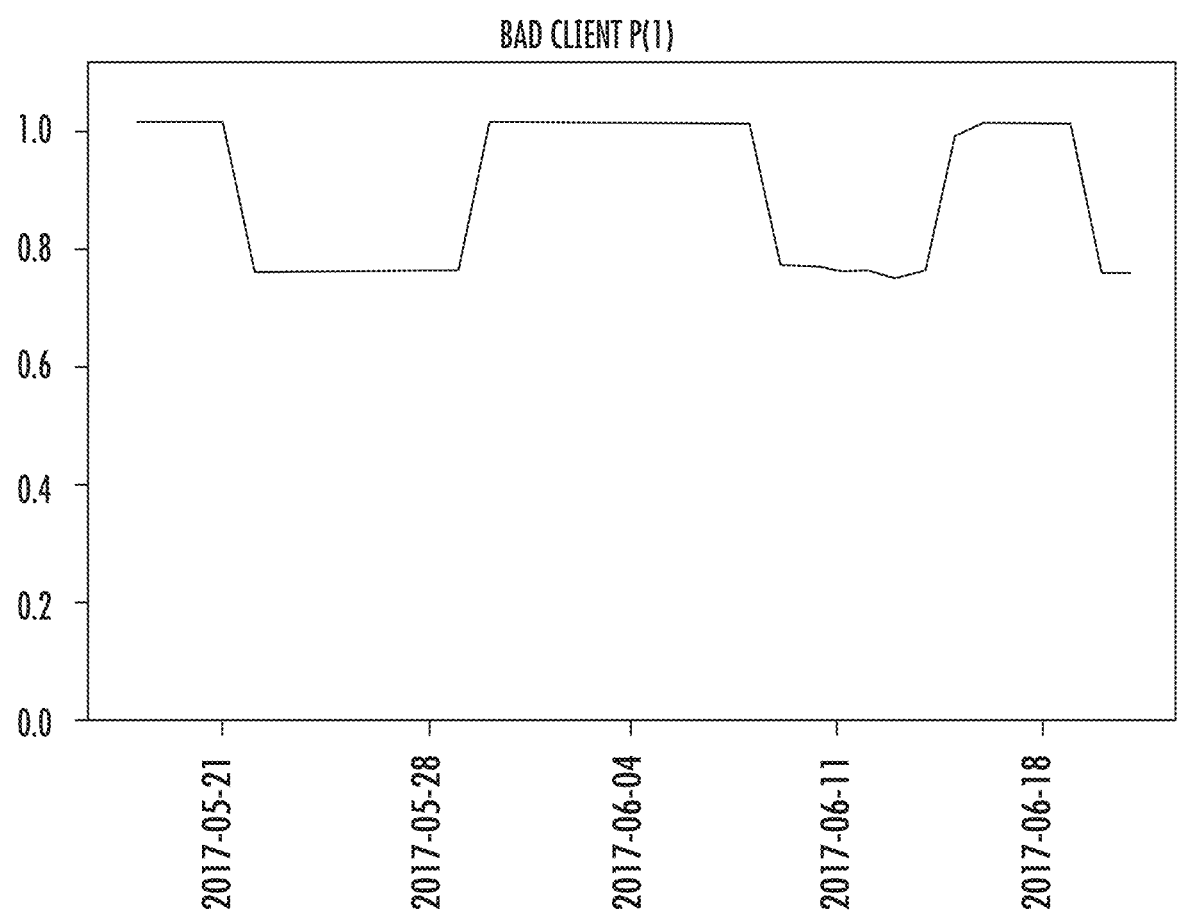
Figure 23A:
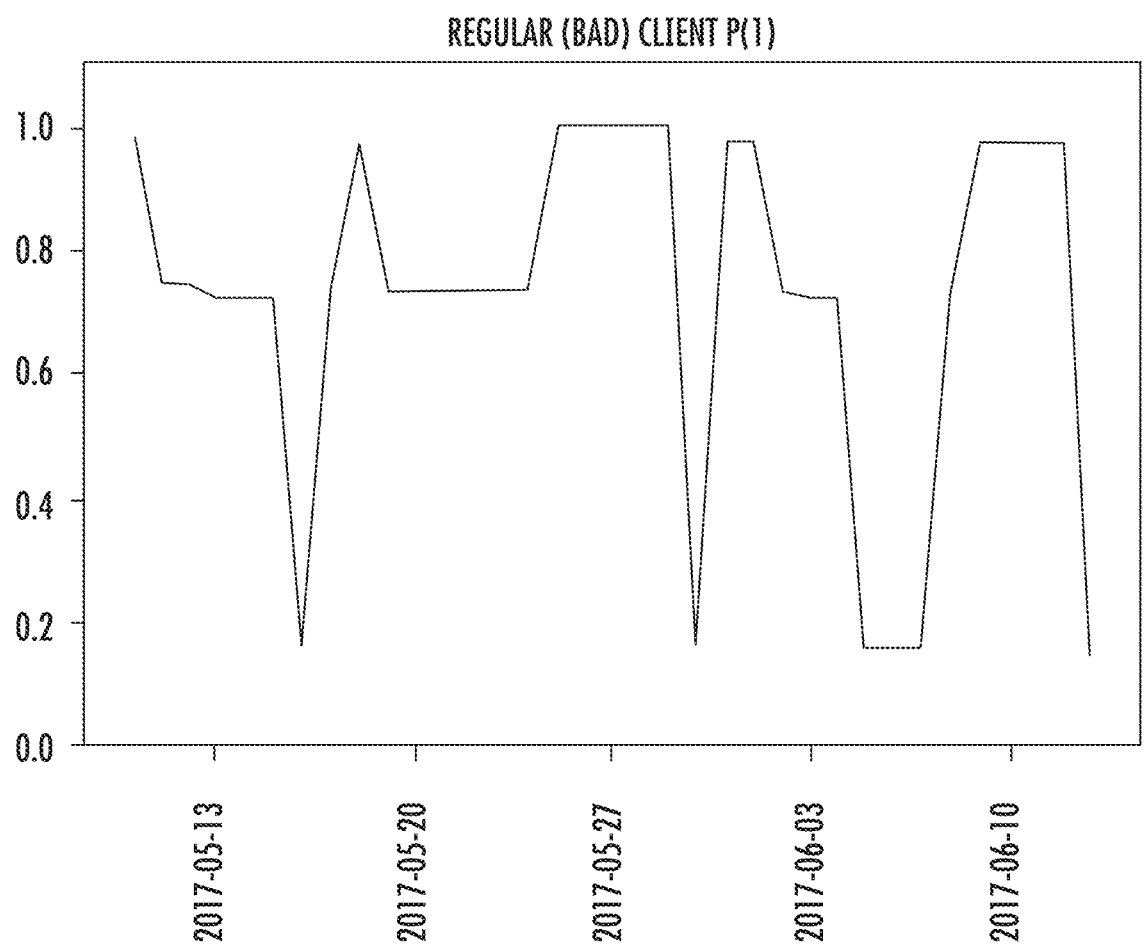
FIGS. 23A and 23B are graphs showing the probability P(1) for two regular bad clients that entered in a bad debt state.
Figure 23B:
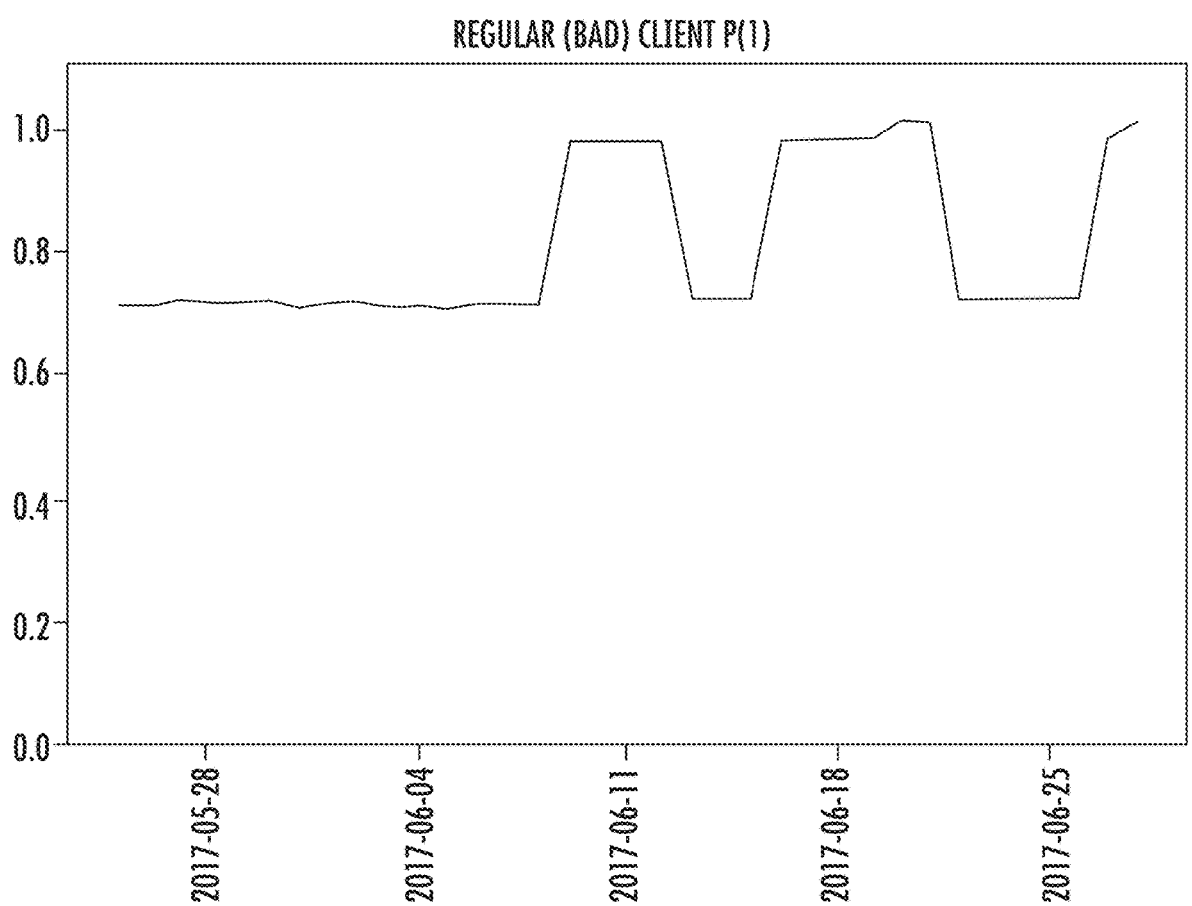

The score of a client may be a probability of a fall into bad debt. The system may "hypothesize" that a bad client that will fall in default or bad debt will have a continuous growth in the forecast probability when that client or consumer is moving closer to a high risk region. This behavior is very convenient to define a threshold when the high risk probability passes over the allowed limits. In an example, after the model was trained, the system as an example took six clients of different classes to prove how the client was classified in different periods. For each client (consumer), the bad debt score was computed during five weeks. For a potential bad debt client, the probability was rarely below 60%, while the good clients had a bad debt probability below 20% such as shown in FIGS. 22A and 22B, showing the probability P(1) for two clients that entered in a bad debt state and the probability P(1) for two regular (bad) clients that entered into a bad debt state as FIGS. 23A and 23B.

Figure 24A:
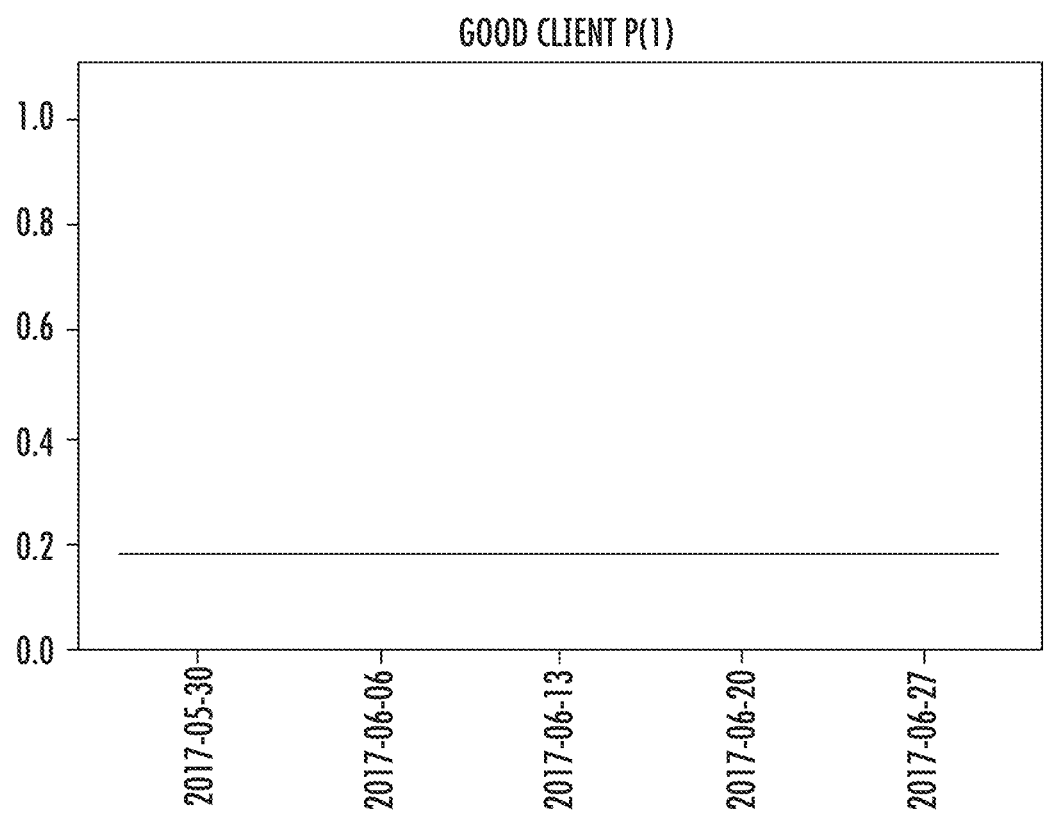
FIGS. 24A and 24B are graphs showing the probability P(1) for two clients from class 0.
Figure 24B:
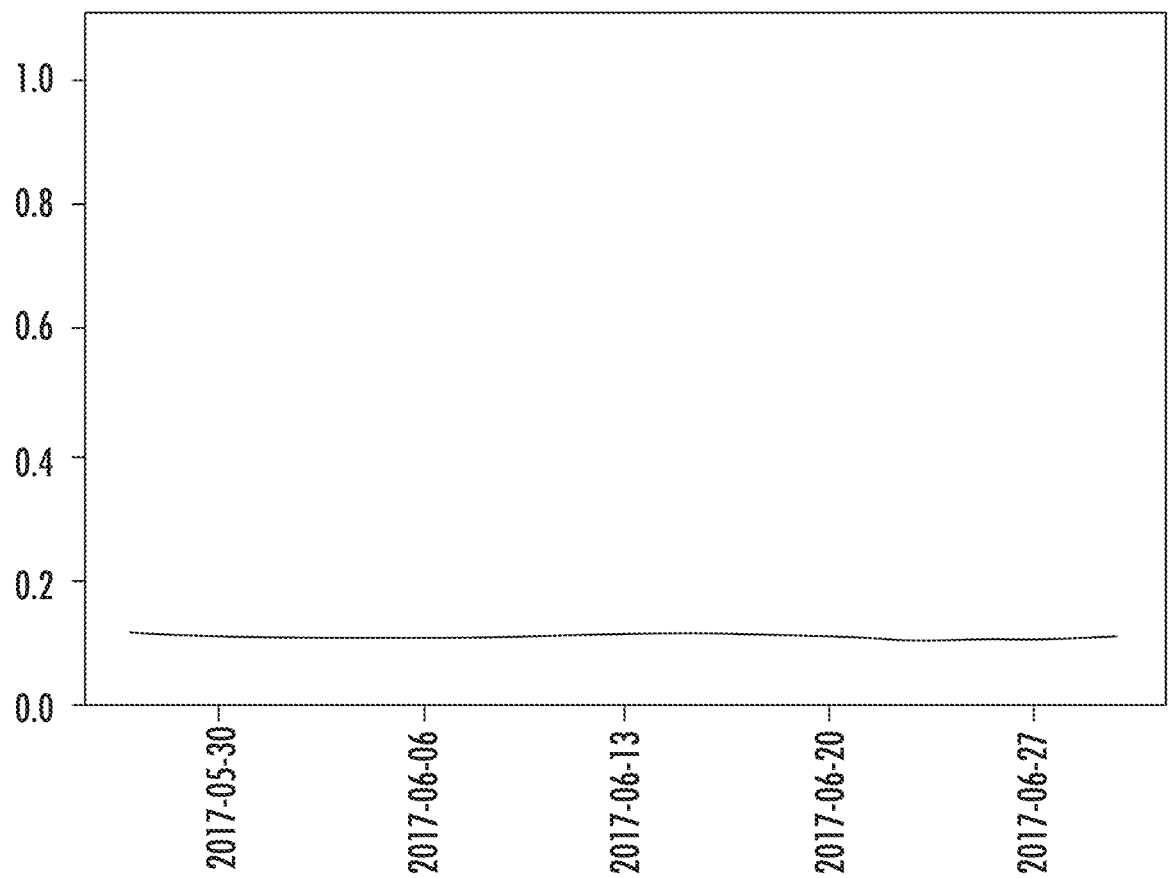

FIGS. 24A and 24B show graphs of the probability P(1) for two clients from class 0. These examples in FIGS. 22A, 22B, 23A, 23B, 24A, and 24B show that the system can be used to follow-up the risk evolution of any client. It does not matter if the client or consumer is going from a high risk region to a low risk region or is leaving behind a high risk region to be a good client. Alarm thresholds may be provided.

The client as a consumer can calibrate the model in order to make it less or more sensible for bad risk prediction. One possible rule is to alarm only the 50% of the high risk clients so that the risk to move the threshold may be over 0.76. If the client needs to be more proactive with alarms, the system may move the threshold over 0.6 as another example.

Figure 25:
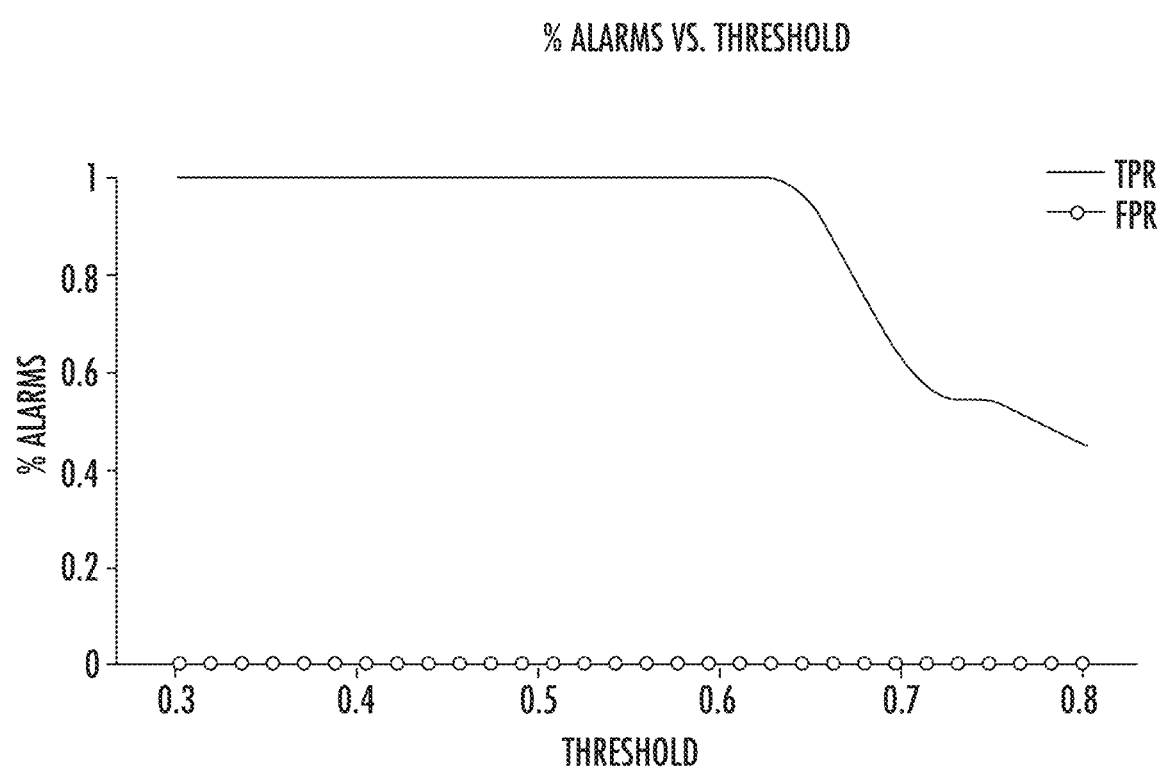
FIG. 25 is a graph showing the percentage of alarms versus the threshold and showing the true positive rate and false positive rate.

FIG. 25 is a graph showing the percentage of alarms versus the threshold and showing the TPR (True Positive Rate) and the FPR (False Positive Rate).

Figure 26:
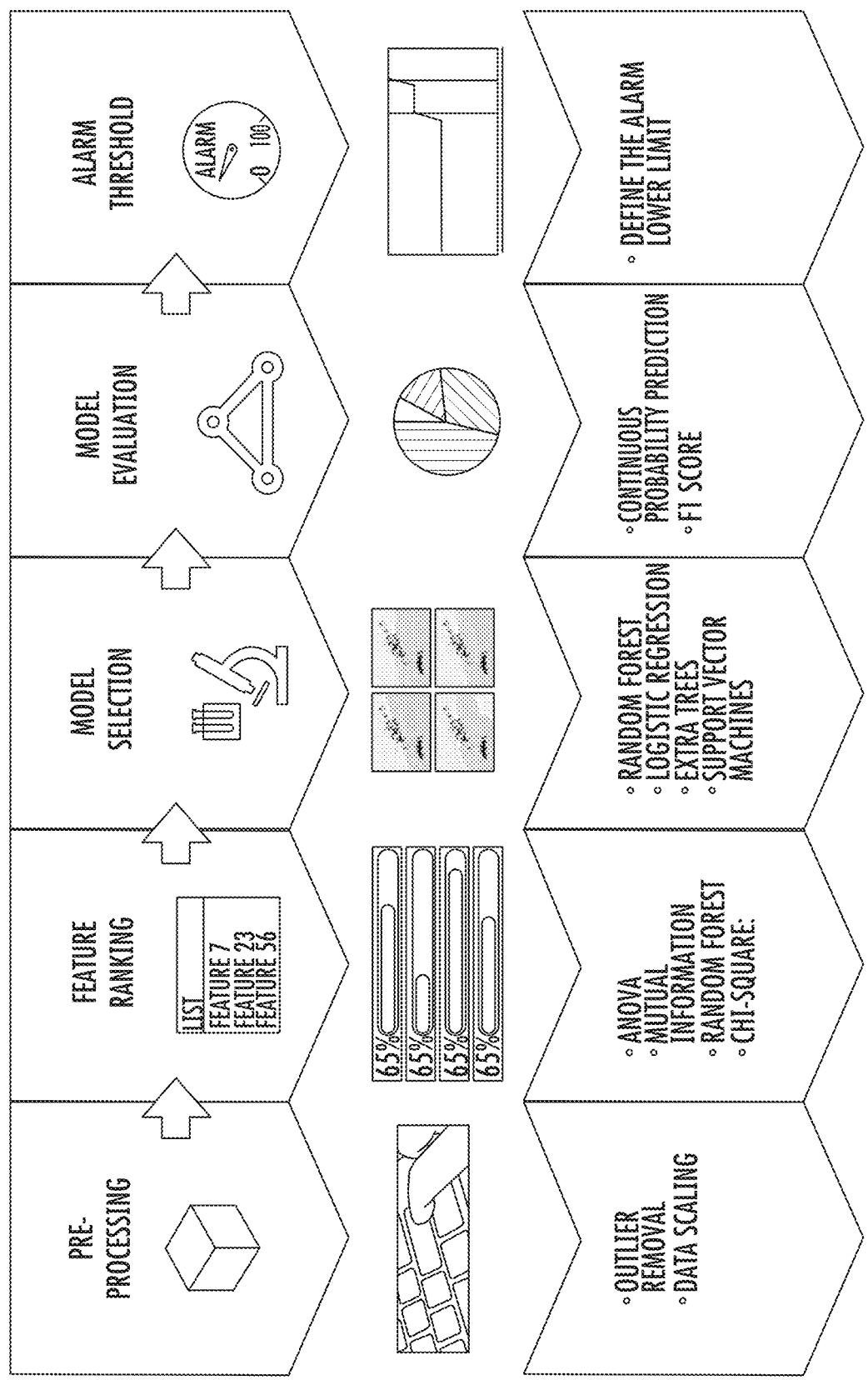
FIG. 26 is a graphical model of the architecture for bad debt forecasting and credit risk protection that may be used with the systems of FIGS. 1A, 1B, and 3.

A summary is shown in FIG. 26 as a model architecture for the credit risk prediction. Pre-processing may be a first step followed by outlier removal and data scaling. This may be followed by feature ranking with the list of different features and may include ANOVA, mutual information, random forest or Chi-squared. Model selection follows and may include random forest, logistic regression, extra trees, and support vector machines as examples. This may be followed by model evaluation with a continuous probability prediction and an F1 score. The final step in this model architecture includes the alarm threshold to define the alarm lower limit.

In accordance with a non-limiting example as noted before, it is possible to track transactions for 6 months and determine when a client requires more credit using a debt tracking algorithm as described below, but also reduce the risk of loaning the client more money and the risk of default. The system may use a combination of two variables with the first related to the good behavior of the client and the second related to the bad behavior of the client and making a linear combination of those two variables and identifying when the client needs more money without any risk for the lender or business. The 24 hour last transactions and values may be stored in the cache as described relative to the transaction card system 30 of FIGS. 1A and 1B.

As noted before, features are extracted from a time series (client behavior variable over time) and these values help evaluate trends, seasonality or changes that can alert when a client is about to move into a bad debt situation. In an example, a moving window of seven points as days is used to smooth input signals. In this moving window, the statistics used include: mean, standard deviation, median, kurtosis, and skewness. Other variables may be added and may include the ratios between consignations and commissions and recharges and commissions. The time series may be for recharges that are shown by the user with the dotted line and the days of the moving average by the solid line and the moving standard deviation by the dashed line.

As noted before, it should be understood that the moving window points includes the measurements such as the mean, standard deviation, and median in which these are a measure of the central tendency of a value of a data set with the mean (average) as the sum of all data entries divided by the number of entries, and the median as the value that lies in the middle of the data when the data set is ordered. When the data set has an odd number of entries, the median may be the middle data entry, and if the data has an even number of entries, then the median may be obtained by adding the two numbers in the middle and dividing the result by two (2). There are some outliers that are not the greatest and least values but different from the pattern established by the rest of the data and affect the mean, and thus, the median can accommodate as a measure of the central tendency. There are measures of the variation that the standard deviation takes into effect to measure the variability and consistency of the sample or population. The variance and standard deviation will give an idea of how far the data is spread apart. When the data lies close to the mean, then the standard deviation is small, but when the data is spread out over a large range of values, the standard deviation "S" is large and the outliers increase the standard deviation.

By measuring the skewness and kurtosis and using those variables, it is possible to characterize the location and variability of the data set with skewness as a measure of symmetry or the lack of symmetry such that asymmetric data set is the same to the left and right of the center point. Kurtosis measures whether the data are heavy-tailed or light-tailed relative to a normal distribution. Thus, those data sets with high kurtosis tend to have heavy tails or outliers and those data sets with low kurtosis tend to have light tails or lack of outliers. One formula that may be used for skewness may be the Fisher-Pearson coefficient of skewness. It should be understood that the skewness for a normal distribution may be zero (0) and any symmetric data should have a skewness near zero (0). The negative values for skewness indicate data that are skewed left and positive values for skewness indicate data that are skewed right. Thus, skewed left the left tail is long relative to the right tail.

The probability as noted before for a user being in a "bad debt" state or not is computed through a logistic regression model or by any other type of classification model previously mentioned that may analyze a dependent dichotomous variable (binary) that may use a regression analysis to conduct when a dependent variable is dichotomous (binary). In an example, it is a predictive analysis and describes data and explains the relationship between one dependent binary variable and one or more nominal, ordinal, interval, or ratio-level independent variables. Also, the regression models may be defined such that the dependent variable is categorical and the algorithm may use the binary dependent variable where the output can take two values "0" and "1" that represent the outcomes. Thus, it is possible to indicate that the presence of a risk factor increases the odds of a given outcome by a specific factor as a direct probability model.

With supervised learning, the system operates with machine learning a function that maps an input to an output based on example input-output pairs and infers a function from labeled training data as a set of training examples. Each example may be a pair as an input object such as a vector and a desired output value as a supervisory signal. The training data may be analyzed and an inferred function produced, which can be used for mapping new examples. Generally, the training examples may be determined and the type of data to be used as a training set may be determined and the training set gathered. The input feature representation of a learned function may be determined and the structure of the learned function in corresponding learning algorithm.

It should be understood that the recursive feature elimination (RFE) may repeatedly construct a model, for example, a regression model or SVM and choose either the best or worst performing feature such as based on coefficients and setting the feature aside and repeating the process with the rest of the features. This can be applied until all features in the data set are exhausted and features may be ranked according to when they were eliminated. With a linear correlation, each feature may be evaluated independently.

As to the moving window also known as a rolling window in a time series, it is possible to assess the model stability over time. Thus, it is possible to compute parameter estimates over a rolling window of a fixed size through a sample. The rolling estimates may capture the instability. It is possible to use back testing where historical data is initially split into an estimation sample and a prediction sample and the model fit using the estimation sample and H-step ahead predictions made for the prediction sample. Thus, the system as a rolling regression with the rolling time window may have the system conduct regressions over and over with sub-examples of the original full sample. It is possible then to receive a time series of regression coefficients that can be analyzed.

Referring again to FIGS. 18A through 18C, for clients with bad debt, there may be a linear relation. The lag plot may be a scatter plot with two variables (x,y) "lagged" where the "lagged" is a fixed amount of passing time where one set of observations in a time series is plotted "lagged" against a second, later set of data. The Kth lag may be a time period that happened "k" time points before time i and most commonly used lag is 1 as a first-order lag plot. Thus the lag plots may allow the system to check for model suitability, outliers as those data points with extremely high or low values, any randomness showing the data without a pattern, a serial correlation where the error terms in a time series transfer from one period to another, and seasonality where periodic fluctuations in time series data that happened at regular periods can be shown. Based upon the example shown in FIGS. 18A through 18C, it is evident that the system may group into two groups as good and bad.

Referring again to FIG. 20, there is shown the learning curve where the true positive rate increases with adding more training examples. The training examples are shown with the score and the logistic regression (TPR) as true positive rate. This allows the sensitivity and specificity as statistical measures of the performance of a binary classification test with the sensitivity as the true positive rate, the recall or probability of detection as also termed to measure the proportion of positives that are correctly identified while the specificity as the true negative rate measures the proportion of negatives that are correctly identified as such.

In one example of a bad debt prediction applied to a financial problem, the system may begin with an exploratory data analysis where the system identifies the variables that have discrimination power based on the defined problem. It is important to transform the most important variables identified in the previous description into a low dimensional and continuous space and measure the representativeness of the identified "most important variables" in the obtained feature space. A first step may analyze a correlation between variables and two methods can achieve the objective.

It is possible to use a multiple correspondence analysis feature correlation. In this data analysis technique for nominal categorical data, the underlying structures in a data set may be detected and represented where the data as points are represented in the low-dimensional Euclidian space. This is an analytical challenge in multi variate data analysis and predictive modeling to include identifying redundant and irrelevant variables and to address the redundancy the groups of variables that may be identified that are correlated as possible among themselves as uncorrelated as possible with other variable groups in the same data set. The multiple correspondence analysis uses the multi variate data analysis and data mining for finding and constructing a low-dimensional visual representation of variable associations among groups of categorical variables. The MCA feature correlation and data can be extrapolated for insights and determine how close input variables are to the target variable and to each other.

The system may validate the variable space correlations such as using a Pearson correlation or a Spearman correlation. Correlation may allow the system to determine a broad class of statistical relationships involving dependents and determine how close variables are to having a linear relationship with each other. The correlations may indicate a predictive relationship. The more familiar measurement of dependents between two quantities is the Pearson product-moment correlation coefficient where the covariance of the two variables may be divided by the product of their standard deviations. A Spearman rank correlation coefficient may be a rank correlation coefficient and may measure the extent to which, as one variable increases, the other variable tends to increase, without requiring that increase to be represented by a linear relationship. Thus, the correlation coefficient will measure the extent to which two variables tend to change together and describe both the strength and direction of that relationship.

A Pearson product moment correlation will evaluate the linear relationship between two continuous variables and it is linear when a change in one variable is associated with the proportional change in the other variable. The Spearman rank-order correlation may evaluate the monotonic relationship between two continuous or ordinal variables. In the monotonic relationship, the variables tend to change together, but not necessarily at a constant rate. The relationship between variables is often examined with the scatter plot where the correlation coefficients only measure linear (Pearson) or monotonic (Spearman) relationships. Both Pearson and Spearman correlation coefficients can range in value from −1 to +1 and the Pearson correlation coefficient may be +1 when one variable increases and the other variable increases by a consistent amount to form a line. The Spearman correlation coefficient is also +1 in that case.

When a relationship occurs that one variable increases when the other increases, but the amount is not consistent, the Pearson correlation coefficient is positive, but less than +1 and the Spearman coefficient still equals +1. When a relationship is random or non-existent, then both correlation coefficients are almost 0. If the relationship is a perfect line for decreasing relationship, the correlation coefficients are −1. If the relationship is that one variable decreases and the other increases, but the amount is not consistent, then the Pearson correlation coefficient is negative but greater than −1 and the Spearman coefficients still equals −1. As noted before, correlation values of −1 or 1 imply an exact linear relationship such as between a circle's radius and circumference. When two variables are correlated, it often forms a regression analysis to describe the type of relationship.

Once an analysis is completed, the system may make hypotheses and conclusions. In an example, relevant variables may be: (1) the number of blocks; (2) the number transfers; and (3) the average I and D. Correlated variables may include: (1) consignments, I&D, transfer and commission; and (2) credit line, consignments, I&D and commissions. The type of relation between variables are generally not linear.

It is possible to identify the features that are used in the model and that are defined as transformation, combinations and ratios between variables that provide more information than they can have alone for future ranking. In order to make more informative the features, it is possible to group the variables based on the frequencies that clients generate. After the feature redefinition, it may be possible to rank them in order to input the algorithm with only the most informative features. To achieve this objective, it is possible to implement a combination of feature important ranking methods such as decision trees, Chi-squared, and relief.

A decision tree may be used with various groups such as average recharges, number block and average consignment and different transfers with the gini coefficient as sometimes expressed as a gini ratio or normalized gini that is a measure of statistical dispersion that shows the inequality among values of frequency distribution.

It should also be understood that the system may use a Chi-squared test as a statistical hypothesis test where the sampling distribution of the test statistic is a Chi-squared distribution when the null hypothesis is true. The random decision force may be used as an ensemble learning method or classification, regression and constructs decision trees at training time outputting the class that is the mode of the classes. Mutual information of two random variables may be used as a measure of the mutual dependence between two variables. The analysis of variance (ANOVA) may be used as a collection of statistical models and procedures as a variation among or between groups. The observed variance in a particular variable may be petitioned into components attributable to different sources of variation. There may be some advantages of one or the other of the logistic regression over decision trees. Both are fast methodologies, but logistic regression may work better if there is a single decision boundary not necessarily parallel to the axis and decision trees may be applied to those situations where there is not just one underlying decision boundary, but many.

Referring again to FIG. 8, there is illustrated a flow sequence for proactive credit and showing a loan request where the loan is made onto a transaction card 109, such as a prepaid transaction card or stored value card to the consumer and has a value corresponding to the amount of the loan. In the alternative, the transaction card may have been purchased with a preset money amount. An e-wallet may still have been credited or the loan could have been made without an e-wallet. The loan may have been issued onto the transaction card from a card processor or other company making the loan and working through either system of FIGS. 1A, 1B, and 6. The transaction card may be issued by the corporation granting the loan. It should be understood that the loan reception mechanism may include issuing the card 109 as a stored value card or debit card. The loan may be received or linked to a specific bank account, e-money purse or e-wallet or be prepaid.

Loan approval codes may be generated and in this example, after receiving a confirmation from the consumer, a transaction server, or other processing system associated with the systems of FIGS. 1 and 3 may be configured to authorize the issuance of the transaction card 109 to the consumer having a value corresponding to the amount of the loan. An acknowledgment may be received from the consumer of the receipt of the transaction card when the transaction card is sent to the consumer, or the consumer could pick it up at a known location such as a card processor. The delivery mechanism of the transaction card 109 can vary. When the consumer receives the transaction card 109, the consumer may acknowledge the receipt. The system of FIGS. 1 and 3 has server processor capability to activate the transaction card 109 and deposit funds in the amount of the loan onto the transaction card. The transaction card 109 may be a card such as issued by Visa, MasterCard, American Express, or another issuer. It may be a corporate loaded card and may be used to make purchases online, transfer funds to another cardholder, or withdraw cash from an ATM, as non-limiting examples.

Figure 27:
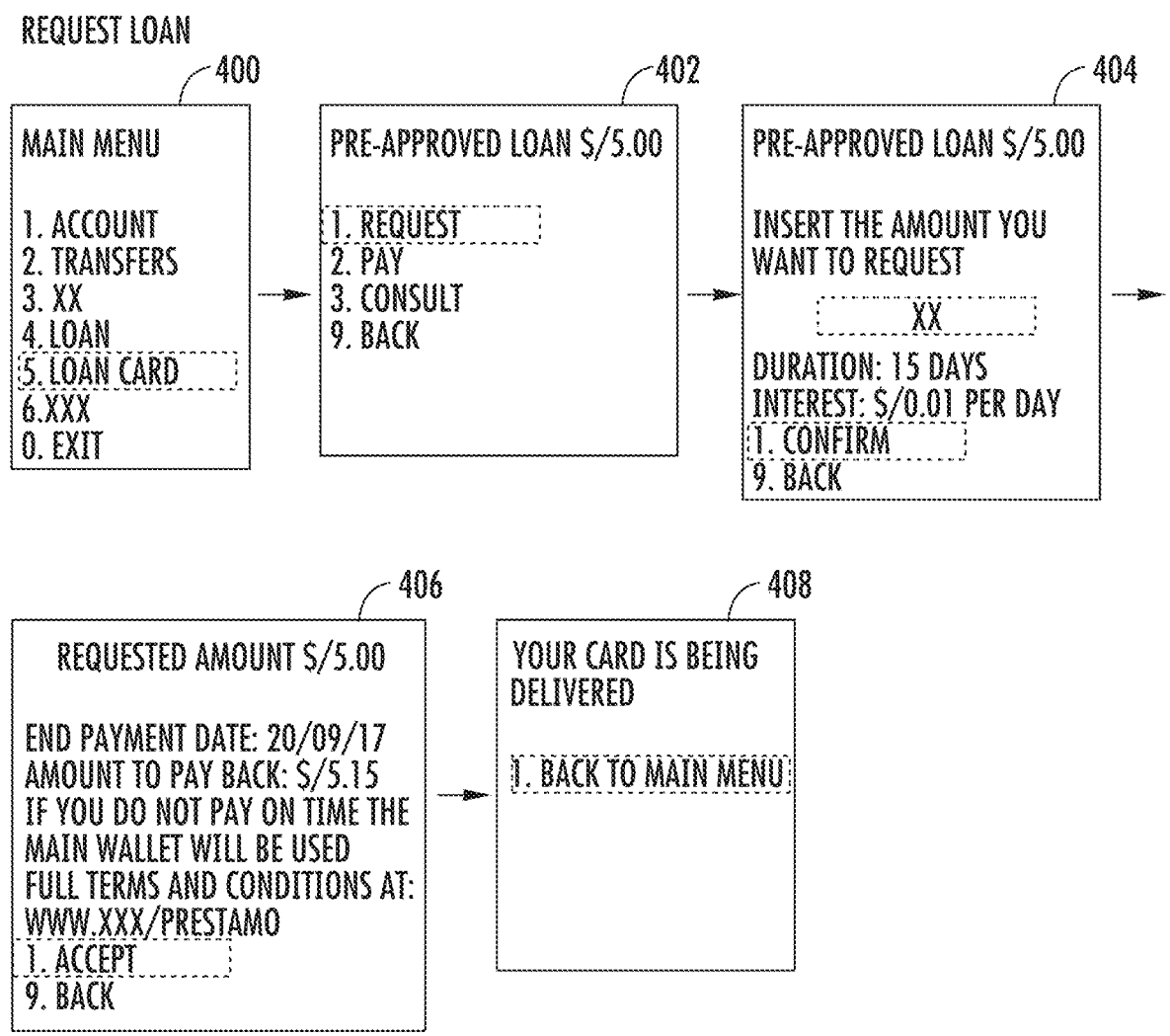
FIG. 27 is an example of wire frames of a USSD menu for requesting a loan and issuing a transaction card.

FIG. 27 shows an example of wire frames and showing the loan made on a consumer device. A main menu is shown in Block 400 and the loan is made at item 4, such as to an account, while the loan for the transaction card is at item 5. The request is made (Block 402) followed by the pre-approved loan with the amount that can be entered for the request (Block 404). The user may accept (Block 406) and the transaction card 109 is then delivered (Block 408). When the transaction card 109 is delivered, the consumer may send an acknowledgment of the receipt of the transaction card back to the system such as having a transaction server, and the response may activate the transaction card and deposit funds in the amount of the loan onto the transaction card using electronic card deposit technology. This can be done by entering an acknowledgment on the API and then a screen notification is sent that the transaction card 109 has been activated and the funds in the amount of the loan deposited onto the transaction card.

A positive advantage of this system for delivering the transaction card is the Know Your Customer (KYC) legal requirements are not mandatory as compared to the issuance of other types of transaction cards where a business must verify the identity of its clients and assess potential risks of illegal intentions for the business relationship, referring to bank regulations and anti-money laundering regulations that govern these activities. The loan amounts may be smaller and the KYC guidelines are not as essential in those situations. Another advantage is that many individuals in third world countries do not maintain an account and/or have a business relationship with the bank or a checking account and are not beneficial owners of accounts at banks, and thus, the system may allow a loan to be made and issued onto a transaction card, even when an individual requesting and receiving the loan has no checking account.

It should be understood that the system may incorporate the machine learning and the resources as described in copending and commonly assigned '494 patent and '282 and '782 patent applications. A risk (exposition algorithm) may control the financial risk, and a second algorithm, i.e., an indebtedness capacity algorithm, and may estimate the amount of money the client can pay back. Information that is input to these algorithms via a first Application Programming Interface (API), i.e., application layer may come from different sources, including a third-party banking information provider such as a financial services data provider, a credit history, and publicly available data. Once a pre-approved amount is determined, the application layer provides for further processing and possible user input.

When a client requests a loan, the MO system may access available data and process the data for the initial pre-approval loan amount, and may also gather financial transaction history. The MO system may use this additional information to enhance estimates such as indebtedness capacity and risk factors in order to adjust the previous pre-approved loan amount. This second stage consumes no more than about 24 hours to release an updated pre-approval. The process to compute the pre-approved loan amount such as on a transaction card of FIG. 1 for each client may be described so as to disaggregate it in two stages: (1) compute ab initial pre-approval; and (2) upgrade the previous pre-approval. Each stage may involve data-driven models: (1) income forecasting; and (2) bad debt prediction.

When the loan is requested, an initial credit score may be computed using the credit score engine followed by a request for a transactions history of financial data. The pre-approved loan amount estimate may be upgraded to improve the estimate, for example, in a 24-hour time frame. At about 60 days, a bad debt prediction model may be adjusted and payment behavior categorized. These adjustments can be used with the cached data of FIG. 1.

Banking data may be used to forecast client monthly income, discounting the estimate of monthly charges for the client if any credits had been previously taken, and may also estimate indebtedness capacity. It is possible to quantify the exposition according to risk assessment. Bad debt likelihood is a relevant risk factor that the MO system may consider, and the MO system may calculate that using an online learning approach. For example, when a loan reaches about 60 days, the MO system may label it as a default or no-default and adjust the learning parameters of the machine learning model immediately. Thus, the machine learning model becomes more accurate and available for the next prediction with each labeling.

It is also possible for the MO system to consider as risk factors the income projection that is inferred from forecasting and information with regard to other credit products that belong to the client. Public data also may be used in a parallel prediction model to infer the income and support for the indebtedness capacity estimation. The MO system may also gather the transaction history for each client banking account. Once this financial data is collected, the MO system may use that financial data to improve estimations.

Public data may include external information that is input as part of the indebtedness capacity estimate. Current banking information may be used with the risk assessment, including the income projection and miscellaneous factors and with the indebtedness capacity estimate. Transactions history may be used to enhance the data and estimates, including the probability of default. The credit history may be used to aid in determining default probability, which may receive information about a bad debt prediction. Income forecasting may be used to help determine the indebtedness capacity estimate and income projection, and of course, the initial or pre-approved loan amount.

Credit history may also encompass a client's past payment history and indebtedness within the MO system, or other credit and financial history of the client that the MO system can access. The third-party financial services data provider may send information about a future client's account balance, credit balance, and credit card repayment in an example.

Public data may include behavior variables where a client's behavior may include information about websites visited by the client, product categories purchased by the client, stores visited, ratings on e-commerce websites, the consumer segment the client belongs to, and related, similar data. Identity characteristics may be related to home addresses, neighborhood profiles, length of present residence, education level, employment history and educational level. This information can be found in LinkedIn, Facebook, Google Reviews, and similar items.

Social relationships may reveal a client's social activity and influence within his friends' social network, and also the relationship with people who have had credit scores in the past. The user photo attribute may include other features that can be calculated or inferred by image processing of public photos of the client, e.g., found in social networks and search engines.

The process for indebtedness capacity may start with data and is followed by feature engineering, model training, model selection, and deployment.

In a loan issuance process, the feature engineering process may include two main stages, e.g., feature selection and feature extraction. In the first stage of feature selection, the MO system may analyze the given data and select the most relevant features for classification. For this task, the MO system may use standard methods. For example, first, filter methods may apply a statistical measure to assign a scoring to each feature and then obtain a rank. Some examples of some filter methods are the Chi squared test, information gain, and correlation coefficient scores. Wrapper methods may include those methods that consider the selection of a set of features as a search problem, where different combinations are prepared, evaluated and compared to other combinations. An example is the recursive feature elimination algorithm. Embedded methods may be related to how the MO system and a machine learning module as part of the server processor or loan scoring engine may learn which features best contribute to the accuracy of the model while the model is created. A common type of embedded feature selection methods are regularization methods.

In feature extraction, it is possible to further process data to combine features in a meaningful way or to transform them to obtain a better representation. Financial feature extraction may include a model that computes an initial score for each client using banking data retrieved from the third-party financial services data provider. It may be assumed in a non-limiting example that loans may be paid in one month. It is possible to compute a pre-approval loan amount based on client income, and the MO system estimates the indebtedness capacity. If income information is not available, the MO system may alternatively compute the pre-approved loan amount based on assets, assuming the account balances for the client.

In a non-limiting example only, the features extracted from third-party banking information or financial services provider may include: (1) available income, which is computed as a sum of client incomes, weighted by the confidence of income occurrence: [available_income]=$\Sigma\_i$, income_streams_i[confidence]*income_streams_i[monthly_income], and (2) indebtedness_capacity as a prior feature about the capacity of the client to repay.

$$[indebtedness\_capacity]=[available\_income]-(1/12)*\Sigma[account\_balance\_current]-[account\_balance\_available], \text{For all account type="credit"}$$

If a client has credit products, the risk decreases because it can be assumed that a financial institution had measured risk a priori. There may be model training and model selection, and based on the obtained features, the system may train the classification model. In this step, the system attempts different classification algorithms and selects the one that best fits the business requirements. The system may take into account the following algorithms: 1) Linear Classifiers: Logistic Regression and Naive Bayes Classifier; 2) Support Vector Machines; 3) Decision Trees; 4) Boosted Trees; 5) Random Forest; 6) Neural Networks; and 7) Nearest Neighbor. The selection of the best model may be accomplished in a non-limiting example by evaluating the learning curves and statistical measures for fit. It may be important to take into account which model has a better impact with regard to the business objectives.

If income information is not available, in another example, the MO system may alternatively compute the pre-approved loan amount based on assets, assuming the account balances for the client.

Income based pre-approved (main)

$$[credit\ line]=[ctrl\_exposition]*[indebtedness\ capacity]$$

Assets based pre-approved (alternative)

$$[credit\ line]=[exposition\_factor]*\Sigma[account\_balance\_current] \text{(only for depositary accounts)}$$

Where $$[indebtedness\_capacity]=[available\_income]-(1/12)*\Sigma[account\_balance\_current]-[account\_balance\_available], \text{For all account type="credit"}$$

And $$[exposition\_factor]=[Delta\_income]*[has\_additional\_credit\_products]$$

Predict Available Income

Available income may be computed as a sum of client incomes, weighted by the confidence of income occurrence:

$$[available\_income]=\Sigma\_i\ income\_streams\_i[confidence]*income\_streams\_i[monthly\_income]$$

Indebtedness Capacity Balance
Measure Risk $$[exposition\_factor]=[ctrl\_exposition]*\Sigma w\_i*[risk\_factors]\_I$$

For instance:

$$[exposition\_factor]=[ctrl\_exposition]*([trend\_factor]+[credit\_types\_factor])$$

In this example, it is assumed w_i=1 for all i, hence, the sum could be greater than 1. However, it may be that $\Sigma w\_i=1$.

Where [ctrl_exposition] is a constant in [0,1], it is fixed as a business rule in order to set the maximum exposition.

Risk factors:

Income reduction or increasing. Income $$[Delta\_Income]=([last\_year\_income]-[projected\_yearly\_income])/[last\_year\_income]$$

$$[trend\_factro]=1/(1+e^{\wedge}(-4[Delta\_Income]))$$

Credit products Balance

If a client has credit products, the risk decreases since the loan issuance system 30 may assume a financial institution had measured risk a priori.

Factors may be related with type of loan. For example, if a credit type of product j is a credit card, the MO system can assume beta_j=0.2

$$[credit\_type\_factor]=\max(\Sigma beta\_j,1)$$

Feature selection may also be known as variable selection and used to simplify the machine learning model and enhance processing of the computer to be more efficient and facilitate interpretation of data by clients' and the MO system. This may allow shorter training times to avoid the problems associated with dimensionality and enhanced generalization, for example, by reducing overfitting. With feature selection, the data that contains some features that are either redundant or irrelevant may be removed without incurring much loss of information. This is different from feature extraction that creates new features from functions of the original features, whereas feature selection returns a subset of the features. The MO system may use a combination of search techniques for proposing new feature subsets, along with an evaluation to measure and score different feature subsets. It is possible to test each possible subset of features, finding the one that minimizes the error rate.

Based on the features obtained in the financial feature extraction such as available income, indebtedness capacity, and credit products balance risk, a classification model may be trained. Different classification algorithms may be used and the algorithm that may be selected is one that may be considered the best to fit the business requirements that are taken into consideration by the MO system. Different algorithms may be selected as noted before, such as using linear classifiers and logistic regression and naive Bayes classifier, support vector machines, decision trees, boosted trees, random forest, neural networks, and nearest neighbor.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A transaction card system, comprising:
a plurality of transaction cards, each belonging to a separate customer, wherein each transaction card has a set dollar limit on spending and issued by a financial institution to which each customer is enrolled in an instant overdraft program operated by the financial institution;
a first computing network operated by a third party overdraft decision maker separate from the financial institution that issued the transaction cards and cooperating with the financial institution and configured to pull past financial transaction data for each customer corresponding to a plurality of days of financial transactions from the financial institution that issued the transaction card for the customer and extract customer data features as decision values from public data sources of the customer, wherein said decision values comprise a) behavior variables, b) identity characteristics, and c) social relationships, wherein the behavior variables comprise information related to websites visited by the customer, product categories purchased by the customer, stores visited by the customer, ratings on e-commerce websites, and the customer segment the customer belongs to, and the identity characteristics comprise information related to home address, neighborhood profiles, length of present residence, education level, employment history, and education level of the customer, and the social relationships comprise information relating to social media and photo attributes that include features inferred from image processing of public photographs found of the customer in social networks and search engines;
wherein said first computing network applies a machine learning approval model to the past financial transaction data and decision values to obtain a predictive payment capacity value for each customer as an amount a respective customer may repay if given an overdraft on the customer transaction card; and
a second computing network operated by the financial institution that issued the transaction cards and connected to the first computing network and configured to receive an overdraft request from a point-of-sale (POS) terminal relating to a customer transaction at the POS terminal;
said second computing network including a cache memory that receives data from the first computing network relating to about the last 24 hours of 1) decision values of latest behavior variables, identity characteristics and social relationships for each customer, 2) the predictive payment capacity values for each customer, and 3) past financial transaction data for each customer, wherein said second computing network receives an indication from the POS terminal that a customer transaction will result in an overdraft of the transaction card and applies an overdraft model operated by the financial institution to reject or accept the overdraft, and if the overdraft model rejects the overdraft, the second computing network pulls customer data stored in the memory cache and applies the machine learning approval model from the first computing network to the retrieved customer data from cache to determine as a second opinion whether to approve the request for an overdraft of the transaction card.

2. The transaction card system of claim 1, wherein said machine learning approval model is operative to generate a bad debt prediction for the customer as a numerical indicia, and if the numerical indicia is below a threshold value, the overdraft on the transaction card is approved for the customer.

3. The transaction card system of claim 1, wherein said transaction card comprises a debit card or prepaid card.

4. The transaction card system of claim 1, wherein said second computing network comprises a plurality of servers in a cloud network forming a machine learning network as an artificial neural network.

5. The transaction card system of claim 1, wherein said first computing network comprises a first cloud-based network having a first non-relational database network that stores decision values, and a second non-relational database network that stores customer financial transactions, and said second computing network comprises a second cloud-based network having at least one edge device.

6. The transaction card system of claim 1, wherein said first computing network comprises an off-line segment and said second computing network comprises an on-line segment.

7. The transaction card system of claim 1, wherein the second computing network is operative to apply the machine learning approval model from the first computer network to cached data and approve a denied request for an overdraft in milliseconds.

8. The transaction card system of claim 1, wherein said first computing network is operative to obtain Open Location Codes (OLC) as decision values.

9. The transaction card system of claim 1, wherein said machine learning approval model comprises one or more of random force, logistic regression, extra trees, XGBoost, support vector machines, KNN, dense neural networks, convolutional neural networks, and recurrent neural networks.

* * * * *